United States Patent [19]
Raith et al.

[11] Patent Number: 5,603,081
[45] Date of Patent: Feb. 11, 1997

[54] METHOD FOR COMMUNICATING IN A WIRELESS COMMUNICATION SYSTEM

[75] Inventors: Alex K. Raith, Durham, N.C.; Bengt Persson, Djursholm, Sweden; Anthony J. Sammarco, Garner, N.C.; Anders C. E. Hoff, Hägersten, Sweden; John W. Diachina, Garner, N.C.; Joseph E. Turcotte, Montreal, Canada; Håkan C. Andersson, Ekerö, Sweden; Francois Sawyer, St-Hubert; Patrice Marsolais, Montreal, both of Canada; Roland S. Bodin, Spånga, Sweden

[73] Assignee: Telefonaktiebolaget LM Ericsson, Stockholm, Sweden

[21] Appl. No.: 147,254

[22] Filed: Nov. 1, 1993

[51] Int. Cl.$^6$ ................................................ H04Q 7/32
[52] U.S. Cl. ........................................ 455/33.1; 455/34.1
[58] Field of Search ................................ 455/33.1, 33.2, 455/54.1, 33.4, 34.1, 53.1, 54.2, 56.1; 379/59, 60, 57, 58, 62, 63, 91; 370/95.1, 95.3, 95.2

[56] References Cited

U.S. PATENT DOCUMENTS

| | | | |
|---|---|---|---|
| 4,509,170 | 1/1985 | Hollinger et al. | 370/85 |
| 4,527,284 | 7/1985 | Röttger | 455/33.2 |
| 4,633,519 | 12/1986 | Gotoh et al. | 455/277 |
| 4,649,538 | 3/1987 | DeLuca et al. | 371/25 |
| 4,775,999 | 10/1988 | Williams | 379/59 |
| 4,797,654 | 1/1989 | Young et al. . | |
| 4,833,702 | 5/1989 | Shitara et al. | 379/60 |
| 4,860,281 | 8/1989 | Finley et al. | 370/79 |
| 4,876,738 | 10/1989 | Selby | 379/59 |
| 5,005,171 | 4/1991 | Modisette, Jr. et al. | 370/110.1 |
| 5,020,091 | 5/1991 | Krolopp et al. | 379/58 |
| 5,060,227 | 10/1991 | Finley et al. | 370/79 |
| 5,101,500 | 3/1992 | Marui | 379/63 |
| 5,111,454 | 5/1992 | Hung et al. | 370/95.3 |
| 5,153,903 | 10/1992 | Eastmond et al. | 379/57 |
| 5,162,790 | 11/1992 | Jasinski | 340/825.44 |
| 5,168,574 | 12/1992 | Gordon et al. | 455/9 |
| 5,212,822 | 5/1993 | Fukumine et al. . | |
| 5,230,082 | 7/1993 | Ghisler et al. | 455/33.2 |
| 5,233,643 | 8/1993 | Naeini et al. | 379/59 |
| 5,307,400 | 4/1994 | Sawyer et al. | 379/59 |
| 5,353,332 | 10/1994 | Raith et al. . | |

FOREIGN PATENT DOCUMENTS

| | | |
|---|---|---|
| 240073 | 10/1987 | European Pat. Off. . |
| 260763 | 3/1988 | European Pat. Off. . |
| 291068 | 11/1988 | European Pat. Off. . |
| 336079 | 10/1989 | European Pat. Off. . |
| 344989 | 12/1989 | European Pat. Off. . |
| 370826 | 5/1990 | European Pat. Off. . |
| 439628 | 8/1991 | European Pat. Off. . |
| 445887 | 9/1991 | European Pat. Off. . |
| 475865 | 3/1992 | European Pat. Off. . |
| 505106 | 9/1992 | European Pat. Off. . |
| 541026 | 5/1993 | European Pat. Off. . |
| 617566 | 9/1994 | European Pat. Off. . |
| 2172775 | 9/1986 | United Kingdom . |
| 2243976 | 11/1991 | United Kingdom . |
| WO92/10042 | 6/1992 | WIPO . |
| WO92/14308 | 8/1992 | WIPO . |

OTHER PUBLICATIONS

*European Search Report No. EP 94 30 8026* Date of completion of search: 17 Nov. 1995.

"Radio Link Control Techniques for Digital Cellular Systems", Seizo Onoe et al., NNT Review, vol. 4, No. 1, pp. 47–54 (Jan. 1992).

"Call Setup Strategy Tradeoffs for Universal Digital Portable Communications", Yurdaer N. Doganata et al., Computer Networks and ISDN Systems, vol. 20, No. 1/5, pp. 455–464, (Dec. 1990).

*Primary Examiner*—Douglas W. Olms
*Assistant Examiner*—Ajit Patel
*Attorney, Agent, or Firm*—Burns, Doane, Swecker and Mathis, L.L.P.

[57] ABSTRACT

A communications system in which information is transmitted in a plurality of time slots grouped into a plurality of superframes which are, in turn, grouped into a plurality of paging frames. A remote station receives paging messages once in each paging frame.

2 Claims, 24 Drawing Sheets

| | One Frame = 40 ms |||||||
|---|---|---|---|---|---|---|
| | SLOT 1 | SLOT 2 | SLOT 3 | SLOT 4 | SLOT 5 | SLOT 6 |
| Full-Rate | A | B | C | A | B | C |
| Half-Rate | A | B | C | D | E | F |

| 0.8 s |||||
|---|---|---|---|---|
| SPOM | GOAM | REGID | PAGING & CONTROL FILLER | SPOM |

| 6 | 6 | 16 | 28 | 122 | 24 | 122 |
|---|---|---|---|---|---|---|
| G | R | PREAM | SYNC | DATA | SYNC+ | DATA |

FIG. 9a

| 6 | 6 | 16 | 28 | 122 | 24 | 78 | 44 |
|---|---|---|---|---|---|---|---|
| G | R | PREAM | SYNC | DATA | SYNC+ | DATA | AG |

FIG. 9b

| 28 | 3 | 3 | 6 | 130 | 12 | 130 | 3 | 2 | 5 | 2 |
|---|---|---|---|---|---|---|---|---|---|---|
| SYNC | BRI | R/N | CPE | DATA | CSFP | DATA | BRI | R/N | CPE | RSVD |

FIG. 9c

```
AG    = Abbreviated Guard Time
BRI   = Busy /Reserved/Idle Indicator
CSFP  = Coded Super Frame Phase
DATA  = Information bits
G     = Guard Time
CPE   = Coded Partial Echo
PREAM = Preamble
R     = Ramp Time
R/N   = Received/Not Received
RSVD  = Reserved field, set to 11
SYNC  = Synchronization
SYNC+ = Additional Synchronization
```

| 29 | 30 | 31 | 313 | 314 | 315 |
|---|---|---|---|---|---|
| $BRI_5$ | $BRI_4$ | $BRI_3$ | $BRI_2$ | $BRI_1$ | $BRI_0$ |

Fig. 10

| 109/101/79 | 16 | 5 |
|---|---|---|
| Information | CRC | Tail |

Fig. 11

| 35 | 36 | 37 | 38 | 39 | 40 | 318 | 319 | 320 | 321 | 322 |
|---|---|---|---|---|---|---|---|---|---|---|
| $d_6$ | $d_5$ | $d_4$ | $d_3$ | $d_2$ | $d_1$ | $d_0$ | $\overline{b}_3$ | $\overline{b}_2$ | $\overline{b}_1$ | $\overline{b}_0$ |

Fig. 12

| 32 | 33 | 34 | 316 | 317 |
|---|---|---|---|---|
| $R/N_4$ | $R/N_3$ | $R/N_2$ | $R/N_1$ | $R/N_0$ |

Fig. 13

| 171 | 172 | 173 | 174 | 175 | 176 | 177 | 178 | 179 | 180 | 181 | 182 |
|---|---|---|---|---|---|---|---|---|---|---|---|
| $d_7$ | $d_6$ | $d_5$ | $d_4$ | $d_3$ | $d_2$ | $d_1$ | $d_0$ | $\overline{b}_3$ | $\overline{b}_2$ | $\overline{b}_1$ | $\overline{b}_0$ |

Fig. 14

| Hyperframe 0 Superframe 0 primary | | | | Superframe 1 secondary | | | | Hyperframe 1 Superframe 2 primary | | | |
|---|---|---|---|---|---|---|---|---|---|---|---|
| F | $E^0$ | $S^0$ | $SPACH^0$ | F | $E^1$ | $S^1$ | $SPACH^0$ | F | $E^2$ | $S^2$ | $SPACH^1$ |

F = F-BCCH

E = E-BCCH

S = S-BCCH

SPACH = PCH or ARCH or SMSCH

FIG. 15

| $HF_n$ | 0 | | 1 | | 2 | | 3 | | 4 | | 5 | | 6 | |
|---|---|---|---|---|---|---|---|---|---|---|---|---|---|---|
| $SF_n$ | 0 | 1 | 2 | 3 | 4 | 5 | 6 | 7 | 8 | 9 | 10 | 11 | 12 | 13 |
| $PF_1$ | p | s | p | s | p | s | p | s | p | s | p | s | p | s |
| $PF_2$ | p | s | - | - | p | s | - | - | p | s | - | - | p | s |
| $PF_3$ | p | s | - | - | - | - | p | s | - | - | - | - | p | s |
| $PF_4$ | p | s | - | - | - | - | - | - | p | s | - | - | - | - |

HF = Hyperframe
SF = Superframe
PF = Paging frame
P = Primary PCHs
S = Secondary PCHs

FIG. 16

| SMS frame = 24 Superframes = 15.36 s | | | | |
|---|---|---|---|---|
| 0 | 1 | 2 | . . . | 23 |
| Superfr. | | | | |

| S-BCCH: | SMS(1) | SMS(2) | SMS(3) | SMS(4) | SMS(1) | SMS(2) | . . . |
|---|---|---|---|---|---|---|---|
| SPACH: | TF(2) | TF(3) | TF(4) | TF(1) | TF(2) | TF(3) | . . . |
| SMS fr. | | | | | | | |

| $k=2$ | $f_1$ | $n_1=4$ | $f_2$ | $n_2=1$ |
|---|---|---|---|---|

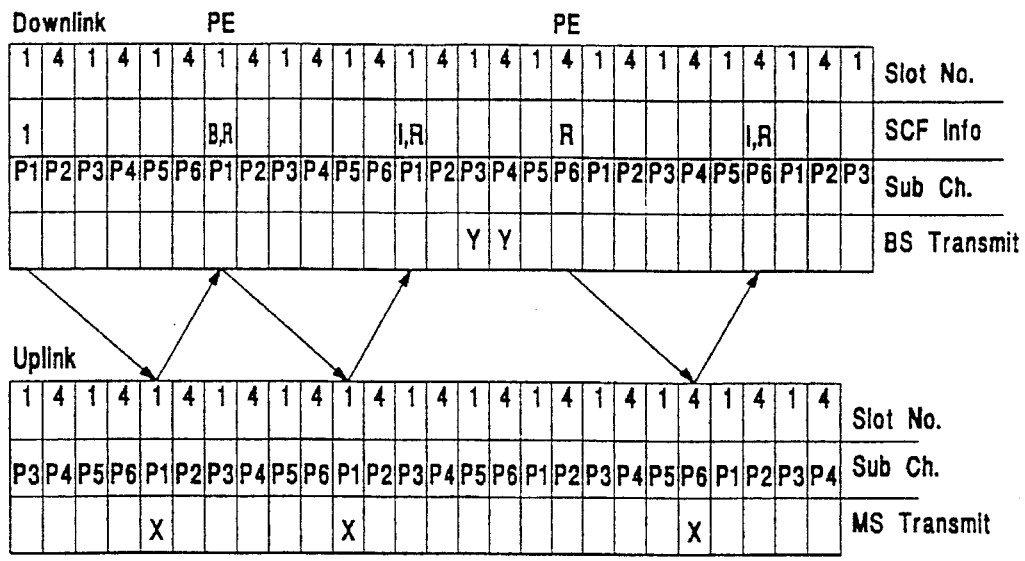

Fig. 21

| BT<br>= 000 | IDT<br>= 00 | MSID<br>= X..X | NL3M<br>= 00 | L3LI<br>= X..X | L3DATA<br>= X..X | CRC<br>= X..X |
|---|---|---|---|---|---|---|
| 3 | 2 | 20 | 2 | 8 | 66 | 16 |

Fig. 22a

| BT<br>= 000 | IDT<br>= 01 | MSID<br>= X..X | NL3M<br>= 00 | L3LI<br>= X..X | L3DATA<br>= X..X | CRC<br>= X..X |
|---|---|---|---|---|---|---|
| 3 | 2 | 34 | 2 | 8 | 52 | 16 |

Fig. 22b

| BT<br>= 000 | IDT<br>= 10 | MSID<br>= X..X | NL3M<br>= 01 | L3LI1<br>= X..X | L3LI2<br>= X..X | L3DATA<br>= X..X | CRC<br>= X..X |
|---|---|---|---|---|---|---|---|
| 3 | 2 | 50 | 2 | 8 | 8 | 28 | 16 |

Fig. 22c

| BT<br>= 001 | CI<br>= X | L3DATA<br>= X..X | CRC<br>= X..X |
|---|---|---|---|
| 3 | 1 | 97 | 16 |

Fig. 22d

| BT<br>= 010 | RSVD<br>= 0 | L3DATA<br>= X..X | CRC<br>= X..X |
|---|---|---|---|
| 3 | 1 | 97 | 16 |

Fig. 22e

| BT<br>= 011 | PE<br>= X..X | TID<br>= XX | FRNO MAP<br>= X..X | FILLER<br>= 0..0 | CRC<br>= X..X |
|---|---|---|---|---|---|
| 3 | 7 | 2 | 32 | 57 | 16 |

Fig. 22f

| BT<br>= 000 | IDT<br>= 00 | MSID<br>= X..X | NL3M<br>= 00 | L3LI<br>= X..X | L3DATA<br>= X..X | CRC<br>= X..X |
|---|---|---|---|---|---|---|
| 3 | 2 | 20 | 2 | 8 | 44 | 16 |

Fig. 22g

| BT<br>= 000 | IDT<br>= 01 | MSID<br>= X..X | NL3M<br>= 00 | L3LI<br>= X..X | L3DATA<br>= X..X | CRC<br>= X..X |
|---|---|---|---|---|---|---|
| 3 | 2 | 34 | 2 | 8 | 30 | 16 |

Fig. 22h

| BT<br>= 000 | IDT<br>= 10 | MSID<br>= X..X | NL3M<br>= 01 | L3LI1<br>= X..X | L3LI2<br>= X..X | L3DATA<br>= X..X | CRC<br>= X..X |
|---|---|---|---|---|---|---|---|
| 3 | 2 | 50 | 2 | 8 | 8 | 6 | 16 |

Fig. 22i

| BT<br>= 001 | CI<br>= X | L3DATA<br>= X..X | CRC<br>= X..X |
|---|---|---|---|
| 3 | 1 | 75 | 16 |

Fig. 22j

| BT<br>= 010 | RSVD<br>= 0 | L3DATA<br>= X..X | CRC<br>= X..X |
|---|---|---|---|
| 3 | 1 | 75 | 16 |

Fig. 22k

| BT<br>= 010 | PE<br>= X..X | TID<br>= XX | FRNO MAP<br>= X..X | FILLER<br>= 0..0 | CRC<br>= X..X |
|---|---|---|---|---|---|
| 3 | 7 | 2 | 32 | 35 | 16 |

Fig. 22l

| EC = X | BC = 0 | L3LI = X..X | L3 DATA = X..X | BE = 1 | FILLER = 0..0 | CRC = X..X |
|---|---|---|---|---|---|---|
| 1 | 1 | 8 | | 1 | | 16 |

Fig. 23a

| EC = X | BC = 0 | L3LI = X..X | L3DATA = X..X | BE = 0 | L3LI = X..X | L3DATA = X..X | CRC = X..X |
|---|---|---|---|---|---|---|---|
| 1 | 1 | 8 | | 1 | 8 | | 16 |

Fig. 23b

| EC = X | BC = 1 | CLI = X..X | L3DATA = X..X | BE = 1 | FILLER = 0..0 | CRC = X..X |
|---|---|---|---|---|---|---|
| 1 | 1 | 7 | | 1 | | 16 |

Fig. 23c

| ECS = X | BC = 0 | L3LI = X..X | L3DATA = X..X | BE = 1 | FILLER = 0..0 | CRC = X..X |
|---|---|---|---|---|---|---|
| 1 | 1 | 8 | | 1 | | 16 |

Fig. 24a

| ECS = X | BC = 0 | L3LI = X..X | L3DATA = X..X | BE = 0 | L3LI = X..X | L3DATA = X..X | CRC = X..X |
|---|---|---|---|---|---|---|---|
| 1 | 1 | 8 | | 1 | 8 | | 16 |

Fig. 24b

| ECS = X | BC = 1 | CLI = X..X | L3DATA = X..X | BE = 1 | FILLER = 0..0 | CRC = X..X |
|---|---|---|---|---|---|---|
| 1 | 1 | 7 | | 1 | | 16 |

Fig. 24c

| SCS = X | BC = 0 | L3LI = X..X | L3DATA = X..X | BE = 1 | FILLER = 0..0 | CRC = X..X |
|---|---|---|---|---|---|---|
| 1 | 1 | 8 | | 1 | | 16 |

Fig. 25a

| SCS = X | BC = 0 | L3LI = X..X | L3DATA = X..X | BE = 0 | L3LI = X..X | L3DATA = X..X | CRC = X..X |
|---|---|---|---|---|---|---|---|
| 1 | 1 | 8 | | 1 | 8 | | 16 |

Fig. 25b

| SCS = X | BC = 1 | CLI = X..X | L3DATA = X..X | BE = 1 | FILLER = 0..0 | CRC = X..X |
|---|---|---|---|---|---|---|
| 1 | 1 | 7 | | 1 | | 16 |

Fig. 25c

| BU<br>=XXX | PCON<br>= X | BCN<br>= X | PFM<br>= X | SMSN<br>= X |
|---|---|---|---|---|
| 3 | 1 | 1 | 1 | 1 |

Fig. 26a

| BT<br>=XXX | IDT<br>= XX | MM<br>= X | OI<br>= X |
|---|---|---|---|
| 3 | 2 | 1 | 1 |

Fig. 26b

| Header A<br>(BU=111) | FILLER<br>= 0..0 | CRC<br>= X..X |
|---|---|---|
| 7 | 102 | 16 |

Fig. 26c

| Header A<br>(BU=000) | MSID1<br>= X..X | MSID2<br>= X..X | MSID3<br>= X..X | CRC<br>= X..X |
|---|---|---|---|---|
| 7 | 34 | 34 | 34 | 16 |

Fig. 26d

| Header A<br>(BU=001) | IDT<br>= 01 | MSID1<br>= X..X | MSID2<br>= X..X | MSID3<br>= X..X | MSID4<br>= X..X | FILLER<br>= 0..0 | CRC<br>= X..X |
|---|---|---|---|---|---|---|---|
| 7 | 2 | 24 | 24 | 24 | 24 | 4 | 16 |

Fig. 26e

| Header A<br>(BU=010) | Header B<br>(BT=000) | MSID1<br>= X..X | L3LI1<br>= X..X | L3DATA1<br>= X..X | FILLER<br>= 0..0 | CRC<br>= X..X |
|---|---|---|---|---|---|---|
| 7 | 7 | 8 | | | | 16 |

Fig. 26f

| Header A<br>(BU=011) | Header B<br>(BT=001) | MSID1<br>= X..X | MSID2<br>= X..X | L3LI1<br>= X..X | L3LI2<br>= X..X | L3DATA1<br>= X..X | L3DATA2<br>= X..X | FILLER<br>= 0..0 | CRC<br>= X..X |
|---|---|---|---|---|---|---|---|---|---|
| 7 | 7 | 8 | 8 | | | | | | 16 |

Fig. 26g

| Header A<br>(BU=011) | Header B<br>(BT=001) | MSID1<br>= X..X | MSID2<br>= X..X | L3LI1<br>= X..X | L3LI2<br>= X..X | L3DATA1<br>= X..X | CRC<br>= X..X |
|---|---|---|---|---|---|---|---|
| 7 | 7 | 8 | 8 | | | | 16 |

Fig. 26h

| Header A (BU=011) | Header B (BT=100) | L3DATA1 = X..X | L3DATA2 = X..X | FILLER = 0..0 | CRC = X..X |
|---|---|---|---|---|---|
| 7 | 7 | | | | 16 |

Fig. 26i

| Header A (BU=011) | Header B (BT=000, OI=1) | MSID1 = X..X | L3LI1 = X..X | CLI = X..X | L3DATA0 = X..X | L3DATA1 = X..X | CRC = X..X |
|---|---|---|---|---|---|---|---|
| 7 | 7 | | 8 | 7 | | | 16 |

Fig. 26j

| Header A (BU=011) | Header B (BT=010, MM=1) | MSID1 = X..X | MSID2 = X..X | MSID3 = X..X | L3LI1 = X..X | L3DATA1 = X..X | CRC = X..X |
|---|---|---|---|---|---|---|---|
| 7 | 7 | | | | 8 | | 16 |

Fig. 26k

| Header A (BU=011) | Header B (BT=100) | L3DATA1 = X..X | RSVD = 0..0 | FILLER = 0..0 | CRC = X..X |
|---|---|---|---|---|---|
| 7 | 7 | | | | 16 |

Fig. 26l

| Header A (BU=100) | Header B (BT=101) | MSID1 = X..X | PE = X..X | TID = XX | L3LI1 = X..X | L3DATA1 = X..X | CRC = X..X |
|---|---|---|---|---|---|---|---|
| 7 | 7 | 7 | | 2 | 8 | | 16 |

Fig. 26m

| Header A (BU=100) | Header B (BT=110) | PE = X..X | TID = X..X | FRNO = X..X | L3DATA1 = X..X | CRC = X..X |
|---|---|---|---|---|---|---|
| 7 | 7 | 7 | 2 | 5 | | 16 |

Fig. 26n

METHOD FOR COMMUNICATING IN A WIRELESS COMMUNICATION SYSTEM

CROSS REFERENCE TO RELATED APPLICATION

This application contains subject matter which is related to U.S. patent application Ser. No. 07/955,591, now U.S. Pat. No. 5,353,332, entitled "Method and Apparatus for Communication Control in a Radiotelephone System," filed on Oct. 2, 1992, to U.S. patent application Ser. No. 07/956,640, now U.S. Pat. No. 5,404,355, entitled "Digital Control Channel," filed on Oct. 5, 1992, and to co-pending U.S. patent application Ser. No. 08/047,452, entitled "Layer 2 Protocol for the Random Access Channel and the Access Response Channel," filed on Apr. 19, 1993. These three co-pending applications are incorporated herein by reference.

BACKGROUND OF THE INVENTION

1. Field of the Invention

The present invention relates to wireless communication systems, and more particularly, to a method and apparatus for communicating information in wireless communications systems including, for example, a cellular radio system.

2. History of the Prior Art

Cellular Telephone Service

Cellular mobile telephony is one of the fastest growing segments in the worldwide telecommunications market. Between 1984 and 1992, for example, the number of mobile telephone subscribers in the United States grew from around 25,000 to over 10 million. It is estimated that the number of subscribers will rise to nearly 22 million by year end 1995 and to 90 million by the year 2000.

Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is billed based on the amount of "airtime" he or she spends talking on the cellular telephone each month. Many of the service features available to landline telephone users, e.g., call waiting, call forwarding, three-way calling, etc., are also generally available to mobile subscribers.

In the United States, cellular licenses are awarded by the Federal Communications Commission (FCC) pursuant to a licensing scheme which divides the country into geographic service markets defined according to the 1980 Census. Only two cellular licenses are awarded for each market. The two cellular systems in each market are commonly referred to as the "A" system and "B" system, respectively. Each of the two systems is allocated a different frequency block in the 800 MHz band (called the A-band and B-band, respectively). To date, the FCC has released a total of 50 Mhz for cellular services (25 MHz per system).

Mobile subscribers have the freedom to subscribe to service from either the A-system or the B-system operator (or both). The local system from which service is subscribed is called the "home" system. When travelling ("roaming") outside the home system, a mobile subscriber may be able to obtain service in a distant system if there is a roaming agreement between the operators of the home and "visited" systems.

The Cellular System

In a typical cellular radio system, a geographical area, e.g., a metropolitan area, is divided into several smaller, contiguous radio coverage areas called "cells." The cells are served by a series of fixed radio stations called "base stations." The base stations are connected to and controlled by a mobile services switching center (MSC). The MSC, in turn, connected to the landline (wireline) public switched telephone network (PSTN). The telephone users (mobile subscribers) in the cellular radio system are provided with portable (hand-held), transportable (hand-carried) or mobile (car-mounted) telephone units (mobile stations) which communicate voice and/or data with the MSC through a nearby base station. The MSC switches calls between and among wireline and mobile subscribers, controls signalling to the mobile stations, compiles billing statistics, and provides for the operation, maintenance and testing of the system.

FIG. 1 illustrates the architecture of a conventional cellular radio system built according to the Advanced Mobile Phone Service (AMPS) standard. In FIG. 1, an arbitrary geographic area may be seen divided into a plurality of contiguous radio coverage areas, or cells, C1–C10. While the system of FIG. 1 is, for illustration purposes, shown to include only ten cells, the number of cells may be much larger in practice. Associated with and located in each of the cells C1–C10 is a base station designated as a corresponding one of a plurality of base stations B1–B10. Each of the base stations B1–B10 includes a plurality of channel units, each comprising a transmitter, a receiver and a controller, as is well known in the art.

In FIG. 1, the base stations B1–B10 are located at the center of the cells C1–C10, respectively, and are equipped with omni-directional antennas transmitting equally in all directions. In this case, all the channel units in each of the base stations B1–B10 are connected to one antenna. However, in other configurations of the cellular radio system, the base stations B1–B10 may be located near the periphery, or otherwise away from the centers of the cells C1–C10 and may illuminate the cells C1–C10 with radio signals directionally. For example, the base station may be equipped with three directional antennas, each one covering a 120 degrees sector cell as shown in FIG. 2. In this case, some channel units will be connected to one antenna covering one sector cell, other channel units will be connected to another antenna covering another sector cell, and the remaining channel units will be connected to the remaining antenna covering the remaining sector cell. In FIG. 2, therefore, the base station serves three sector cells. However, it is not always necessary for three sector cells to exist and only one sector cell needs to be used to cover, for example, a road or a highway.

Returning to FIG. 1, each of the base stations B1–B10 is connected by voice and data links to a mobile switching center (MSC) 20 which is, in turn, connected to a central office (not shown) in the public switching telephone network (PSTN), or a similar facility, e.g., an integrated system digital network (ISDN). The relevant connections and transmission modes between the mobile switching center MSC 20 and the base stations B1–B10, or between the mobile switching center MSC 20 and the PSTN or ISDN, are well known to those of ordinary skill in the art and may include twisted wire pairs, coaxial cables, fiber optic cables or microwave radio channels operating in either analog or digital mode. Further, the voice and data links may either be provided by the operator or leased from a telephone company (telco).

With continuing reference to FIG. 1, a plurality of mobile stations M1–M10 may be found within the cells C1–C10.

Again, while only ten mobile stations are shown in FIG. 1, the actual number of mobile stations may be much larger in practice and will generally exceed the number of base stations. Moreover, while none of the mobile stations M1–M10 may be found in some of the cells C1–C10, the presence or absence of the mobile stations M1–M10 in any particular one of the cells C1–C10 depends on the individual desires of each of the mobile subscribers who may travel from one location in a cell to another or from one cell to an adjacent or neighboring cell.

Each of the mobile stations M1–M10 includes a transmitter, a receiver, a controller and a user interface, e.g., a telephone handset, as is well known in the art. Each of the mobile stations M1–M10 is assigned a mobile identification number (MIN) which, in the United States, is a digital representation of the telephone directory number of the mobile subscriber. The MIN defines the subscription of the mobile subscriber on the radio path and is sent from the mobile station to the MSC 20 at call origination and from the MSC 20 to the mobile station at call termination. Each of the mobile stations M1–M10 is also identified by an electronic serial number (ESN) which is a factory-set, "unchangeable" number designed to protect against the unauthorized use of the mobile station. At call origination, for example, the mobile station will send the ESN to the MSC 20. The MSC 20 will compare the received ESN to a "blacklist" of the ESNs of mobile stations which have been reported to be stolen. If a match is found, the stolen mobile station will be denied access.

Each of the cells C1–C10 is allocated a subset of the radio frequency (RF) channels assigned to the entire cellular system by the concerned government authority, e.g., the Federal Communications Commission (FCC) in the United States. Each subset of RF channels is divided into several voice or speech channels which are used to carry voice conversations, and at least one paging/access or control channel which is used to carry supervisory data messages, between each of the base stations B1–B10 and the mobile stations M1–M10 in its coverage area. Each RF channel comprises a duplex channel (bidirectional radio transmission path) between the base station and the mobile station. The RF channel consists of a pair of separate frequencies, one for transmission by the base station (reception by the mobile station) and one for transmission by the mobile station (reception by the base station). Each channel unit in the base stations B1–B10 normally operates on a preselected one of the radio channels allocated to the corresponding cell, i.e., the transmitter (TX) and receiver (RX) of the channel unit are tuned to a pair of transmit and receive frequencies, respectively, which is not changed. The transceiver (TX/RX) of each mobile station M1–M10, however, may tune to any of the radio channels specified in the system.

Depending on capacity needs, one cell may have 15voice channels, while another may have over a 100 voice channels, and corresponding channel units. Generally speaking, however, there is only one control channel (CC) in each omnidirectional or sector cell served by a base station, i.e., a base station serving an omnidirectional cell (FIG. 1) will have one control channel unit while a base station serving three sectors cells (FIG. 2) will have three control channel units. The RF (control and voice) channels allocated to any given cell may be reallocated to a distant cell in accordance with a frequency reuse pattern as is well known in the art. To avoid radio interference, all radio channels in the same cell will operate on different frequencies and, furthermore, the radio channels in any one cell will operate on a set of frequencies which is different from that used in any neighboring cell.

When in the idle state (turned on but not in use), each of the mobile stations M1–M10 tunes to and then continuously monitors the strongest control channel (generally, the control channel of the cell in which the mobile station is located at that moment) and may receive or initiate a telephone call through the corresponding one of the base stations B1–B10 which is connected to the mobile switching center MSC 20. When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system to find the "best" control channel (in the United States, there are 21 "dedicated" control channels in each AMPS system, i.e., their TX/RX frequencies are predefined and cannot be changed, which means that the mobile station has to scan a maximum number of 21 channels). When a control channel with good reception quality is found, the mobile station remains tuned to this channel until the quality deteriorates again. In this manner, all mobile stations are always "in touch" with the system.

While in the idle (standby) state, each of the mobile stations M1–M10 continuously determines whether a page message addressed to it has been received over the control channel. When, for example, an ordinary (landline) subscriber calls one of the mobile subscribers, the call is directed from the PSTN to the MSC 20 where the dialed number is analyzed. If the dialed number is validated, the MSC 20 requests some or all of the base stations B1–B10 to page the called mobile station throughout their corresponding cells C1–C10. Each of the base stations B1–B10 which receive the request from the MSC 20 will then transmit over the control channel of the corresponding cell a page message containing the MIN of the called mobile station. Each of the idle mobile stations M1–M10 will compare the MIN in the page message received over the control channel being monitored with the MIN stored in the mobile station. The called mobile station with the matching MIN will automatically transmit a page response over the control channel to the base station which forwards the page response to the MSC 20.

Upon receiving the page response, the MSC 20 selects an available voice channel in the cell from which the page response was received, turns the selected voice channel transceiver on, and requests the base station in that cell to order the mobile station via the control channel to tune to the selected voice channel (the MSC keeps a list of all of the channels in its service area and their status, i.e., free, busy, blocked, etc., at any time). A through-connection is established once the mobile station has tuned to the selected voice channel.

When, on the other hand, a mobile subscriber initiates a call, e.g., by dialing the telephone number of an ordinary subscriber and pressing the "send" button on the telephone handset in the mobile station, the MIN and ESN of the mobile station and the dialed number are sent over the control channel to the base station and forwarded to the MSC 20 which validates the mobile station, assigns a voice channel and establishes a through-connection for the conversation as before.

If the mobile station moves between cells while in the conversation state, the MSC will perform a "handoff" of the call from the old base station to the new base station. The MSC selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MSC via the new cell. The old voice channel in the old cell is marked idle in the MSC and may be used for another conversation.

In addition to call originations and page responses, an AMPS mobile station may access the cellular system for registrations. Two types of registrations are possible in AMPS: (i) periodic registration which is based on time or, more specifically, on the REGID value ("current time") and REGINCR value ("registration period") transmitted by the base station and the NXTREG value ("wake-up time") stored in the mobile station, and (ii) system area registration which is based on location or, more specifically, on the system identification (SID) transmitted in the serving cellular system. Periodic registration may be used to determine whether a mobile station is active (within radio range and switched on) or not in a cellular system. System area registration may be used to determine when a mobile station has crossed the border from one cellular system to another.

Upon receipt of a REGID message on the forward control channel (base station to mobile station), if registration is enabled in the serving cellular system, the mobile station compares the REGID value to the NXTREG value and compares the last received SID value with the value of the SID of the cellular system in which the mobile station last registered. If either the value of REGID is greater or equal to the value of NXTREG indicating that periodic registration is due, or the value of the last received SID is different than the value of the last stored SID indicating that the mobile station has travelled from one cellular system to another since the last successful registration, the mobile station will automatically send a registration access message over the reverse control channel (mobile station to base station) and will update the NXTREG value with the sum of the last received REGID value and REGINCR value, after receipt of a registration acknowledgement message on the forward control channel (the mobile station also updates the NXTREG value after each call origination or page response).

Radio Transmission Format

From its inception, the radio transmission format in cellular systems has been analog frequency modulation (FM). In each cell, the voice (analog) signals and data (digital) signals form the input signals to a transmitter (in the base station or the mobile station) which generates a sinusoidal carrier wave having a constant frequency corresponding to one of the frequencies allocated to the cell. With FM, the frequency of the carrier wave is modulated (varied) in proportion to the instantaneous amplitude of the input signal. The modulated carrier occupies a relatively narrow region of the spectrum about a nominal center frequency (the unmodulated carrier frequency). The resulting deviation of the modulated carrier wave frequency about the unmodulated (center) frequency is normally limited (by the use of bandpass filters) within a certain bandwidth, e.g., 30 KHz in the U.S., to avoid overlapping adjacent RF channels and causing adjacent channel interference. Each analog voice signal, therefore, occupies 30 KHz of spectrum, and a voice conversation requires 60 KHz.

In the conventional AMPS system, therefore, an analog speech signal modulates the carrier wave used for transmission over the RF channel. The AMPS system uses analog frequency modulation (FM) and is a single-channel-per-carrier (SCPC) system, i.e., one voice circuit (telephone conversation) per RF channel. The radio channel access scheme in the AMPS system is frequency division multiple access (FDMA) in which multiple users have access to the same set of RF channels, each user is assigned one of the available RF channels on demand, and different users are assigned different RF channels.

The Migration from Analog to Digital

Recent developments have ushered in a new digital era for cellular communications. The main driving force behind the switch to digital has been the desire to increase spectrum efficiency to meet the ever-increasing demands on system capacity. As each cellular system is allocated a finite amount of radio spectrum, capacity may be increased by reducing the amount of bandwidth required for each voice channel or, conversely, by sharing each RF channel among several voice conversations. This is made possible with the use of digital technology.

By encoding (digitizing and compressing) speech from several voice circuits prior to modulation and transmission, a single RF voice channel may be shared by several digital speech channels instead of being occupied by only one analog speech channel (one voice conversation). In this manner, the channel capacity and, consequently, the overall system capacity, may be increased dramatically without increasing the bandwidth of the voice channel. As a corollary, the cellular radio system is able to serve a substantially greater number of mobile stations at a significantly lower cost, e.g., a smaller number of channel units (transceivers) required in the base stations. Furthermore, the digital format facilitates integration of the cellular system with the emerging digital network.

In the United States, the migration from analog to digital has been spearheaded by the Electronics Industries Association (EIA) and the Telecommunication Industry Association (TIA). The EIA/TIA have undertaken the task of formulating a common air interface standard to meet industry requirements for the next generation digital cellular systems. To date, the EIA/TIA has published two separate air interface standards which are based on different radio channel multiple access schemes. The first EIA/TIA interim standard (IS) is based on a time division multiple access (TDMA) scheme and is known as the "Dual-Mode Mobile Station-Base Station Compatibility Standard" (IS-54B). The second standard is based on a code division multiple access scheme (CDMA) and is known as "Mobile Station-Base Station Compatibility Standard for Dual-Mode Wideband Spread Spectrum Cellular System" (PN-3118 to be published as IS-95). These standards are incorporated by reference herein (copies of the various revisions of IS-54B and PN-3118 may be obtained from the Electronics Industries Association; 2001 Pennsylvania Avenue, N.W.; Washington, D.C. 20006).

The term "dual-mode" in these two standards refers to the capability of the system to operate in either an analog or a digital mode. The analog mode of operation uses analog FM and draws on the older EIA/TIA-553 standard which is based on the AMPS standard. The digital mode of operation uses TDMA (IS-54B) or CDMA (PN-3118). The dual-mode capability facilitates the deployment of digital systems through a gradual reduction in analog capacity, i.e., the removal of RF channels from analog FM service to provide digital service. This was deemed desirable to ease the transition from analog to digital and to provide so-called "backward" compatibility with the existing analog system. Although the analog and digital modes of operation can exist alone, the goal is for them to coexist, at least in the short term, in order to allow roaming in existing systems which have not deployed the new digital technology. In the transition phase, existing analog-only mobile stations will continue to be served while the use of digital-capable mobile stations and base stations becomes more widespread.

A mobile station which complies with the defined specifications (IS-54B or PN-3118) can obtain service from an analog-only base station, a digital-only base station or an analog-digital (dual-mode) base station. The type of system serving the mobile station will depend on the availability of digital service (TDMA or CDMA) in the geographic area of the mobile station and the preference of the mobile subscriber. At call set-up or handoff, a dual-mode mobile stations can access either an analog voice channel (AVC) or, alternatively, a digital traffic channel (DTC). In analog-only or a digital-only mobile station, however, can only be assigned an AVC or DTC, respectively.

TDMA Systems

TDMA is a multiple access scheme which is based on time division multiplexing (TDM) techniques long used in the land-line telephone network to carry multiple telephone conversations simultaneously over one physical channel. In the wire-line telephone network, analog speech signals transmitted by local telephone subscribers over separate lines (subscriber loops) to the local telephone company (telco) central office are sequentially sampled and the amplitudes of the samples are quantized and then encoded into binary numbers represented by constant amplitude pulses in a process called pulse code modulation (PCM). A predetermined number of PCM channels (digital speech channels) are transmitted in a series of frames, each containing a burst of information (coded samples) from each of the PCM channels. The bursts from the different PCM channels occupy different time slots (time intervals) in each frame transmitted on the physical channel, e.g., copper wire plant. Most long-distance telephone calls are transmitted through the switching hierarchy using TDM. This technique can also be applied to transmissions on the RF channels of a cellular radio system.

An RF channel operating in TDM mode is divided into a series of repeating time slots (periodic train of time intervals) each containing a burst of information from a different data source, e.g., encoded speech from a source coder for a voice circuit. The time slots are grouped into frames of a predetermined duration. The number of time slots per frame varies depending on the number digital channels sought to be accommodated on the RF channel given the coding rates of the digital channels, the modulation level and the bandwidth of the RF channel. Each slot in a frame normally represents a different digital channel. The length of each TDM frame on the RF channel, therefore, is the minimum amount of time between two repeating time slots which are used by the same digital channel (assigned to the same user). In other words, each TDM frame consists of no more than one slot for each user.

According to IS-54B, each digital TDM RF channel can carry from three to six digital speech channels (three to six telephone conversations) depending on the source rate of the speech coder used for each digital speech channel (the modulation level and channel bandwidth are set in IS-54B). The speech coder for each digital traffic channel (DTC) can operate at either full-rate or half-rate (full-rate speech coders are expected to be used in the near future until half-rate coders are developed which produce acceptable speech quality). A full-rate DTC requires twice as many time slots in a given time period as a half-rate DTC. In IS-54B, each TDM RF channel can carry up to three full-rate DTCs or six half-rate DTCs.

The TDM RF channel frame structure for IS-54B is shown in FIG. 3. The TDM channel occupies one of the 30 KHz channels of the existing analog system. Each "frame" on the TDM RF channel comprises six equally sized time slots (1–6) and the length of the frame is 40 ms (25 frames per second). Each full-rate DTC uses two equally spaced slots of the frame shown in FIG. 3, i.e., slots 1 & 4, or slots 2 & 5, or slots 3 & 6. When operating at full-rate, the TDM RF channel may be assigned to three users (A-C), i.e., user A is assigned to slots 1 & 4; user B is assigned to slots 2 & 5; and user C is assigned to slots 3 & 6 of the "frame" shown in FIG. 3 (for full-rate, therefore, each TDM frame actually consists of three slots and not six slots, and is 20 ms long and not 40 ms long). Each half-rate DTC uses one time slot of the frame shown in FIG. 3. At half-rate, the TDM RF channel may be assigned to six users (A–F) with each of the users A–F being assigned to one of the six slots of the frame shown in FIG. 3 (for half-rate, each TDM frame actually consists of six slots and coincides with the definition of "frame" in IS-54B).

Hence, unlike an analog FDMA cellular system in which the base station and the mobile station transmit and receive continuously over an RF channel, a TDMA cellular system operates in a buffer and burst discontinuous transmission mode. Each mobile station transmits (and receives) in an assigned slot on the RF channel. At full rate, for example, the mobile station of user A would transmit on slot 1, hold for slot 2, receive in slot 3, transmit in slot 4, hold for slot 5, and receive in slot 6, and then repeat the cycle (the transmit and receive slots are offset from each other to avoid using duplexer circuitry which would otherwise be needed to allow the transmitter and receiver at the mobile station to operate simultaneously). The mobile station, therefore, transmits (or receives) in a fraction of the time (one third for full rate and one sixth for half-rate) and can be switched off to save power the rest of the time.

CDMA Systems

CDMA is a multiple access scheme which is based on spread spectrum communication techniques long used in military communications to counteract radio jamming and to protect against interception. Unlike FDMA and TDMA systems in which each transmission (signal), at any given time, is confined to its own separate frequency and its own distinct channel isolated from adjacent channels, CDMA systems transmit multiple signals simultaneously over the same spectrum band. The two chief spread spectrum techniques are frequency-hopping spread spectrum and direct-sequence or noise-modulated spread spectrum.

In frequency-hopping spread spectrum, a relatively wide band of frequencies (e.g., several MHz) is divided into a large number of much narrower channels. The transmitter "hops" from one channel to another, i.e., transmits a very short burst in one channel after another. The hopping sequence is pseudo-random, generated according to a key which is available to both transmitter and receiver. The total transmission, viewed over a longer period than the individual bursts, appears to occupy the entire bandwidth thus "spreading" the spectrum, although at any moment, for any one burst, it occupies only a small percentage of the channel. Many users can share the same channel with each user's transmissions following an orthogonal pseudorandom sequence of frequency hops.

The PN-3118 standard uses direct sequence or direct coding spread spectrum which is a digital version of noise modulation. In noise modulation, the original signal is added to (mixed with) a stronger noiselike signal with known characteristics. The resulting signal modulates a carrier for transmission to a receiver. At the receiver, a copy of the noiselike input to the transmitter is subtracted from the received signal to recover the original signal. In direct sequence, a fast rate pseudorandom binary sequence is used for the noiselike signal. This pseudonoise (PN) sequence is added to the digital information signal (e.g., digital speech) and the resulting bit stream is transmitted. At the receiver, the PN sequence is subtracted to yield the information signal. Because the transmitted signal has a high bit rate (e.g., 100 Mbps), a "spread spectrum" (i.e., wide band) is required (e.g., 100 MHz), as with frequency hopping spread spectrum. Unlike frequency-hopping spread spectrum, however, direct sequence spread spectrum transmissions occupy the entire channel bandwidth all of the time. Here also, many users can share the same channel with each user being assigned a code for generating the Orthogonal random sequence which is mixed with the information signal. The signals are separated in each receiver by using a correlator or a matched filter which accepts only signal energy from the assigned binary sequence for despreading.

FIG. 4 shows the overall structure of the forward (base station to mobile station) CDMA channel specified in PN-3118. The forward CDMA channel occupies a 1.23 MHz segment of spectrum centered on one of the 30 KHz channels of the existing analog system. According to PN-3118, the forward CDMA channel consists of up to 64 code channels (W0–W63) assigned to different uses, for example, a pilot channel (W0), a synchronization channel (W32), seven paging channels (W1–W7), and fifty five traffic channels (W8–W31 and W33–W63). Each of these code channels is spread by an orthogonal PN sequence at a fixed chip rate of 1.23 Mcps (a "PN chip" is one bit in the PN sequence). Multiple forward CDMA channels may be transmitted by a base station in a frequency division multiplexed manner.

The pilot channel carries an unmodulated direct sequence spread spectrum signal which is continuously transmitted on each active forward CDMA channel of a base station. A mobile station operating within the coverage area of the base station uses this signal for synchronization (acquisition, timing and phase reference for coherent demodulation) and for signal strength comparisons between base stations to determine when to handoff. Each base station uses a time offset of the pilot PN sequence to identify the forward CDMA channels. Different base stations are, therefore, identified by different pilot PN sequence offsets.

The sync channel is used by the mobile station to obtain system configuration and timing information (e.g., system identification, system time, pilot PN sequence offset, paging channel data rate, etc.). Each traffic channel (user) is identified by a distinct long code sequence (1.23 Mcps) which is added to the information bits prior to spreading by the PN sequence. Each paging channel is divided into a number of 80 ms time slots. A mobile station can operate in either "slotted" or "non-slotted" mode for purposes of receiving paging and control messages on the paging channel. In the slotted mode, the mobile station monitors the paging channel only during certain assigned slots. In the non-slotted mode, the mobile station monitors all slots of the paging channel.

Hybrid Systems

Some systems use a combination of access methods. The IS-54B digital cellular standard, for example, uses a combination of FDMA and TDMA. More specifically, IS-54B uses 30 Khz FDMA channels which are subdivided into 3 or 6 time slots for TDMA transmissions (3 or 6 voice calls per 30 Khz of bandwidth). Similarly, the CDMA system can also be a hybrid of FDMA and CDMA techniques where the total system bandwidth is divided into a set of wideband channels, each of which contains a large number of CDMA signals.

Personal Communications Services (PCS)

Cellular telephony had its origin in the provision of car telephone service. More recently, however, there has been an increasing shift towards the use of lightweight pocket telephones in homes, offices, public meeting places, and in virtually any other place the user can obtain service. The next step in this evolution is the emerging concept of "personal communication services" (PCS), or what has sometimes been referred to as services at "walking speeds." The idea is that not only telephone calls but also facsimile, computer data, paging messages and even video signals can be transmitted and received by a user moving around, for example, inside a building, a factory, a warehouse, a shopping mall, a convention center, an airport, or an open area.

PCS systems operate on lower power, and use smaller cellular structures than conventional wide area (vehicular) cellular systems, to provide the high-quality, high-capacity radio coverage needed for business and other applications. By reducing the transmit power of the base station, the size of the cell (or cell radius) and, with it, the frequency reuse distance are reduced resulting in more channels per geographic area. Additional benefits of a smaller cell include a longer talk-time (battery life time) for the user since the mobile station will use substantially lower transmit power than in a larger cell.

The industry has grown accustomed to using the terms "macrocell," "micocell," and "picocell" to distinguish the relative size of the cells required for a particular application (indoor or outdoor). The term "macrocell" generally refers to a cell which is comparable in size to cells in a conventional cellular telephone system (e.g., a radius of 1 Km or more). A macrocell serves rapidly moving users and covers low to medium usage areas. The terms "microcell" and "picocell," on the other hand, refer to the progressively smaller cells which are used in a PCS system, for example. A microcell serves the slowly moving users and may cover a public indoor or outdoor area, e.g., a convention center or a busy street. A picocell may cover an office corridor or a floor of a high rise building. Microcells and picocells can also cover high-density pedestrian areas or busy thoroughfares (streets or highways) in a conventional cellular system.

It is now clear that future cellular systems will likely implement a hierarchial cell structure of macrocells, microcells and picocells. From a system (MSC) perspective, the base stations in the microcells and picocells can be viewed as extensions of the base stations in adjoining or overlapping macrocells. In this case, the microcell and picocell base stations may be connected to the macrocell base station via digital transmission lines, for example. Alternatively, the microcells and picocells may be treated just like macrocells and be connected directly to the MSC.

From a radio coverage perspective, the macrocells, microcells and picocells may be distinct from each other or, alternatively, overlaid one on top of the other to handle different traffic patterns or radio environments. For example, handoff between microcells may sometimes be difficult to perform around street corners, particularly where the users are moving so rapidly that the signal strength variations are in excess of 20 dB per second. In this situation, it may be possible to use an "umbrella" macrocell for the rapidly moving users and to use microcells for the slowly moving users. By managing different types of users differently in this way, handoff between microcells may be avoided for the rapidly moving users which are subject to the severe street corner effects.

It will be readily appreciated that the capacity improvements sought for the next generation cellular systems can be achieved by more advanced macrocellular technology, e.g., digital TDMA or CDMA, or by the introduction of microcells and picocells to the specific areas where increased capacity is needed, or by a combination of both approaches. Thus, for example, analog microcells may be implemented to cover "dead spots" (areas where topography, zoning or other restrictions prevent penetration of radio signals) or "hot spots" (areas with heavy localized traffic). In this instance, coverage or capacity may be improved for the existing Subscriber base of analog mobile stations. The effectiveness of the microcellular concept in increasing capacity, however, is maximized by the use of digital technology which requires new digital-capable mobile stations.

Control Channel

The continued need to serve existing analog-only mobile stations has led to the specification in IS-54B and PN-3118 of an analog control channel (ACC) which has been inherited from the prior AMPS or the equivalent EIA/TIA-553 standard. According to EIA/TIA-553, the analog forward control channel (FOCC) on the down-link from the base station to the mobile stations carries a continuous data stream of messages (words) in the format shown in FIG. 4. Several different types (functional classes) of messages may be transmitted on the analog FOCC. These messages include a system parameter overhead message (SPOM), a global action overhead message (GAOM), a registration identification message (REGID), a mobile station control message, e.g., a paging message, and a control-filler message. The SPOM, GOAM and REGID are overhead messages which are intended for use by all mobile stations in the coverage area of the base station. Overhead messages are sent in a group called an overhead message train (OMT). The first message of each OMT must always be the SPOM which is transmitted every 0.8±0.3 seconds.

The format of the analog FOCC shown in FIG. 4 requires an idle mobile station listening to the FOCC to read all the messages transmitted in each OMT (not just paging messages) even though the information contained in these messages may not have changed from one OMT to the next OMT. This requirement tends to unnecessarily limit the mobile station battery life. One of the goals of the next generation digital cellular systems, however, is to extend the "talk time" for the user, that is, the battery life of the mobile station. To this end, the co-pending U.S. patent application Ser. No. 07/956,640 (incorporated herein by reference) discloses a digital FOCC which can carry the types of messages specified for the analog FOCC, but in a format which allows an idle mobile station to read overhead messages when locking onto the FOCC and thereafter only when the information has changed, and to enter "sleep mode" at all other times. While in sleep mode, the mobile station turns off most internal circuitry and saves battery power.

The above-referenced, co-pending U.S. patent application Ser. No. 07/956,640 shows how a digital control channel (DCC) may be defined alongside the digital traffic channels (DTC) specified in IS-54B. Referring to FIG. 3, a half-rate DCC would occupy 1 slot, while a full-rate DCC would occupy 2 slots, out of the 6 slots in each 40 ms frame. For additional DCC capacity, additional half-rate or full-rate DCCs may be defined in place of the DTCs until there are no more available slots on the carrier (DCCs may then be defined on another carrier if needed). Each IS-54B RF channel, therefore, can carry DTCs only, DCCs only, or a mixture of both DTCs and DCCs. Within the IS-54B framework, each RF channel can have up to 3 full-rate DTCs/DCCs, or 6 half-rate DTCs/DCCs, or any combination in-between, for example, one full-rate and four half-rate DTCs/DCCs.

In general, however, the transmission rate of the DCC need not coincide with the half-rate and full-rate specified in IS-54B, and the length of the DCC slots may not be uniform and may not coincide with the length of the DTC slots. FIG. 6 shows the more general case of a forward DCC configured as a series of time slots. These DCC slots may be defined on an IS-54B RF channel and may consist, for example, of every nth slot in the TDM stream. In this case, the length of each DCC slot may or may not be equal to 6.66 ms, which is the length of a DTC slot according to IS-54B (there are 6 DTC slots in each 40 ms frame). Alternatively (and without limitation on other possible alternatives), these DCC slots may be defined on the paging channel specified in PN-3118 but may or may not be 80 ms long, which is the length of each paging channel slot according to PN-3118.

The DCC slots shown in FIG. 6 may be organized into higher-level structures called "superframes." Each superframe consists of logical channels which carry different kinds of information. One or more DCC slots may be allocated for each logical channel in the superframe. FIG. 6 shows an exemplary superframe which includes at least three logical channels, namely, a broadcast control channel (BCCH), a paging channel (PCH), and an access response channel (ARCH). The BCCH, which in this example is allocated 6 DCC slots, carries overhead messages. The PCH, which is allocated one DCC slot, carries paging messages. The ARCH, which is also allocated one DCC slot, carries channel assignment and other messages. The exemplary superframe of FIG. 6 may contain other logical channels, including additional paging channels. If more than one PCH is defined, different groups of mobile stations identified by different traits (e.g., last digit of MIN) may be assigned to different PCHs.

For purposes of efficient sleep mode operation and fast cell selection, the BCCH may be divided into a number of subchannels. The co-pending U.S. patent application Ser. No. 07/956,640 discloses a BCCH structure which allows the mobile station to read only a minimum amount of information at power up (when locking onto a DCC) before being able to access the system (place or receive a call). After power up, the idle mobile station needs to regularly monitor only its assigned PCH (paging slot) in each superframe and can return to sleep mode during other slots.

SUMMARY OF THE INVENTION

In one aspect, the present invention provides a method for communicating information to a remote station which comprises the steps of grouping the information into a plurality of time slots; grouping the time slots into a plurality of superframes; grouping the superframes into a plurality of paging frames; assigning the remote station to one of the time slots in each of the paging frames, the assigned slot being used for paging the remote station; and sending to the remote station in the assigned slot an indication of a change in paging frame.

In another aspect, the present invention provides a method for registration of a remote station with a communications system comprising the steps of sending a registration number from the system to the remote station; comparing in the remote station the received registration number with a list of registration numbers stored in memory; sending a registration message from the remote station to the system if the registration number is found in the list; sending a list of registration numbers from the system to the remote station; and replacing the list of registration numbers stored in the remote station with the list of registration numbers received from the system.

In yet another aspect, the present invention provides a method for acknowledging registration of remote stations, each of which is assigned an identity number, with a communications system comprising the steps of receiving a plurality of registration messages sent from the remote stations; and transmitting to at least two of the remote stations an acknowledgement message containing the identity numbers of at least the two remote stations.

In a further aspect, the present invention provides a method for communicating information to a remote station comprising the steps of grouping the information into a plurality of repeating time slots; grouping the time slots into a plurality of superframes; assigning the time slots in the superframes to a plurality of logical channels; and varying the repetition rate of messages transmitted in at least one of the logical channels.

In another aspect, the present invention provides a method for identifying to a remote station the services available in one of a plurality of communication systems comprising the steps of assigning an operator code to each of the systems; storing in the remote station a list of the services associated with each of the operator codes; sending from the remote station a request for an operator code; and sending the operator code from one of the systems to the remote station.

In yet another aspect, the present invention provides a method for communicating information to a remote station comprising the steps of grouping the information into a plurality of time slots; grouping the time slots into a plurality of superframes; and sending in each slot in each of the superframes superframe phase information to enable the remote station to identify the start of each superframe.

In a further aspect, the present invention provides a method for supervising the transmission of messages from a communications system to a remote station comprising the steps of segmenting each message into layer two (L2) frames; sending the frames over a first channel from the system to the remote station; sending over a second channel from the system to the remote station an indication of the identity of the remote station; and sending over a third channel from the remote station to said system, if the identity indication matches an identity indication stored in the remote station, an indication of whether each of the frames has been received correctly.

In another aspect, the present invention provides a method of registration of a remote station with a communications system comprising the steps of sending from the system to the station a message containing a list of communication channels in neighboring cells, an indication of whether registration is required in each of the corresponding cells and an indication of signal strength hystersis for each cell; and using the signal strength hystersis for selecting one of the channels if registration is required in the corresponding cell.

BRIEF DESCRIPTION OF THE DRAWINGS

The present invention will be better understood and its numerous objects and advantages will become apparent to those skilled in the art by reference to the following drawings in which:

FIG. 9 shows exemplary slot formats on the DCC;

FIG. 10 shows the BRI field in FIG. 9C;

FIG. 11 shows the partitioning of the data before channel encoding.

FIG. 12 shows the mapping of the CPE into the slot format;

FIG. 13 shows the R/N field in FIG. 9C;

FIG. 14 shows the CFSP field in FIG. 9C;

FIG. 15 shows the Hyperframe structure;

FIG. 16 shows the Paging frame structure;

FIG. 21 shows an L3 acknowledged dialogue between MS and BS;

FIGS. 22A–L show RACH Layer 2 Frames;

FIGS. 23A–C show F-BCCH Layer 2 Frames;

FIGS. 24A–C show E-BCCH Layer 2 Frames;

FIGS. 25A–C show F-BCCH Layer 2 Frames;

FIGS. 26A–N show SPACH Layer 2 Frames;

DETAILED DESCRIPTION

Although the description hereinafter focuses on systems which comply with IS-54B, the principles of the present invention are equally applicable to a variety of wireless communication systems, e.g., cellular and satellite radio systems, irrespective of the particular mode of operation (analog, digital, dual-mode, etc.), the access technique (FDMA, TDMA, CDMA, hybrid FDMA/TDMA/CDMA, etc.), or the architecture (macrocells, microcells, picocells, etc.). As will be appreciated from the preceding discussion of FDMA, TDMA and CDMA systems, the logical channel which carries speech and/or data may be implemented in different ways at the physical layer level. The physical channel may be, for example, a relatively narrow RF band (FDMA), a time slot on a radio frequency (TDMA), a unique code sequence (CDMA), or a combination of the foregoing. For purposes of the present invention, therefore, the term "channel" means any physical channel which can carry speech and/or data, and is not limited to any particular mode of operation, access technique or system architecture.

The description below, together with the description in Appendix A hereto, provide a detailed framework for operation on the AVC, ACC, DTC and DCC. The description below is primarily directed to the DCC air interface and is divided into distinct sections for Layer 1, Layer 2 and Layer 3 operation. Appendix A addresses the air interface requirements for the ACC, DTC and AVC through modifications to the IS-54B standard. In what follows, the term "IS-54B" shall mean the existing IS-54B standard, or the IS-54B standard as amended by Appendix A, depending on the context.

GLOSSARY OF TERMS

Figure 7:
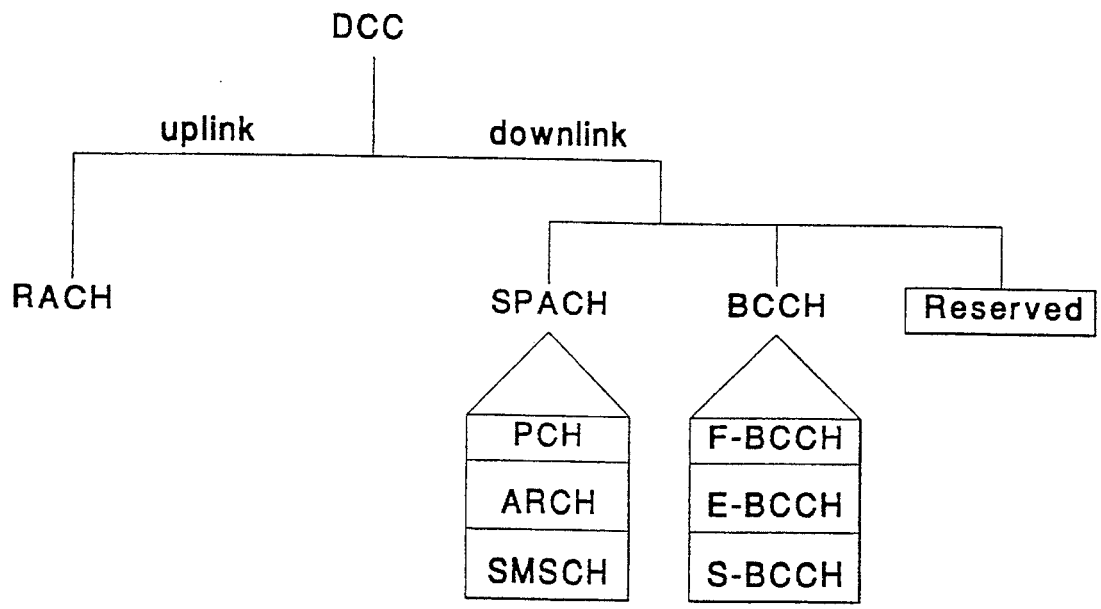
FIG. 7 shows the logical channels of the DCC.

ACC Analog control channel
AG Abbreviated guard time
ARCH Access response channel
ARQ Automatic retransmission request
AVC Analog voice channel
BC Begin Continue
BCN Broadcast channel change notification flag
BER Bit error rate
BMI Base station, MSC and interworking function
BMR Base measurement requirement
BP Bit position
BRI Busy Reserved Idle
BS Base station
BSCO Base station challenge order
BSMC Base station manufacture code
BT Burst type
BU Burst usage
CDL Coded DCC locator
CDVCC Coded DVCC
CLI Continuation length indicator
CPE Coded partial echo
CR Continue repeat
CRC Cyclic redundancy check
CSFP Coded superframe phase
DCC Digital control channel
DL DCC locator
DTC Digital traffic channel
DVCC Digital verification color code
E-BCCH Extended broadcast control channel
ECS Extended broadcast channel cycle start
F-BCCH Fast broadcast control channel
FRNO Frame number
G Guard time
HP Hyperframe
IDT Mobile station identity type
IMSI International mobile station identification
L3DATA Layer 3 data
L3LI Layer 3 message length indicator
MAC Media access control
MACA Mobile assisted channel allocation
MAHO Mobile assisted handoff
MLRQ Monitoring of radio link quality
MS Mobile station
MSC Mobile telephone service center
MSID Mobile station identification
PCH Paging channel
PCON Page continuation
PE Partial echo
PF Paging frame
PFM Paging frame modifier
PREAM Preamble
R Ramp time
R/N Received/not received
RACH Random access control channel
RDCC Reverse digital control channel
RSS Received signal, strength
RSVD Reserved
S-BCCH Short message service-Broadcast control channel
SAP Service access point
SCF Shared control feedback
SF Superframe
SMS Short message service
SMSCH Short message service point to point channel
SMSN Broadcast short message service change notification
SOC System operator code
SPACH SMS, PCH and ARCH
SSD Shared secret data
SYNC Synchronization
SYNC+ Additional SYNC for abbreviated RACH burst
TDMA Time division multiplex access
TID Transaction identifier
WER Word error rate
DCC Logical Channel Definition The DCC comprises the logical channels shown in FIG. 7. The DCC logical channels include the BCCH (F-BCCH, E-BCCH, S-BCCH), SPACH, PCH, ARCH, SMSCH and RACH.

Broadcast Control Channel (BCCH)

The BCCH is an acronym used to refer collectively to the F-BCCH, E-BCCH and S-BCCH logical channels. These 3 logical channels are used, in general, to carry generic, system-related information. The attributes of these 3 channels are: unidirectional (downlink), shared, point-to-multipoint, and unacknowledged.

Fast Broadcast Control Channel (F-BCCH) This logical channel is used to broadcast time critical system information.

Extended BCCH (E-BCCH)

This logical channel is used to broadcast system information that is less critical than the information sent on the F-BCCH.

SMS Broadcast BCCH (S-BCCH)

This logical channel is used to broadcast short messages used for the SMS broadcast service.

SMS Point to Point Paging and Access Response Channel (SPACH)

This logical channel is used to send information to specific mobile stations regarding SMS point-to-point (SMSCH) paging and to provide an access response channel (ARCH) as described below. The SPACH may be considered to be further subdivided into 3 logical channels, the SMSCH, ARCH and PCH, as also described below. The attributes of the SPACH are: unidirectional (downlink), shared, and unacknowledged. The SMSCH is point-to-multipoint. The ARCH and SMSCH are point-to-point.

Paging Channel (PCH)

This logical a subset of the SPACH dedicated to delivering pages and orders.

Access Response Channel (ARCH)

This logical channel is a subset of the SPACH to which the mobile station autonomously moves upon successful completion of an access on an RACH. The ARCH may be used to convey AVC or DTC assignments or other responses to the mobile access attempt. Layer 2 ARQ is possible using acknowledgement message(s) on the RACH.

SMS Point-to-Point Channel (SMSCH)

This logical channel is used to deliver short messages to a specific mobile station receiving SMS services.

Random Access Channel (RACH)

This logical channel is a random access channel used to request access to the system. The attributes of this channel are: unidirectional (uplink), shared, point-to-point, and acknowledged. Contention resolution and/or collision avoidance feedback is provided on the corresponding forward subchannel.

Layered Approach

For a better understanding of the structure and operation of the present invention, the DCC may be divided into three (3) layers: Layer 1 (physical layer), Layer 2 and Layer 3. The physical layer (L1) defines the paramaters of the physical communications channel, e.g., RF spacing, modulation characteristics, etc. Layer 2 (L2) defines the techniques necessary for the accurate transmission of information within the constraints of the physical channel, e.g., error correction and detection, etc. Layer 3 (L3) defines the procedures for reception and processing of information transmitted over the physical channel.

Physical Layer

Radio Frequency Carrier Spacing and Designation

The radio frequency carrier spacing and designation used in IS-54B may also be used in the present invention.

Modulation Characteristics

The modulation characteristics of the radio frequency carrier can be similar to those of IS-54B.

TDMA Frame Structure

Figure 1:
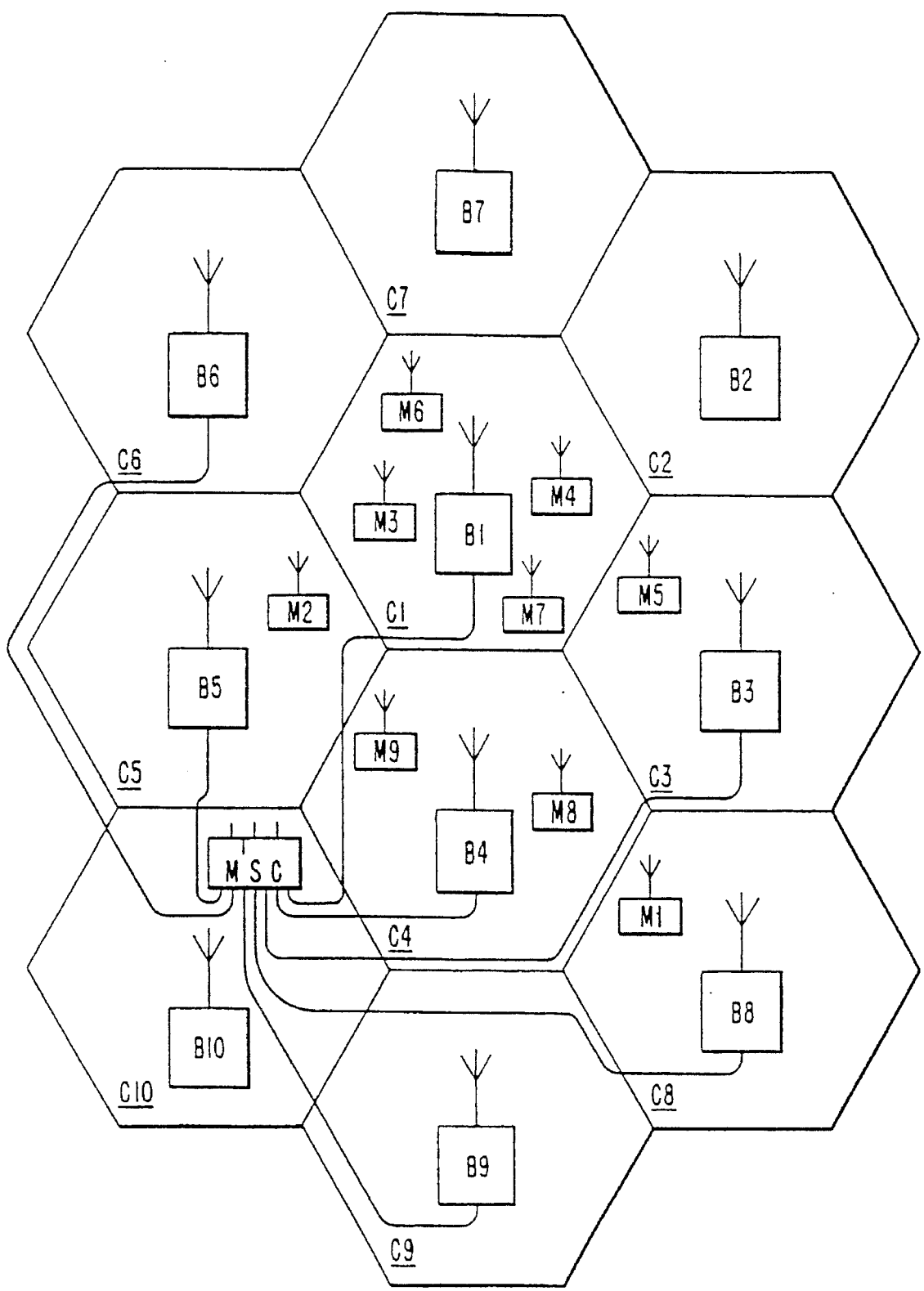
FIG. 1 shows the architecture of a conventional cellular radio system.
Figures 2, 3, 5:
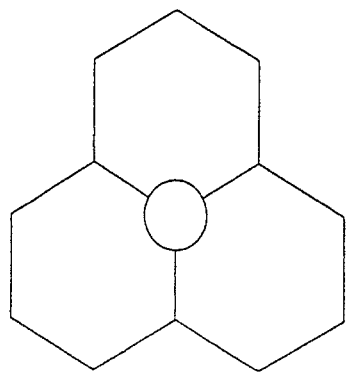
FIG. 2 shows a three sector cell which may be used in the system shown in FIG. 1.
FIG. 3 shows the structure of the forward time division multiple access (TDMA) channel according to IS-54B, a known cellular industry standard.
FIG. 5 shows the format of the forward analog control channel (ACC) specified IS-54B and PN-3118.
Figure 8:
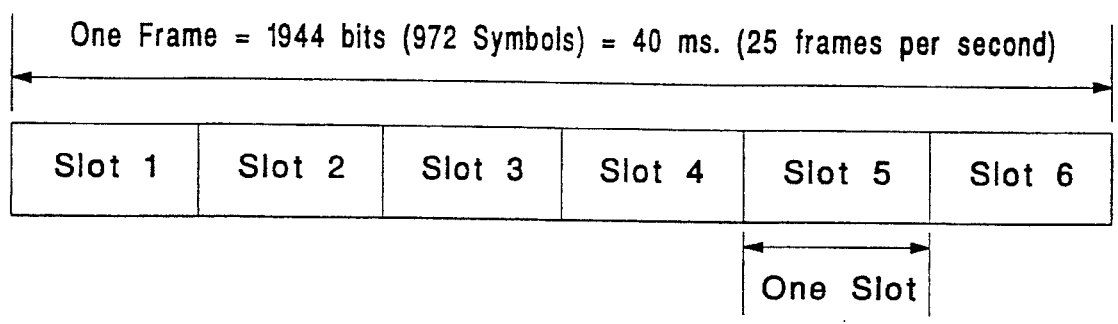
FIG. 8 shows an exemplary TDMA frame structure.
Figure 4:
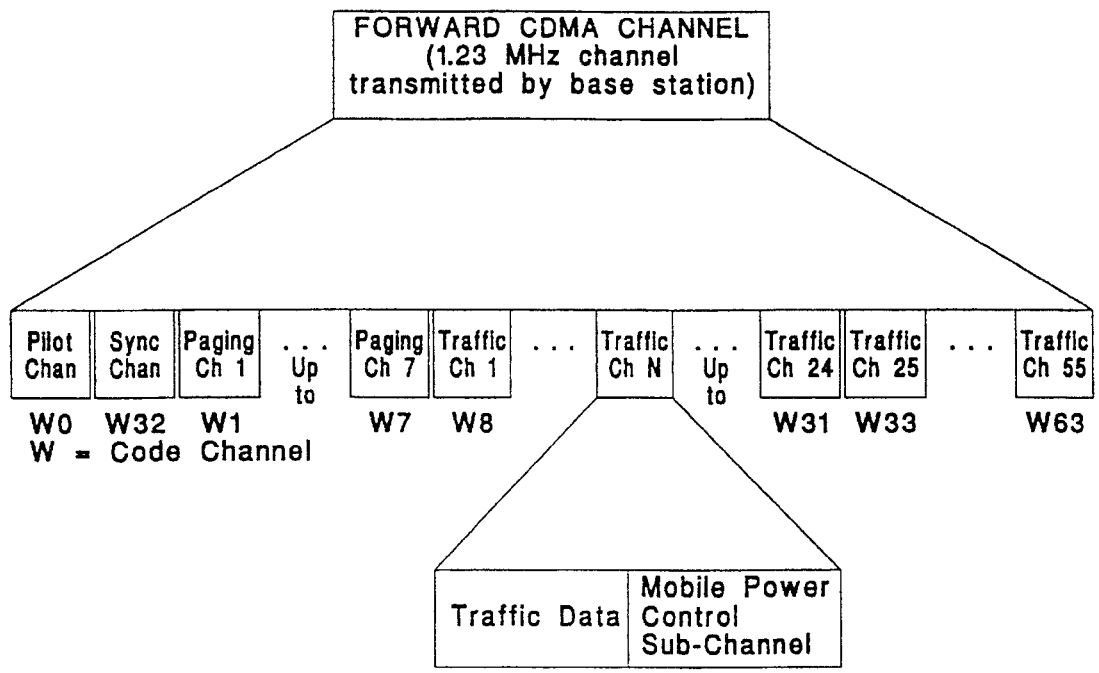
FIG. 4 shows the structure of the forward code division multiple access (CDMA) channel according to PN-3118, another known cellular industry standard.
Figure 6:
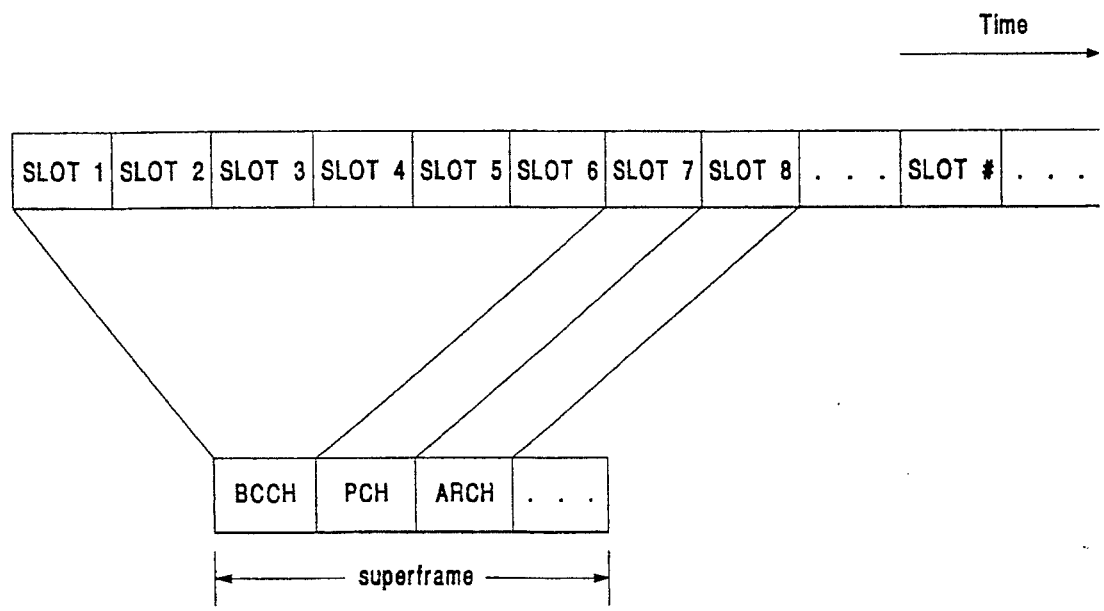
FIG. 6 is a generalized view of a digital control channel (DCC) having time slots which are grouped into superframes.

An exemplary frame structure is shown in FIG. 8 (FIG. 8 is similar to FIG. 3). The frame length on each DCC TDMA RF channel is 40 milliseconds (MS). Each frame consists of six equally-sized time slots (1–6), exactly 162 symbols (324 bits) in length. The Bit Position (BP) of forward and reversed slots/bursts are numbered sequentially from 1 to 324.

TDMA Slot Structure

Possible slot formats for the DCC uplink and downlink are shown in FIG. 9. FIG. 9A shows the normal slot format MS-BS on DCC. FIG. 9B shows the abbreviated slot format for MS-BS on DCC. FIG. 9C shows the slot format for BS-MS on DCC.

In the forward direction, the first transmitted bit of the SYNC word has BP=1 and the last transmitted bit of the RSVD field has BP equal to 324. In the reverse direction, the first transmitted bit of the Guard has BP=1. In the normal slot format, the last transmitted bit of the DATA field has BP equal to 324. In the abbreviated slot format, the last transmitted bit of the AG field has BP equal to 324.

AG

The field AG denotes guard time for the abbreviated access burst format. The field is 22 symbols (44 bits) in length.

BRI

The field BRI is used to indicate whether the channel is Busy, Reserved or Idle. The field totals 6 bits in length and is divided into two 3 bit fields. The bits of the BRI are transmitted as shown in FIG. 10.

DATA

User data bits are mapped onto the Field DATA for transmission. In the forward direction, the field is 260 bits in length. In the reverse direction, the length of the DATA field is 244 bits for the full length slot format and 200 bits for the abbreviated slot format.

Encoding

FIG. 11 shows the partitioning of the data before channel encoding. All logical channels, BCCH, SPACH and RACH (normal and abbreviated), use a ½ rate convolutional encoding. The same encoding polynomials as for full rate speech in IS-54B may be used. The first bit received from Layer 3 is the left most bit in FIG. 11 and shall be the first bit delivered to channel encoding. The last five bits sent to the channel encoder are set to zero (tail bits). The CRC polynomial may be the same as in IS-54B. Generally, the DVCC is added as information bits when calculating the CRC as in IS-54B. However, for the F-BCCH, the DVCC value is set to zero before calculating the CRC.

The length of the Information field in FIG. 11 depends on the burst length (See FIGS. 9A–C):
SPACH and BCCH:=130–16–5=109
RACH (normal length):=122–16–5=101
RACH (abbreviated length)=100–16–5=79

Interleaving

For all channel types and burst lengths, all bits are sent within one burst, i.e., only intra-burst interleaving is performed. The output bits from the interleaver are sent in sequential order, i.e., the first bit out is the first bit transmitted in the first Data field. After the first Data field has been completed, the output of the interleaver is sent in the first position in the second Data field.

Downlink (SPACH)

The 260 encoded data bits are interleaved in a 13 rows by 20 columns matrix. The data bits are placed into a rectangular interleaving array as shown in the matrix below, where the bits have been numbered 0–259, corresponding to their order at the output of the encoder. The data bits are entered into the array column-wise. The bits are then transmitted row-wise using the following algorithm:

```
Do row = 0 to 12
    Do column = 0 to 19
        Transmit (array(row, column))
    End Do
End Do
```

$$\begin{vmatrix} 0 & 13 & 26 & \ldots & 234 & 247 \\ 1 & 14 & 27 & \ldots & 235 & 248 \\ 2 & 15 & 28 & \ldots & 236 & 249 \\ . & . & . & . & . & . \\ . & . & . & . & . & . \\ . & . & . & . & . & . \\ 11 & 24 & 37 & \ldots & 245 & 258 \\ 12 & 25 & 38 & \ldots & 246 & 259 \end{vmatrix}$$

Thus, the bits are transmitted in the order of:

0,13,. . .,247 (row 1),
1,14, . . . , 248 (row 2),
.
.
.
12,25, . . . , 259 (row 13).

Uplink
Normal Length Burst

The 244 encoded data bits are interleaved in a 12 rows by 20 columns matrix with an extra partial column of 4 bits. The data bits are placed into a rectangular interleaving array as shown in the matrix below, where the bits have been numbered 0–243, corresponding to their order at the output of the encoder. The data bits are entered into the array column-wise. The bits are then transmitted row-wise using the following algorithm:

```
Do row = 0 to 3
    Do column = 0 to 20
        Transmit (array(row, column))
    End Do
End Do
Do row = 4 to 11
    Do column = 0 to 19
        Transmit (array(row, column))
    End Do
End Do
```

$$\begin{vmatrix} 0 & 12 & 24 & \ldots & 228 & 240 \\ 1 & 13 & 25 & \ldots & 229 & 241 \\ 2 & 14 & 26 & \ldots & 230 & 242 \\ 3 & 15 & 27 & \ldots & 231 & 243 \\ \cdot & \cdot & \cdot & & \cdot & - \\ \cdot & \cdot & \cdot & & \cdot & \\ \cdot & \cdot & \cdot & & \cdot & \\ 11 & 23 & 35 & \ldots & 239 & - \end{vmatrix}$$

Thus, the bits are transmitted in the order of:

0,12,. . .,240 (row 1),
1,13, . . . , 241 (row 2),
.
.
.
11,23, . . . , 239 (row 12).

Abbreviated Length Burst

The 200 encoded data bits are interleaved in a 12 rows by 16 columns matrix with an extra partial column of 8 bits. The data bits are placed into a rectangular interleaving array as shown in the matrix below, where the bits have been numbered 0–199, corresponding to their order at the output of the encoder. The data bits are entered into the array column-wise. The bits are then transmitted row-wise using the following algorithm:

```
Do row = 0 to 7
    Do column = 0 to 16
        Transmit (array(row, column))
    End Do
End Do
Do row = 8 to 11
    Do column = 0 to 15
        Transmit (array(row, column))
    End Do
End Do
```

$$\begin{vmatrix} 0 & 12 & 24 & \ldots & 180 & 192 \\ 1 & 13 & 25 & \ldots & 181 & 193 \\ 2 & 14 & 26 & \ldots & 182 & 194 \\ \cdot & \cdot & \cdot & & \cdot & \\ \cdot & \cdot & \cdot & & \cdot & \\ \cdot & \cdot & \cdot & & \cdot & \\ 10 & 22 & 36 & \ldots & 190 & - \\ 11 & 23 & 35 & \ldots & 191 & - \end{vmatrix}$$

Thus, the bits are transmitted in the order of:

0,12, . . . , 192 (row 1),
1,13, . . . , 193 (row 2),
.
.
.
11,23,. . .,191 (row 12).

G

Field G in FIGS. 9A–B provides guard time and is 3 symbols (6 bits) in duration. During this time, the ms shall maintain carrier-off condition.

CPE

The Partial Echo (PE) in FIG. 9-C is used to identify which mobile was captured after the initial burst of a random access, or to identify for which mobile a slot is marked as reserved. The channel encoding of the PE into CPE is similar to how CDVCC is handled in IS-54B (i.e., a (12,8) code). The d7 bit in IS-54B is omitted (set to zero) in the encoding process and not transmitted as part of CDL. The LSB of PE is d0. After the encoding, according to the IS-54B CDVCC process, the mapping into the slot format is as shown in FIG. 12. The check bits $b_3$, $b_2$, $b_1$ and $b_0$ are all inverted, i.e., EXORed with (1, 1, 1, 1), before forming the resulting CDL information.

PREAM

The PREAM (preamble) field in FIGS. 9A–B allows the BS to perform automatic gain control (AGC) and obtain symbol synchronization before the subsequent data and burst synchronization portions of the received burst are reached. The field consists of the bit pattern 1001 repeated four times.

R

The R field in FIGS. 9A–B denotes a power ramp-up interval and is 3 symbols (6 bits) in duration.

R/N

The R/N field in FIG. 9 is used to convey the received/not received status of individual bursts sent to the base station on the RACH. The bits of the R/N are transmitted as shown in FIG. 13.

RSVD

These two bits are set to 11 (FIG. 9C).

CSFP (Coded Super Frame Phase)

The CSFP field in FIGS. 9C is used to convey information regarding the Superframe Phase (SFP) so that mobile stations can find the start of the superframe. The content in this field may also be used to discriminate between DCC and DTC in that the CSFP of a DCC and the CDVCC of a DTC have no common codewords. This is accomplished by using the same basic coding method together with changing the checkbits of all CSFP codewords before transmission. The CFSP field is 12 bits in length.

The channel encoding of the SFP into CSFP is similar to how DVCC is handled in IS-54B (i.e. a (12,8) code). The least significant bit (LSB) of SFP, i.e., the bit which is incremented each TDMA block is d0 (a TDMA block is 20 ms. long). The bits d7, d6 and d5 are reserved and all set to zero (000). After the encoding, according to the IS-54B DVCC process, the check bits $b_3$, $b_2$, $b_1$, $b_0$ are all inverted, i.e., EXORed with (1,1,1,1,), and denoted $\bar{b}_3$, $\bar{b}_2$, $\bar{b}_1$, $\bar{b}_0$, before forming the resulting CSFP information. The bits are transmitted as shown in FIG. 14 (exact as CDVCC).

SYNC

The SYNC word in FIGS. 3A–C may be similar in content and function to the SYNC word in IS-54B.

SYNC+

The SYNC+ field in FIGS. 9A–B provides additional synchronization information to improve BS receiver performance. The SYNC+word is specified by the following phase changes in radians: $\pi/4$, $-\pi/4$, $3\pi/4$, $-3\pi/4$, $-\pi/4$, $-\pi/4$, $-3\pi/4$, $3\pi/4$, $3\pi/4$, $\pi/4$, $\pi/4k$ and $-\pi/4$.

Superframe

Superframe Definition

A Superframe is defined as the interval between non-consecutive F-BCCH slots. The length of the Superframe (SF) is fixed. The length is 32 TDMA blocks (16 for half rate), i.e., 32*20=640 ms. The Superframe Phase counter is hence assigned 5 bits. The first F-BCCH SFP value in a Superframe is assigned the value 0, the next slot of the same logical DCC is assigned 1, etc. For half rate DCC, the values 0, 2, 4, . . . are used in the consecutive bursts assigned to the DCC.

Master and Slave DCC

A DCC may be a master or slave DCC. Each frequency carrying a DCC must have one master DCC assigned to time slot 1, and may have additional slave DCCs. Only a master DCC carries BCCH. A MS assigned to a slave DCC uses the BCCH on the corresponding master DCC.

DCCs on Different Frequencies

If several DCCs are assigned to different frequencies so that there are several master DCCs, a different number of slots may be allocated to the combined BCCH (F-BCCH, E-BCCH and S-BCCH) on each master DCC. Layer ⅔ information may also be different for each master DCC. A mobile station must therefore always acquire all its BCCH information on the same frequency as its PCH channel (see PCH allocation Algorithm below). The first step in the PCH assignment algorithm is to select the frequency. If the MS is assigned to a different frequency than the one it is currently locked onto, it must re-read the DCC structure message on the new frequency before it continues with the PCH slot assignment calculation.

Hyperframe Definition

The hyperframe structure is shown in FIG. 15. A Hyperframe (HP) consists of two Superframes. Every SPACH in the first Superframe is always repeated in the second Superframe. This is denoted "specification guaranteed repeat". The slots in the first SF in an HF are referred to as "primary" while the slots in the second SF are referred to as "secondary". The F-BCCH carries the same information in every Superframe until a change flag toggles (changes value) in the PCH. At this point, new data may be placed on the F-BCCH. The E-BCCH and S-BCCH information may be different from SF to SF.

Rules of SPACH Continuation

If the PCON bit in the assigned PCH is set, the mobile station shall read a number of additional SPACH slots indicated by the parameter PCH_DISPLACEMENT which is sent on the BCCH. The additional slots to be read are separated by 40 ms from the assigned PCH for both full and half rate DCC. For full rate DCC operation, this means that the mobile station reads every other SPACH slot up to the limit indicated by the information element PCH_DISPLACEMENT. BCCH slots and reserved slots are not be counted as part of the page reading continuation process.

The transmission of ARCH or SMSCH messages to one mobile station may be interrupted to allow for the transmission of messages to another mobile station. Each interruption of an ARCH and SMSCH message by another SPACH message may be limited to no more than n timeslots, or L3 timeout for SMSCH or ARCH. The number of interruptions for each mobile station may also be limited.

Paging Frame Definition

A Paging Frame (PF) is defined as an integer number of Hyperframes (see FIG. 16). There are four PF classes defined $PF_1 \ldots PF_4$. $PF_1$ is considered the "lowest" PF class and $PF_4$ the "highest". There are three terms used to define the operation of the PF classes: Default PF class, Assigned PF class, and Current PF class.

A Mobile station is assigned to one of the PF classes at time of subscription. This is referred to as the Default PF class. If the Default PF class is higher than the highest class supported as defined by the parameter MAX_SUPPORTED_PFC broadcasted on the BCCH, the mobile shall use the PF class defined by MAC_SUPPORTED_PFC.

The MS can also be assigned to another PF class at registration. When the MS makes a registration, it shall temporarily change the PF class to $PF_1$ until it receives a registration response. If the response contains a PF class, the MS shall use that PF class; otherwise it shall use the previous PF class. The resulting PF class according to the registration response or broadcast information is referred to as the assigned PF class.

The actual used PF class is referred to as the current PF class. The current PF class is equal to the assigned PF class if the Paging Frame Modifier (PFM) transmitted on the SPACH is not set, or is equal to the assigned PF class+1 if PFM is set. The highest PF class is $PF_4$ for all conditions.

A Hyperframe counter and a Primary SF indicator are provided in the BCCH. These two counters together (2*HF counter+Primary SF indicator) constitute the Superframe counter. The least common multiple of the Paging Frame classes is 12. Hence the HF counts: 0,1 . . . 11,0,1 . . .

In FIG. 16, a Secondary PCH is always placed into the next superframe. For PF(i), i=2, 3, 4, only the PCH assignments which are aligned to $HF_0$ are shown for illustration purposes.

Verifying Status of E-BCCH Information

The Mobile Station shall store the value of the E-BCCH change notification flag transmitted in the F-BCCH before reading the E-BCCH. After the Mobile Station has acquired the relevant information (which may be dependent on the specific task the mobile is engaged in), the Mobile Station shall read the E-BCCH change notification flag again. The process of updating/initiating of the E-BCCH messages set is considered successful only if the flag is the same before and after E-BCCH reading.

SMS Broadcast

SMS broadcast (S-BCCH) is a broadcast channel in the superframe.

SMS Frame

The S-BCCH channel is organized into fixed length SMS-frames each consisting of 24 superframes, as shown in FIG. 7. The SF number is derived from the Hyperframe Counter and Primary Superframe Indicator sent on the BCCH (SF number=2*HF counter+primary SF indicator). The first S-BCCH slot within each SMS frame (Superframe 0) contains a header that describes the structure of the SMS channel. The number of Superframes within each SMS frame is fixed. Thus, the number of slots assigned to the SMS frame are 0,24,48,72 . . . depending on how many slots per superframe are assigned to S-BCCH. The SMS frame is aligned to start at HF counter equal to zero. Furthermore, regardless of which set of Paging Frames are supported, the system must increment the Hyperframe counter (0 to 11 mod 12) to provide SMS frame synchronization information to the mobile station.

SMS Subchannels

Figures 17, 18, 19, 20:
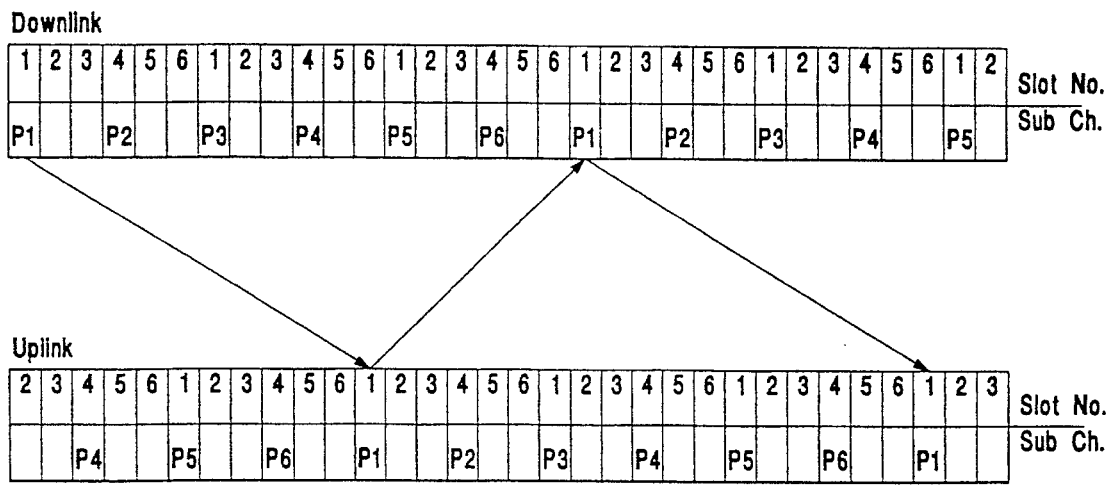
FIG. 17 shows the SMS Frame structure.
FIG. 18 shows an example of SMS subchannel multiplexing.
FIG. 19 shows a list of DCCs broadcasted on the BCCH.
FIG. 20 shows the relationship between the uplink timeslots and the downlink SCF flags.

SMS subchannels are defined to allow different repetition cycles for different messages. Each subchannel has its own repetition cycle defined in terms of units of possible SMS frames. The number of sub-channels are: 0,1 . . . N. To limit the subchannel repetition time, Max N may be set equal to 4. Subchannels are sub-multiplexed on the S-BCCH channel in units of SMS frames, SMS(i), where i=1. . . N. FIG. 18 shows an example of SMS subchannel multiplexing in which N=4.

According to L2 information found in every first slot in each SMS frame, the set of messages in SMS(i) may span M(i) number of SMS frames before a cycle is completed. Regardless of varying message set cycles among the subchannels., SMS frame number "i" is always followed by frame number ((i+1) mod N+1) in order of transmission.

A transition flag (TF) is provided for each SMS subchannel (SMSN). The flags for all SMS subchannels are submultiplexed onto a single flag transmitted on the SPACH channel and which points to the Next logical SMS frame (see FIG. 18). If there is a transition in the flag for a subchannel, the MS has to read the S-BCCH header field at the start of the next logical SMS frame to obtain further information, as described more fully below.

Header Information

The header information describes the sub-channeling of the broadcast SMS and is provided in the first slot of every SMS frame. The MS can also find the L3 structure of the SMS frame associated with this header. The SMS Header Element (start of every SMS frame) is shown in the table below.

| Information Element | Range (Logical) | Bits |
|---|---|---|
| Number of Subchannels | 1–4 | 2 |
| Subchannel Number | 1–4 | 2 |
| Phase Length of Subch. Cycle | 1–64 | 6 |
| Phase Number of Subch. Cycle | 1–64 | 6 |
| Number of SMS Messages (N) | 1–64 (set to 1 plus value in field) | 6 |
| o   SMS Message ID (Note 1) | 0–255 (unique ID in cycle) | 8 |
| o   L2 Frame Start (Note 1) | 0–255 (L2 frame identifier) | 8 |

Note 1:
N instances of these two elements are sent consecutively.

Even though the SMS data may span several SMS frames, the change flag may interrupt the sub-channel cycle (cycle clearing). The MS now assumes that the next sub-channel is the start of the new cycle. There are two ways to change the data provided on the broadcast SMS: changing the L3 messages within the SMS (messages may be added and/or deleted from any position in the cycle), and changing the structure of the sub-channels.

The SMS Message IDs and their associated L2 Frame Starts comprise a list of all messages appearing in this SMS frame. IDs must be unique for each SMS frame and all 256 values must be used before re-use to aid the mobile in searching for the changed message(s) and avoiding reading messages which have not changed. The L2 Frame Start parameter is provided to point to the start of the L2 frame in which this message begins (the message does not have to be at the start of the L2 frame). Refer to the S-BCCH L2 format for a description of message delivery.

In the example shown in the table below, 4 messages make-up SMS frame 1. In this example, 1 slot is dedicated to S-BCCH per superframe and, hence, there are 24 slots per SMS frame.

| Previous SMS Frame 1 Header | | New SMS Frame 1 Header | |
|---|---|---|---|
| Number of subchannels | 3 | Number of subchannels | 3 |
| Subchannel number | 1 | Subchannel number | 1 |
| Length of subch. cycle | 2 | Length of subch. cycle | 2 |
| Phase of subch. cycle | 1 | Phase of subch. cycle | 1 |
| Number of SMS messages (N) | 4 | Number of SMS messages (N) | 5 |
| o1   SMS message ID | 1 | o1   SMS message ID | 1 |
| o1   L2 Frame Start | 1 | o1   L2 Frame Start | 1 |
| o2   SMS message ID | 2 | o2   SMS message ID | 2 |
| o2   L2 Frame Start | 2 | o2   L2 Frame Start | 2 |
| o3   SMS message ID | 3 | o4   SMS message ID | 4 |
| o3   L2 Frame Start | 2 | o4   L2 Frame Start | 2 |
| o4   SMS message ID | 4 | o5   SMS message ID | 5 |
| o4   L2 Frame Start | 3 | o5   L2 Frame Start | 3 |
| | | o6   SMS message ID | 6 |
| | | o6   L2 Frame Start | 3 |

In the table above, the mobile is assumed to be monitoring the SPACH when the SMSN toggles to indicate a change in the S-BCCH. The mobile knows from the Superframe Counter that SMS subchannel three is currently being broadcast and now determines that the SMSN points to a change in SMS subchannel one. When SMS subchannel one begins, the MS reads the SMS header. It determines that message 3 is removed, the position of message 4 has changed (but the ID is the same so the mobile does not need to re-read this message), and new messages 5 and 6 have been added and must be read. The mobile may skip the appropriate number of L2 frames to read the new messages.

PCH Allocation to MSs

Each MS shall be allocated a specific PCH subchannel within the paging frame on a specific DCC. The available PCH subchannels and DCCs can be identified by the DCC parameters broadcasted on BCCH. The subchannel to be used is defined by the MSs IS-54B MIN identity which is referred to below as MSID.

DCC Selection

The DCCs are identified in a list broadcasted on BCCH. This list must be identical for all DCC frequencies. The list contains:

1. The frequency or channels ($f_i$, i=1 ... k). For the current DCC, the position in the list (i) is broadcasted instead of the frequency.

2. The number of slots used for DCC (ni, i=1 ... k), where k is the number of DCC frequencies in the list.

One frequency can have any one of the number of DCC slots shown in he first table below. The used slots ($s_j$) are numbered as shown in the second table below.

| Number of Slots ($n_i$) | Used Slots ($a_j$, j=0 ... $n_i$−1) | Rate |
|---|---|---|
| 1 | 1 | half |
| 2 | 1,4 | full |
| 4 | 1,4,2,5 | 2 full |
| 6 | 1,4,2,5,3,6 | 3 full |

| The used slots are numbered as follows: | |
|---|---|
| j | $s_j$ |
| 0 | 1 |
| 1 | 4 |
| 2 | 2 |
| 3 | 5 |
| 4 | 3 |
| 5 | 6 |

The DCCs are numbered according to the order of appearance in the list ($f_i$) and in FIG. 16 as follows:

$$p=SUM(n_m, m=0 \ldots i-1)+j,\ n_0=0, j=0 \ldots n_i-1, i=1 \ldots k\ DCC_p=f_i, s_j,$$

Note that a full rate DCC is given two numbers. The total number of slots assigned to the DCCs is N=SUM($n_i$, i=0 .. k).

FIG. 19 shows an example of a list broadcasted on BCCH (after including the current frequency). This is a case with two frequencies, $f_1$ with 4 slots and $f_2$ with 1 slot. The total number of DCCs is N=5. The DCCs are numbered as follows:

| DCC Number | Frequency | Slot | Rate |
| --- | --- | --- | --- |
| 1 | $f_1$ | 1 | full |
| 2 | $f_1$ | 4 | full |
| 3 | $f_1$ | 2 | full |
| 4 | $f_1$ | 5 | full |
| 5 | $f_2$ | 1 | half |

A MS is assigned to a DCC according to the following algorithm:

DCC_GROUP=MSID mod N, where N is defined above. DCC_GROUP is the DCC number (p) according to the list above. If it (implicitly) indicates a full rate channel ($n_f$>1), the whole full rate channel shall be assigned. The following PCH assignments are based on the parameters broadcasted on the assigned DCC frequency.

PCH Subchannel Selection

A MS is assigned to a PCH slot within the superframe according to the following algorithm:

Case 1: Master Half rate, (j=0, $n_f$=1) PCH_SUBCH= [(MSID div N) mod NP+NB]$^{*2}$ NP=16-NB Case 2: Master Full rate, (j=0,1, ni>1) PCH_SUBCH= (MSID div N+j mod 2) mod NP+NB NP=32-NB Case 3: Slave Full rate, (j=2,3,4,5) PCH_SUBCH=(MSID div N+j mod 2) mod NP+NB+2, NP=32-4-NB where:

*=The slots in frames corresponding to BCCH and one frame before and after can not be used for PCH on a slave DCC.

NB=NFB+NEB+NSB+NSS
NFB=number of F-BCCH
NEB=number of E-BCCH
NSB=number of S-BCCH
NSS=number of skipped slots
N, j, $n_f$=defined above.

PCH_SUBCH is the TDMA block number of the PCH subchannel within the superframe. The TDMA block numbers (SF phase counter) are broadcasted in the CSFP field.

PCH Hyperframe Selection

A MS is assigned to a PCH hyperframe within the paging frame according to the following algorithm:
(MSID div N div NP) mod PFC=HFC mod PFC return where:
PFC=Paging Frame Class (1 . . . 4) for the actual MS.
HFC=Hyperframe counter (broadcasted on BCCH).

Subchanneling of the RACH

General

In order to allow for some processing time in the base station and the mobile station, a multiplexing of the RACH is performed. In addition, it is required that the time between the transmission of the burst and the SCF response corresponding to that burst is the same on both a full rate and a half rate DCC. Thus, the number of sub channels for a full rate DCC may be set, for example, to six.

SCF Flags—uplink and Downlink Burst Relations

FIG. 20 shows the relation between the uplink time slots and the downlink SCF flags. Thus, following the arrows from left to right on subchannel P1, the BRI reading of the SCF flags indicates the availability of the following P1 uplink slot as shown in the figure. If an uplink burst is transmitted in that time slot, the R/N status of the next P1 downlink SCF, as given by the arrows, indicates whether that burst was received or not. Also, in the case of the burst being the first burst of a random access, the consecutive downlink PE value indicates to the mobiles which mobile was captured. If the mobile station burst was received correctly, the BS will set the PE accordingly, which informs the MS to send its next burst of its message (provided that the message is longer than one burst) in the next occurrence of P1 in the uplink. Note that this subchanneling is performed for SCF information in the downlink payload on the RACH only. Payload data in the downlink will not be transmitted with this subchanneling.

In case of a reservation based access (as distinguished from a random access), the partial echo value is used together with the reservation flag in the preceding occurrence of that subchannel downlink in order to identify a reserved access for a particular mobile. FIG. 21 shows the subchannels in the case of using a full rate DCC. In the case of a half rate DCC, only sub channels P1, P3 and P5 are used.

FIG. 21 shows an example of an L3 acknowledged dialogue between a mobile and a base (only the timeslots 1 and 4 corresponding to a full rate DCC are shown). The mobile first transmits a two burst message by a random access, checking the PE after the first burst. The actual transmit occasions for the MS are marked with X. Within a predetermined time (generally longer than shown in the figure), the base responds with a two burst long message (marked Y in the figure). Finally, the mobile transmits a single burst by a reserved access (this reservation based access is optional by the BS). FIG. 21 also shows the relevant SCF values.

Layer ⅔ Information Mapping Onto E-BCCH

The set of Layer 3 E-BCCH messages sent on the E-BCCH forms a message train. The start of the message set is indicated by the E-BCCH Cycle Start (ECS) found in the L2 header.

Layer 2 Operation

Protocols

The layer 2 protocols used for downlink operation support the transmission of layer 3 messages on the SPACH (SMSCH, PCH and ARCH), F-BCCH, E-BCCH, and the S-BCCH. The layer 2 protocol includes support for an ARQ mode of operation for the SMSCH and ARCH. The layer 2 protocol used for uplink operation supports the transmission of layer 3 messages on the RACH. Because of the Shared Channel Feedback (SCF) defined for random access channel operation, no further ARQ capability is explicitly built into RACH layer 2 protocol.

The layer 2 protocols defined herein are comprised of Media Access Control (MAC) functionality although higher level Logical Link Control (LLC) may be included. The layer 2 protocol frames identified herein are always logically transmitted beginning with the left most bit of a frame and ending with the rightmost bit of a frame.

RACH Protocol

The RACH layer 2 protocol is used on the uplink where all TDMA bursts are used to carry RACH information. Two RACH layer 2 protocol frames are constructed so as to fit within a 117 or 95 bit envelope. An additional 5 bits are reserved for use as tail bits resulting in a total of 122 or 100 bits of information carried within each RACH burst. The layer 2 protocol defined for RACH operates using the Shared Channel Feedback mechanism and, as such, supports only an ARQ type of operation. A range of possible RACH layer 2 frames are shown in FIGS. 22A–L. A summary of the fields comprising layer 2 protocol frames for RACH operation is provided in the table below. Multiple L3 messages may be sent in one transaction.

Normal Length Protocol Frames

When system broadcast information indicates that normal length bursts are to be sent during a mobile station access procedure, the range of layer 2 protocol frames shown in FIGS. 22A–F may be used for the entire access. FIG. 22 shows a BEGIN Frame (MSID type TMS1). FIG. 22B shows a BEGIN Frame (MSID type IS-54B MIN). FIG. 22C shows a BEGIN Frame (MSID type IMS1). FIG. 22D shows a CONTINUE Frame. FIG. 22E shows an END Frame. FIG. 22F shows a SPACH ARQ Status Frame.

Normal Length Frame Usage

BEGIN Frame

A BEGIN frame must be used for the initial burst of a random access transaction. The size of the L3DATA field changes based on the size of MSIDs and the number of layer 3 messages indicated by NL3M. A complete access transaction may be carried within this burst.

CONTINUE Frame

A CONTINUE frame is used when a random access requires more than two frames to complete the access transaction. As many CONTINUE frames as needed are sent to complete a multi-burst access transaction. The value in the CI field toggles between 1 and 0 (starting with 0) with every new (i.e., non-repeated) frame transmitted by the mobile station as directed by SCF information. If the SCF requires the re-transmission of a previously sent frame, the frame shall be repeated and the CI field shall not toggle.

END Frame

An END frame is sent as the last burst of a random access requiring more than one frame to complete the access transaction.

SPACH ARQ Status Frame

A SPACH ARQ STATUS frame is used to report the partial or complete status of an ARQ based transmission received by the mobile station on the SPACH. The FRNO MAP bit map field is set to "1" for received or "0" for not received for each ARQ mode BEGIN or CONTINUE frame received on the SPACH.

Abbreviated Length Protocol Frames

When system broadcast information indicates that abbreviated length bursts are to be sent during a mobile station access procedure, then the range of layer 2 protocol frames shown in FIGS. 22G–L shown in may be used. FIG. 22G shows BEGIN Frame (MSID type TMS1). FIG. 22H shows BEGIN Frame (MSID type IS54B MIN). FIG. 22I shows BEGIN Frame (MSID type IM51). FIG. 22J shows CONTINUE Frame. FIG. 22K shows END Frame. FIG. 22L shows SPACH ARQ status Frame. The size of the L3DATA field changes based on the size of MSIDs and the number of layer 3 messages indicated by NL3M.

Abbreviated Length Frame Usage

The abbreviated length frame usage does not differ from the Normal Length Frame Usage.

RACH Field Summaries

The following table summarizes the RACH Layer 2 protocol fields:

| Field Name | Length (bits) | Values |
|---|---|---|
| BT = Burst Type | 3 | 000 = BEGIN<br>001 = CONTINUE<br>010 = END<br>011 = SPACH ARQ Status<br>100 . . . 111 = Reserved |
| RSVD = Reserved | 1 | Set to zero. |
| CI = Change Indicator | 1 | Starts at 0, toggles for every new transmitted frame. Stays the same for every repeated frame. |
| IDT = Identity Type | 2 | 00 = 20 bit TMSI<br>01 = 34 bit MIN per IS-54B<br>10 = 50 bit IMSI<br>11 = Reserved |
| MSID = Mobile Station Identity | 20/34/50 | 20 bit TMSI<br>34 bit IS-54B MIN<br>50 bit IMSI |
| NL3M = Number of Layer 3 Messages | 2 | 00 = 1 layer 3 message<br>01 = 2 layer 3 message<br>10 = 3 layer 3 message<br>11 = 4 layer 3 message |
| L3LI = Layer 3 Length Indicator | 8 | Variable length layer 3 messages supported up to a maximum of 255 octets. |
| L3DATA = Layer 3 Data | Variable | Contains a portion (some or all) of the layer 3 message having an overall length as indicated by L3LI. The portion of this field not used to carry layer 3 information is filled with zeros. |
| PE = Partial Echo | 7 | The 7 least significant bits of the mobile station IS-54B MIN. |
| TID = Transaction Identity | 2 | Indicates which ARQ mode transaction the status report is associated with. |
| FRNO MAP = Frame Number Map | 32 | A partial or complete bit map representation of the receive status of an ARCH or SMSCH ARQ mode transaction (1 = Frame Received, 0 = Frame Not Received). |
| FILLER = Burst Filler | Variable | All filler bits are set zero. |
| CRC = Cyclic Redundancy Code | 16 | Same generator polynomial as IS-54B (includes DVCC) |

F-BCCH Protocol

The F-BCCH layer 2 protocol is used whenever a TDMA burst is used to carry F-BCCH information. The first F-BCCH slot of a superframe must have its Superframe Phase value set to zero. All F-BCCH slots in a superframe assume a DVCC value of zero for the purpose of calculating the layer 2 CRC value. It should be noted that a full cycle of F-BCCH information (i.e., a set of layer 3 messages) always starts in the first F-BCCH slot of a superframe and is completed within the same superframe using as many F-BCCH slots as necessary.

A single F-BCCH layer 2 protocol frame is constructed so as to fit within a 125 bit envelope. An additional 5 bits are reserved for use as tail bits resulting in a total of 130 bits of information carried within each F-BCCH burst. The layer 2 protocol defined for F-BCCH operation supports only unacknowledged operation. A range of possible F-BCCH layer 2 frames is shown in FIGS. 23A–C. A summary of the fields comprising layer 2 protocol frames for F-BCCH operation is provided in the table below.

F-BCCH Frame Usage

BEGIN Frame

FIG. 24A shows a F-BCCH BEGIN Frame (mandatory minimum). FIG. 24B shows another F-BCCH BEGIN Frame (two L3 messages with the second L3 message continued). The BEGIN frame is used for starting the delivery of one or more L3 messages on the F-BCCH. If the first L3 message is shorter than one frame, the BE is added to the end of the L3DATA field to indicate whether or not an additional L3 message is started within the BEGIN frame. If the BE is equal to "END", the rest of the BEGIN frame is padded with FILLER If the BE is equal to "BEGIN", a new L3 message is started in the BEGIN frame. If the L3DATA field ends on a frame boundary, there will be no BE bit. The 'END' is implied. If the L3DATA field ends with less than 9 bits remaining in the frame, BE is set to 'END' and the rest of the frame is padded with FILLER.

CONTINUE Frame

FIG. 24C shows a F-BCCH CONTINUE Frame (mandatory minimum). The CONTINUE frame is used for continuation of a L3 message which was too long to fit into the previous frame. The CLI indicates how many bits of the frame belong to the continued message. Since the CLI is given in bits, the preceding L3 message may have to be padded with FILLER If the BE is equal to "END", the rest of the CONTINUE frame is padded with FILLER. If the BE is equal to "BEGIN", a new L3 message is started in the CONTINUE frame. If the L3DATA field ends on a frame boundary, there will be no BE bit. The 'END' is implied. If the L3DATA field ends with less than 9 bits remaining in the frame, BE is set to 'END' and the rest of the frame is padded with FILLER. CLI makes it possible for mobile stations to receive any message starting in a continuation frame even if the preceding frame was not received.

F-BCCH Field Summaries

The following table summarizes the F-BCCH Layer 2 Protocol fields:

| Field Name | Length (bits) | Values |
| --- | --- | --- |
| EC = E-BCCH Change | 1 | Toggles to indicate a change in the E-BCCH. |
| BC = Begin/Continue | 1 | 0 = Begin<br>1 = Continue |
| CLI = Continuation Length Indicator | 7 | Number of bits remaining in the previous L3 message. |
| L3LI = Layer 3 Length Indicator | 8 | Variable length layer 3 messages supported up to a maximum of 255 octets |
| L3DATA = Layer 3 Data | Variable | Contains a portion (some or all) of the layer 3 messages having an overall length as indicated by L3LI. The portion of this field not used to carry layer 3 information is filled with zeros. |
| BE = Begin/End | 1 | 0 = Begin<br>1 = End |
| FILLER = Burst Filler | Variable | All filler bits are set zero. |
| CRC = Cyclic Redundancy Code | 16 | Same general polynomial as IS-54B. A zero value for DVCC is applied in the calculation of CRC for each F-BCCH L2 frame. |

E-BCCH Protocol

The E-BCCH layer 2 protocol is used whenever a TDMA burst is used to carry E-BCCH information. It should be noted that a full cycle of E-BCCH information (i.e., a set of layer 3 messages) need not be aligned to start in the first E-BCCH slot of a superframe and may span multiple superframes. A single E-BCCH layer 2 protocol frame is constructed so as to fit within a 125 bit envelope. An additional 5 bits are reserved for use as tail bits resulting in a total of 130 bits of information carried within each E-BCCH burst. The layer 2 protocol defined for E-BCCH operation supports only unacknowledged operation. A range of possible E-BCCH layer 2 frames is shown in FIGS. 24A–C. FIG. 24A shows on E-BCCH BEGIN Frame (mandatory minimum). FIG. 24B shows another E-BCCH BEGIN Frame (two L3 messages with the second L3 message continued). FIG. 24C shows an E-BCCH CONTINUE Frame (mandatory minimum). A summary of the fields comprising layer 2 protocol frames for E-BCCH operation is provided in the table below.

E-BCCH Frame Usage

The E-BCCH Frame usage is the same as the F-BCCH Frame usage except that:

1. ECS is the opening field of E-BCCH frames as opposed to EC used in F-BCCH frames.

2. An E-BCCH BEGIN (ECS=1) must be used as the first frame of the E-BCCH cycle.

E-BCH Field Summaries

The following table summarizes the E-BCCH Layer 2 protocol fields:

| Field Name | Length (bits) | Values |
| --- | --- | --- |
| ECS = E-BCCH Cycle Start | 1 | 0 = Not the start of an E-BCCH cycle<br>1 = Start of an E-BCCH cycle |
| BC = Begin/Continue | 1 | 0 = Begin<br>1 = Continue |
| CLI = Continuation Length Indicator | 7 | Number of bits remaining in the previous L3 message. |
| L3LI = Layer 3 Length Indicator | 8 | Variable length layer 3 messages supported up to a maximum of 255 octets |
| L3DATA = Layer 3 Data | Variable | Contains a portion (some or all) of the layer 3 message having an overall length as indicated by L3LI. The portion of this field not used to carry layer 3 information is filled with zeros. |
| BE = Begin/End | 1 | 0 = Beginning<br>1 = End |
| FILLER = Burst Filler | Variable | All filler bits are set zero. |
| CRC = Cyclic Redundancy Code | 16 | Same generator polynomial as IS-54B. The nominal DVCC is applied in the calculation of CRC for each E-BCCH L2 frame. |

S-BCCH Protocol

The S-BCCH layer 2 protocol is used whenever a TDMA burst is used to carry S-BCCH information. A single S-BCCH layer 2 protocol frame is constructed so as to fit within a 125 bit envelope. An additional 5 bits are reserved for use as tail bits resulting in a total of 130 bits of information carried within each S-BCCH burst. The layer 2 protocol defined for S-BCCH operation supports only unacknowledged operation. A range of possible S-BCCH layer 2 frames is shown in FIGS. 25A–C. FIG. 25A shows S-BCCH BEGIN Frame (Mandatory Minimum). FIG. 25B shows S-BCCH BEGIN Frame (Two L3 Messages with the Second L3 Message continued). FIG. 25C shows S-BCCH CONTINUE Frame (Mandatory Minimum). A summary of the fields comprising layer 2 protocol frames for S-BCCH operation is provided in the table below.

S-BCCH Frame Usage

The S-BCCH frame usage is the same as the F-BCCH frame usage with the following exceptions:
1. SCS is the opening field of S-BCCH frames as opposed to EC used in F-BCCH frames.
2. An S-BCCH BEGIN must be used as the first frame of the S-BCCH cycle.

| Field Name | Length (bits) | Values |
|---|---|---|
| SCS = S-BCCH Cycle Start | 1 | 0 = Not the start of an S-BCCH cycle<br>1 = Start of an S-BCCH cycle |
| BC = Begin/Continue | 1 | 0 = Begin<br>1 = Continue |
| CLI = Continuation Length Indicator | 7 | Number of bits remaining in the previous L3 message. |
| L3LI = Layer 3 Length Indicator | 8 | Variable length layer 3 messages supported up to a maximum of 255 octets |
| L3DATA = Layer 3 Data | Variable | Contains a portion (some or all) of the layer 3 message having an overall length as indicated by L3LI. The portion of this field not used to carry layer 3 information is filled with zeros. |
| BE = Begin/End | 1 | 0 = Beginning<br>1 = End |
| FILLER = Burst Filler | Variable | All filler bits are set zero. |
| CRC = Cyclic Redundancy Code | 16 | Same generator polynomial as IS-54B. The nominal DVCC is applied in the calculation of CRC for each E-BCCH L2 frame. |

SPACH Protocol

The SPACH layer 2 protocol is used whenever a TDMA burst is used to carry point-to-point SMS, Paging, or ARCH information. A single SPACH layer 2 protocol frame is constructed so as to fit within a 125 bit envelope. An additional 5 bits are reserved for use as tail bits resulting in a total of 130 bits of information carried within each slot assigned for SPACH purposes. FIGS. 26A–N show a range of possible SPACH layer 2 protocol frames under various conditions. A summary of the possible SPACH formats is provided in the first table below. A summary of the fields comprising layer 2 protocol frames for SPACH operation is provided in the second table below.

SPACH Frame Usage

Similar frame formats are used for all SPACH channels such that all frames will always have a common Header A. The contents of Header A determine whether or not Header B is present in any given SPACH frame. Header A discriminates between hard (dedicated) page frames, PCH frames, ARCH frames and SMSCH frames. A Hard Triple Page frame containing three 34-bit MSIDs can be sent on the PCH (BU=Hard Triple Page). A Hard Quadruple Page frame containing four 20 bit or 24 bit MSIDs can be sent on the PCH (BU=Hard Quadruple Page).

One or more L3 messages may be transmitted in one frame, or continued over many frames. MSIDs are only carried within frames where BU=PCH, ARCH or SMSCH with BT=Single MSID, Double MSID, Triple MSID, Quadruple MSID or ARQ Mode BEGIN. The IDT field identifies the format of all MSIDs carried within a given SPACH frame (i.e., no mixing of MSID formats is allowed). Pages carried on the PCH are not allowed to continue beyond a single SPACH frame (even though the protocol allows for it). All other PCH messages may continue beyond a single SPACH frame.

For non ARQ mode operation, the L2 SPACH protocol supports sending a single L3 message to multiple MSIDs in addition to the fixed one-to-one relationship between MSIDs and L3 messages. The Message Mapping field (MM) is used to control this aspect of layer 2 frame operation. A valid SPACH frame requires that all L2 header pertinent to a given L2 frame be included entirely within that frame (i.e., L2 header from a given SPACH frame cannot wrap into another SPACH frame). The Offset Indicator field (OI) is used to allow both the completion of a previous started layer 3 message and the start of a new layer 3 message to occur within a single SPACH frame.

Summary of SPACH Frame Formats

The following table summarizes the possible SPACH formats:

| | SMS | PCH | ARCH | Can Be Continued |
|---|---|---|---|---|
| Single MSID | Y | Y | Y | Y |
| Double MSID | N | Y | Y | Y |
| Triple MSID | N | Y | Y | Y |
| Quadruple MSID | N | Y | Y | Y |
| Hard Triple Page (MIN) | N | Y | N | N |
| Hard Quadruple Page (MIN1) | N | Y | N | N |
| Continue | Y | Y | Y | Y |
| ARQ Mode BEGIN | Y | N | Y | Y |
| ARQ Mode CONTINUE | Y | N | Y | Y |

FIG. 26A shows the SPACH Header A. FIG. 26B shows the SPACH Header B. FIG. 26C shows the Null Frame. FIG. 26D shows the Hard Triple Page Frame (34 bit MIN). FIG. 26E shows the Hard Quadruple Page Frame (24 bit MINi). FIG. 26F shows the Single MSID Frame (PCH). FIG. 26G shows the Double MSID Frame (ARCH). FIG. 26H shows the Double MSID Frame with Continuation (ARCH). FIG. 26I shows the Continue Frame (ARCH). FIG. 26J shows the Offset Single MSID Frame (ARCH). FIG. 26K shows the Triple MSID Frame (ARCH, 1 L3 Message for 3 MSIDs). FIG. 26L shows the Continue Frame (ARCH). FIG. 26M shows the ARQ Mode Begin (SMSCH). FIG. 26N shows the ARQ Mode Continue (SMSCH).

SPACH Header A

The SPACH Header A contains burst usage information and flags for managing mobile stations in sleep mode. The BU field provides a high level indication of burst usage. The flags indicate changes in sleep mode configuration as well as BCCH information. This header is always present in all possible SPACH frame types.

SPACH Header B

The SPACH Header B contains supplementary header information used to identify the remaining content of the layer 2 frame. This header is present when Header A indicates a burst usage of type PCH, ARCH or SMSCH.

Null Frame

The Null frame is sent as necessary by the BMI when there is nothing else to be transmitted for any given SPACH burst.

Hard Triple Page Frame

A Hard Triple Page is a single frame page message containing three 34-bit MINs.

Hard Quadruple Page Frame

A Hard Quadruple Page is a single frame page message containing four 20 or 24-bit MINs as determined by IDT.

Single MSID Frame

The Single MSID frame is used for starting the delivery of ARCH or SMSCH L3 messages in non ARQ mode. In addition, this frame may also be used for sending a L3 PCH messages (pages or otherwise) which are non ARQ by definition. Page messages sent using a Single MSID frame cannot be continued into another frame.

If an ARCH or SMSCH L3 message is too long to fit into Single MSID frame then the remaining L3 information is carried using additional CONTINUE frames or MSID frames as necessary. If a complete ARCH or SMSCH L3 message does fit within a Single MSID frame, it is padded with FILLER as necessary.

If a non-page PCH L3 message is too long to fit into Single MSID frame then the remaining L3 information is carried using additional CONTINUE frames or MSID frames as necessary. If a complete PCH L3 message does fit within a Single MSID frame, it is padded with FILLER as necessary.

Double MSID Frame

The Double MSID frame is used for starting the delivery of two ARCH messages in non ARQ mode or two PCH L3 messages. The number of MSIDs is indicated in the BT field with the same IDT format used for both instances of MSID. Page messages sent using a Double MSID frame cannot be continued into another frame.

Triple MSID Frame

The Triple MSID frame is used for starting the delivery of three ARCH L3 messages in non ARQ mode or three PCH L3 messages. The number of MSIDs is indicated in the BT field with the same IDT format used for all instances of MSID. Page messages sent using a Triple MSID frame cannot be continued into another frame.

Quadruple MSID Frame

The Quadruple MSID frame is used for starting the delivery of four ARCH L3 messages in nonARQ mode or four PCH L3 messages. The number of MSIDs is indicated in the BT field with the same IDT format used for all instances of MSID. Page messages sent using a Quadruple MSID frame cannot be continued into another frame.

CONTINUE Frame

The CONTINUE frame is used for continuation of the L3 messages which are too long to fit into the previous frame. Note that L2 header which is specific to any given SPACH frame must always be carried entirely within that frame (i.e., L2 header associated with a given SPACH frame shall not be completed using a subsequent SPACH frame).

ARQ Mode BEGIN

The ARQ Mode BEGIN frame is used for starting the delivery of a L3 ARCH or SMSCH message in ARQ mode. The ARQ Mode BEGIN frame contains only one MSID within its L2 header as well as a portion of the L3 message itself. If the L3 message is too long to fit into a single ARQ Mode BEGIN frame, then the remaining L3 information is carried using additional ARQ Mode CONTINUE frames as necessary. If the L3 message does fit within a single ARQ Mode BEGIN frame, it is padded with FILLER as necessary.

The PE field in conjunction with TID field identifies the transaction initiated by the ARQ Mode BEGIN frame and serves to associate any subsequent ARQ Mode CONTINUE frames with this same transaction. An ARQ Mode BEGIN frame has an implicit FRNO value of zero associated with it.

ARQ Mode CONTINUE Frame

The ARQ Mode CONTINUE frame is used for continuing a L3 ARCH or SMSCH message which is too long to fit into the previous ARQ Mode frame (BEGIN or CONTINUE). The FRNO field identifies the CONTINUE frames within the context of the overall L3 message. The FRNO field value is incremented for each CONTINUE frame sent in support of a given transaction (i.e., multiple CONTINUE frames may be sent to complete the transaction initiated by the ARQ Mode BEGIN frame). The ARQ Mode Continue frame is also used to repeat any previously sent ARQ Mode CONTINUE frames received incorrectly by the mobile station.

SPACH Field Summaries

The following table summarizes the SPACH Layer 2 Protocol fields:

| Field Name | Length (bits) | Values |
|---|---|---|
| BU = Burst Usage | 3 | 000 = Hard Triple Page (34 bit MSID) |
| | | 001 = Hard Quad Page (20 or 24 bit MSID) |
| | | 010 = PCH Burst |
| | | 011 = ARCH Burst |
| | | 100 = SMSCH Burst |
| | | 101 = Reserved |
| | | 110 = Reserved |
| | | 111 = Null |
| PCON = PCH Continuation | 1 | 0 = No PCH Continuation |
| | | 1 = PCH Continuation, Activiated |
| BCN = BCCH Change Notification | 1 | Transitions whenever there is a change in F-BCCH information. |
| SMSN = SMS Notification | 1 | Transitions whenever there is a change in S-BCCH information. |
| PFM = Paging Frame Modifier | 1 | 0 = Use assigned PF |
| | | 1 = Use one higher than assigned PF |
| BT = Burst Type | 3 | 000 = Single MSID Frame |
| | | 001 = Double MSID Frame |
| | | 010 = Triple MSID Frame |
| | | 011 = Quadruple MSID Frame |
| | | 100 = Continue Frame |
| | | 101 = ARQ Mode Begin |
| | | 110 = ARQ Mode Continue |
| | | 111 = Reserved |
| IDT = Identity Type | 2 | 00 = 20 bit TMSI |
| | | 01 = 24 bit MIN1 per IS-54B |
| | | 10 = 34 bit MIN per IS-54B |
| | | 11 = 50 bit IMSI |
| MSID = Mobile Station Identity | 20/24/ 34/50 | 20 bit TMSI |
| | | 24 bit MIN1 |
| | | 34 bit MIN |
| | | 50 bit IMSI |
| MM = Message Mapping | 1 | 0 = One instance of L3LI and L3DATA per instance of MSID. |
| | | 1 = One instance of L3LI and L3DATA for multiple MSIDS. |
| OI = Offset Indicator | 1 | 0 = No message offset included. |
| | | 1 = Message offset included. |
| CLI = Continuation Length Indicator | 7 | Number of bits remaining in the previous L3 message. |
| L3LI = Layer 3 Length Indicator | 8 | Variable length layer 3 messages supported up to a maximum of 55 octets. |
| L3DATA = Layer 3 Data | Variable | Contains a portion (some or all) of the layer 3 message having an overall length as indicated by L3LI. The portion of this field not used to carry layer 3 information is filled with zeros. |
| PE = Partial Echo | 7 | The 7 least significant bits of the mobile station IS-54B MIN. |
| TID = Transaction Identity | 2 | Indicates which ARQ mode transaction is being transmitted on the ARCH or SMSCH. |
| FRNO = Frame Number | 5 | Uniquely identifies specific frames sent in support of an ARQ mode transaction. |
| FILLER = Burst Filler | Variable | All filler bits are set zero. |
| CRC = Cyclic Redundancy Code | 16 | Same generator polynomial as IS-54B (includes DVCC) |

Random Access
States MS Side
Start Random Access

A mobile station shall be in the "start random access" state before the first unit of a message that is to be transmitted by a random access has been transmitted.

Start Reserved Access

The mobile station shall be in the "start reserved access" state before the first unit of a message that is to be transmitted by a reservation based access has been transmitted.

More Units

The mobile station shall be in the "more units" state if there are more units associated with the same access event pending for transmission.

After Last Burst

The mobile station shall be in the "after last burst" state if the last unit of an access event has been transmitted.

to PE. The channel coding is described in the Physical Layer description above.

SCF Flags Decoding

BRI and R/N

The following table shows how the mobile shall decode received flags according to the Layer 2 state. Note that only the flags relevant to the Layer 2 state are shown. In the "Start random access" state, the BRI flag is the only relevant flag. During a multiburst message transmission both the BRI and R/N flags are relevant. In the summations in the following table, $b_i$ equals the bit value.

| Layer 2 State | Busy/Reserved/Idle | | | Received/Not Received | |
| --- | --- | --- | --- | --- | --- |
| | Busy 111100 | Reserved 001111 | Idle 000000 | Received 11111 | Not Received 00000 |
| Start random access | Idle IF $\sum_{i=1}^{4} b_i < 2$ AND $\sum_{i=3}^{6} b_i < 2$ | | | N/A | N/A |
| Start reserved access | Reserved IF < 3 bits difference to Reserved flag code value | | | N/A | N/A |
| More units | Busy IF < 4 bits difference to Busy flag code value | | | $\sum_{i=1}^{5} b_i \geq 4$ | $\sum_{i=1}^{5} b_i < 4$ |
| After last burst | Busy IF < 4 bits difference to Busy flag code value | | | $\sum_{i=1}^{5} b_i \geq 4$ | $\sum_{i=1}^{5} b_i < 4$ |

Success

The mobile station shall be in the "success" state after a message has been sent successfully.

Protocol Elements

Forward Shared Control Feedback Flags

General

The forward shared control feedback (SCF) flags are used to control the reverse channel, i.e., the RACH.

Busy/Reserved/Idle

The busy/reserved/idle (BRI) flag is used to indicate whether the corresponding uplink RACH slot is Busy, Reserved or Idle. Six bits are used for these flags and the different conditions are encoded as shown in the table below:

| | $BRI_5$ | $BRI_4$ | $BRI_3$ | $BRI_2$ | $BRI_1$ | $BRI_0$ |
| --- | --- | --- | --- | --- | --- | --- |
| Busy | 1 | 1 | 1 | 1 | 0 | 0 |
| Reserved | 0 | 0 | 1 | 1 | 1 | 1 |
| Idle | 0 | 0 | 0 | 0 | 0 | 0 |

Received/Not Received

The received/not received (R/N) flag is used to indicate whether or not the base station received the last transmitted burst. A five times repetition code is used for encoding this flag as shown in the table below:

| | $R/N_4$ | $R/N_3$ | $R/N_2$ | $R/N_1$ | $R/N_0$ |
| --- | --- | --- | --- | --- | --- |
| Received | 1 | 1 | 1 | 1 | 1 |
| Not Received | 0 | 0 | 0 | 0 | 0 |

Partial Echo

The partial echo information is used to identify which MS was correctly received after the initial burst of random access and/or which MS is intended to have access to the reserved slot. The seven LSBs of IS-54B MIN are assigned to PE. The channel coding is described in the Physical Layer description above.

Partial Echo

The mobile station interprets a received coded partial echo value as having been correctly decoded if it differs by less than 3 bits from the correct coded partial echo (CPE). This is referred to as PE match.

Random Access Procedures

Mobile Station Side

A mobile station is allowed a maximum of Y+1, where Y=(0 . . . 7), transmission attempts before considering the attempt to transfer a message as a failure. The random delay period used in the mobile station after a Not Idle condition or after a transmission attempt is uniformly distributed between 0 and 200 ms with a granularity of 6.667 ms (the length of a time slot). A mobile station is not allowed to make more than Z, where Z=(0 . . . 3), consecutive repetitions of an individual burst.

Start Random Access

When the mobile station is in the start "random access" state, it shall look in the first occurrence of a downlink DCC slot, regardless of sub channels (see Physical Layer) of the current DCC. If the mobile station finds the slot to be Idle, it shall send the first unit of the message in the corresponding sub channel uplink RACH. If the slot is found to be either Busy or Reserved, the mobile station shall generate a random delay time. After the random delay time has expired the mobile shall repeat the foregoing procedure. The search for an Idle is to be repeated a maximum of X+1, where X=(0,9), times for each transmission attempt. With the exception of an origination, the MS must still monitor its PCH during random access procedures.

Start Reserved Access

When the mobile station is in the "start reserved access" state it shall look continuously in all downlink slots of the current DCC, regardless of sub channels, for a slot that is marked as reserved by the BRI flag and a PE match. The BS can assign reserved slot for a given MS regardless of which subchannel the MS previously used. If the mobile station finds this slot, the mobile station shall send the first unit of the message in the corresponding uplink RACH subchannel. If the mobile station does not find this slot within a predetermined time-out period (T), the mobile shall enter the "start random access" state.

Check for PE Match

After the first burst of a random access has been transmitted, the mobile shall read the partial echo field in the next slot of the corresponding subchannel of the DCC. If a PE match is found, the mobile shall assume that the SCF flag in the downlink has been assigned to it and shall then enter either the after last burst state or the more units state. If the mobile does not find a PE match, it shall generate a random delay time and enter the start random access state.

More Units

If the mobile station has more units to send, it shall decode the SCF flags of the corresponding subchannel. If it finds that the R/N flag is set, it shall consider the last transmitted burst to be received; otherwise, it shall consider it to be not received. If it finds that the channel is set to reserved or idle, it shall also consider the burst to be not received. If more than S+1, where S=(0,1), consecutive Not Busy readings are made by the mobile, it shall abort the transmission of the message and start another transmission attempt after a random delay. If the burst is considered to be received, the mobile shall transmit the next burst of the message in the next slot of the subchannel. If the burst is found to be not received, the mobile shall re-transmit the last transmitted burst.

After Last Burst

If the mobile reads the SCF flags of the currently used subchannel after it has transmitted the last burst and determines from the R/N flag that this burst has been received, the MS side of the SCF protocol shall consider the message to have been correctly transmitted. If it finds the burst to be not received and the channel is set to reserved or idle, it shall also consider the burst to be not received. If more than S+1, where S=(0,1), consecutive combined Not Received and Not Busy readings are made by the mobile station, it shall abort the transmission of the message and start another transmission attempt after a random delay. If the burst is found to be not received, the mobile shall re-transmit the last transmitted burst.

MS and BS Random Access Flow Charts

Figure 27A:
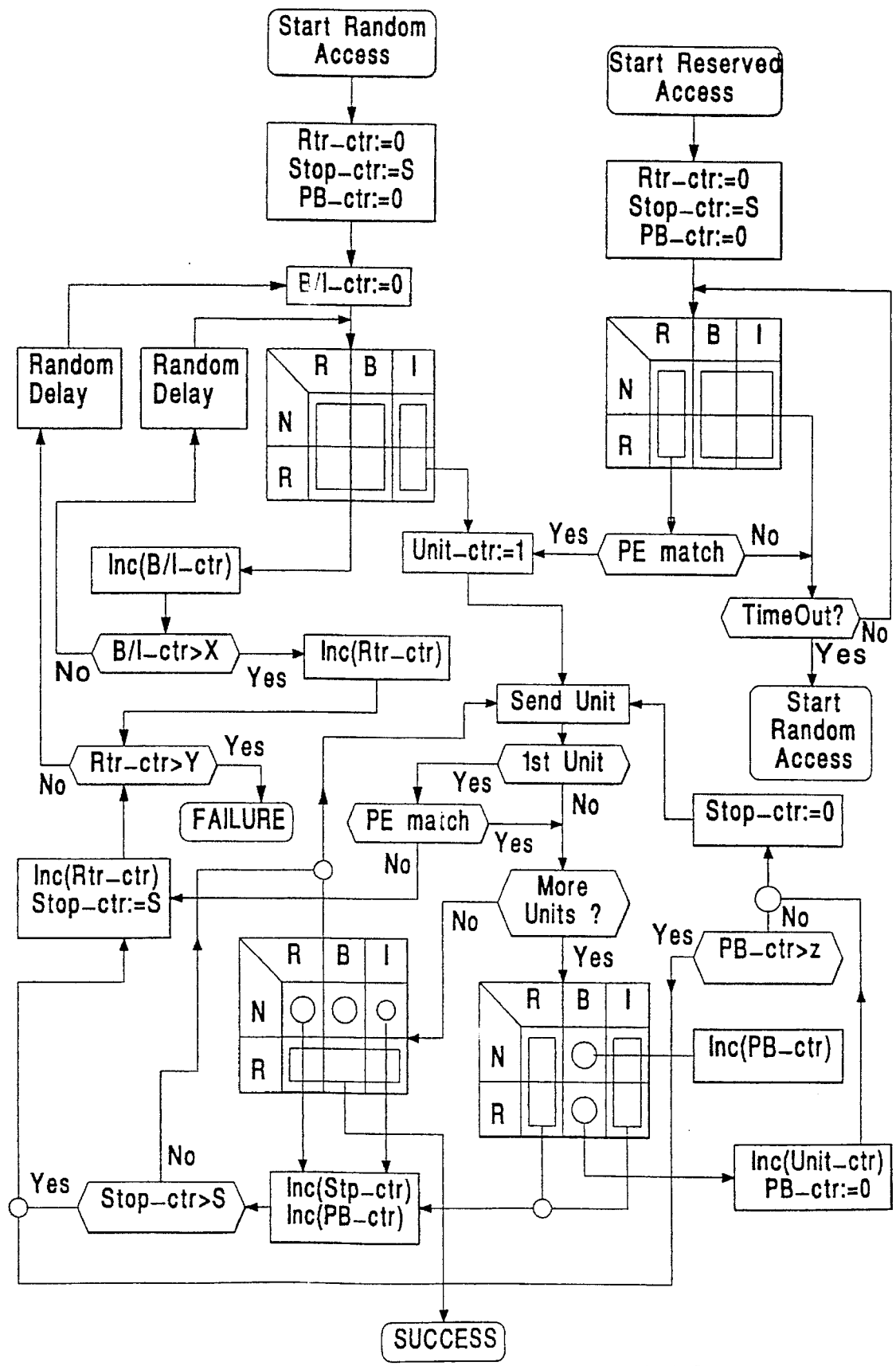
FIGS. 27A–B show the Random Access Procedures for MS and BS.
Figure 27B:
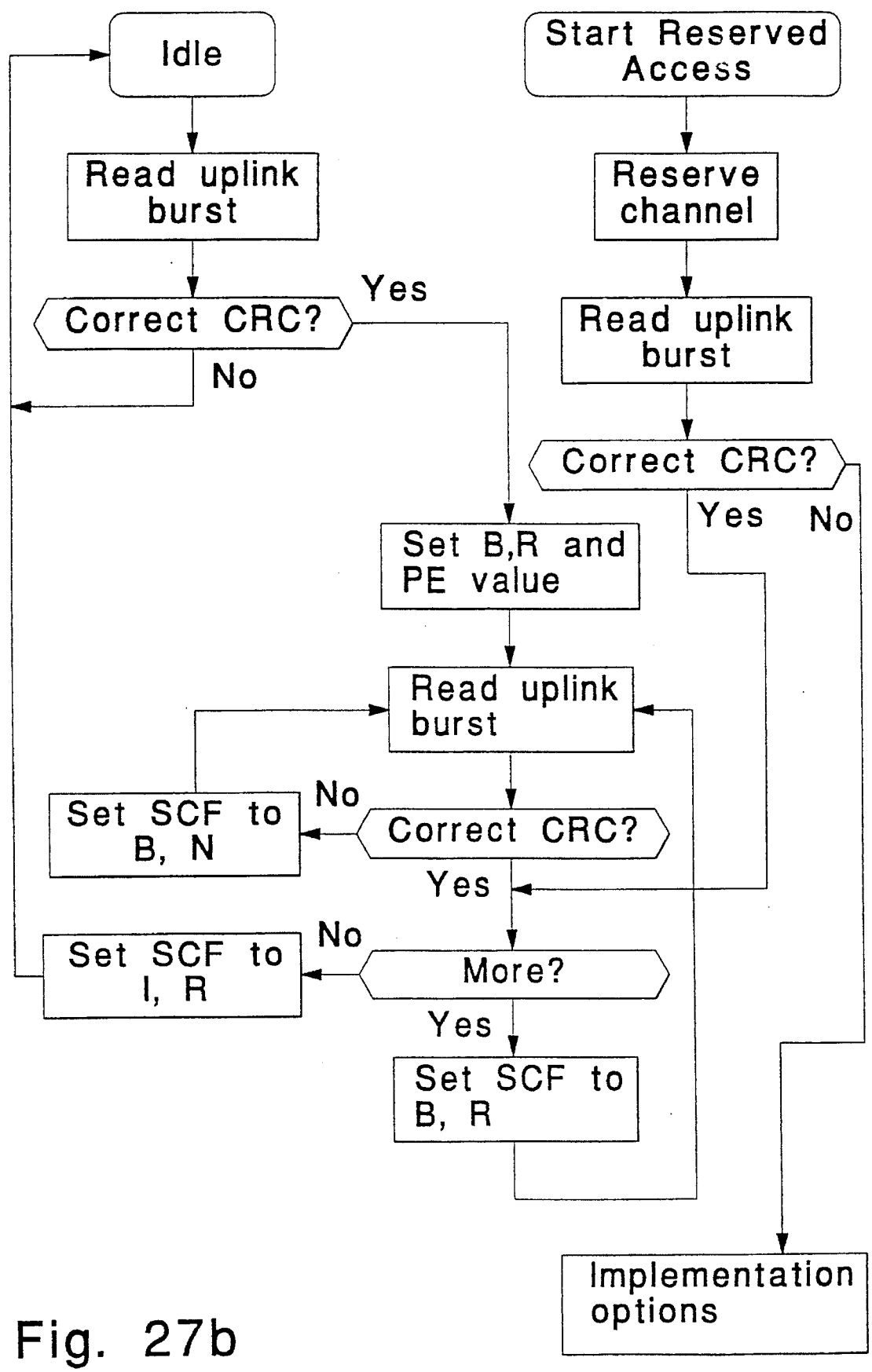

The foregoing random access procedures are illustrated in FIGS. 27A–B. FIG. 27A illustrates the random access procedure for the MS while FIG. 27B illustrates the random access procedure for the BS. Set forth below is an itemized description of the use of the truth table in the flow chart shown in FIG. 27A:

1. The truth table is examined at start of a contention based access. If SCF="reserved" or "busy" the mobile station shall increment the Busy/Idle counter and then compare it to X. If SCF="idle" the mobile station shall set Unit_ctr to 1 and send the first burst of the access.

2. The truth table is examined after sending a given burst of an access with at least one more burst pending. If SCF="idle" or "reserved" the mobile station shall increment Stop_ctr and PB_ctr and then compare Stop_ctr to S. If SCF="busy" and "not received" the mobile station shall increment PB_ctr and then compare it to Z. If SCF="busy" and "received" the mobile station shall increment Unit_ctr and set PB_ctr to zero.

3. The truth table is examined after sending last burst of an access. If SCF="received" then the mobile station shall increment Stop_ctr and PB_ctr and then compare Stop_ctr to S. If SCF="reserved" and "not received" the mobile station shall increment Stop_ctr and PB_ctr and then compare Stop_ctr to S. If SCF="busy" and "not received" the mobile station shall resend the last burst of the access.

4. The truth table is examined at start of a reservation based access. If SCF="busy" or "idle" then the mobile station examines the reservation timer. If SCF="reserved" and the PE does not match then the mobile station examines the reservation time. If SCF="reserved" and the PE does match then the mobile station shall set Unit_ctr to 1 and send the first burst of the access.

Monitoring of Radio Link Quality (MRLQ)

MeaSurement Procedure and Processing

The mobile shall measure the Word Errors during reading of one slot in each Paging Frame. During each Paging Frame, the MS may read one or more SPACH slots depending on the PCH continuation and the structure of the primary/secondary Superframes. However, only one reading shall update the MRLQ Word Error parameter, i.e., only one update per Paging Frame. During RACH operation, the MS must also read one forward slot per Paging frame for this purpose.

The MS shall initially set the MRLQ counter to ten (10) upon camping on a cell. Each MRLQ updating shall increase the MRLQ counter by one (1) if the CRC check was successful. A non-successful reading shall decrease the MRLQ counter by one (1). If the MRLQ counter value exceeds ten (10), the MRLQ counter shall be truncated to the value of ten (10), i.e., its value shall never exceed ten (10).

Radio Link Failure Criteria

Whenever the MRLQ counter reaches zero (0), a Radio Link Failure is declared. In such a case, the MS shall examine the Full_reselect_data parameter. The MS shall continue to perform RSS measurement on the frequencies in the NL until a the Full_reselect_data parameter equals one.

Mobile Assisted Channel Allocation (MACA)

General

When the mobile is in the Idle state, the mobile shall inform the system about the quality of the forward DCC (this function is referred to herien as Function i). The mobile generated report shall include results from Word Error Rate (WER), Bit Error Rate (BER) and Received Signal Strength (RSS) measurements. During the Idle state, the mobile shall also measure RSS on other frequencies and report to the system (this other function is referred to herein as Function ii).

Mode of Operation

From information received on the BCCH, the system can select the following modes:

1. MACA Disabled (MACA_STATUS=00)
2. Function i (MACA_STATUS=x1)
3. Function ii (MACA_STATUS=1x)
4. Enable Functions (i) and (ii) according to the type of access attempts (page response, origination and registration) by the MACA_TYPE parameter (MACA_TYPE=01, 10 and 11, respectively).

Broadcasted Information

The BCCH contains the following information:

1. MACA_STATUS: No MACA, Function i, Function ii, or both Function i and ii.
2. MACA_LIST: The system sends a list of up to 8 frequencies on the BCCH where the mobile shall measure Signal Strength.

3. MACA_TYPE: What type of access shall include Function i or ii information, if any, as part of MACA reports.

MACA Report Information Contents

The MACA reports shall contain the following information:

1. What type of MACA report is being made (Functions i and ii).
2. Whether a MACA report is based on a full measurement interval.
3. The measurement result for the specified MACA report.

Procedures

Measurement Procedure on Serving DCC (Function i)

Measurement Units

The mobile shall report Channel Quality and Signal Strength measurements. Channel Quality is defined as Word Error Rate (WER) and Bit Error Rate (BER). Signal Strength is measured in dBm.

Measurement Time Interval

The mobile performs a running average over the last 32 Paging Frames of its associated PCH for both Signal Quality and Signal Strength. The first SPACH reading shall update all three variables. Averaging of Signal Strength is done in dBm units. The averaging process may be similar to IS-54B MAHO.

Measurements Procedure on Other Channels (Function ii)

Measurement Units

The mobile shall report Signal Strength in units of dBm.

Measurement Time Interval

The mobile shall measure each frequency at least 4 times. The minimum time between measurements on the same frequency shall be 20 ms. The maximum time between measurements on the same frequency shall be 500 ms. Averaging of Signal Strength is done in dBm units. The MS may make the measurements continuously or only before an access.

MACA Report

The mobile informs the system through Mobilethe Complete_MACA_ Interval flag whether a full measurement interval was completed at the time the MACA report is sent.

SPACH ARQ

BMI Side

Start ARQ Mode

The BMI starts an ARQ Mode transaction by sending an ARQ Mode BEGIN frame containing the Mobile station identity (MSID), Partial Echo (PE) which is set to the 7 least significant bits of the mobile station's IS-54B MIN, Transaction identifier (TID) which uniquely identifies which instance of an ARQ mode transaction is being sent to the mobile station, L3 length indicator (L3LI) which a mobile station shall use to calculate the number of continuation frames expected to follow the ARQ Mode BEGIN frame, and a portion of the L3 data (L3DATA).

Start ARQ Mode Acknowledgment

After sending an ARQ Mode BEGIN frame, the BMI may wait for an acknowledgment from the mobile station since this frame contains information critical to the overall success of an ARQ Mode transaction. If the BMI decides not to wait for a mobile station acknowledgment, it shall proceed to send an ARQ Mode CONTINUE frame. Otherwise, the BMI shall proceed as follows: The BMI polls the mobile station by setting the BRI flag to "reserved" and by setting PE to the value corresponding to the target mobile station in the same downlink slot. The BMI then waits for an uplinkARQ Status message on the same access path on which it polled the mobile station. If an ARQ Status message is not received on the reserved access slot or is received but with an incorrect indication of outstanding frames, the BMI shall resend the Start ARQ mode message up to a predetermined number of times. If the BMI does not receive a correct ARQ Status message after a certain number of attempts, it shall terminate the ARQ Mode transaction. If the BMI does receive a correct ARQ Status message after a certain number of attempts, it shall proceed to send an ARQ Mode CONTINUE frame.

ARQ Mode Continuation

The BMI sends ARQ Mode CONTINUE frames to complete the initiated ARQ Mode transaction. These frames contain the Partial Echo (PE) which is set to the 7 least significant bits of the mobile station's IS-54B MIN, Transaction identifier (TID) which uniquely identifies which instance of an ARQ mode transaction is being sent to the mobile station, Continuation Frame Number (FRNO) which identifies individual continuation frames, and a portion of the L3 data (L3DATA). An ARQ Mode BEGIN frame has an implicit FRNO value of 0 associated with it whereas ARQ Mode CONTINUE frames have explicit FRNO values which start at 1. The FRNO value is incremented for each new ARQ Mode CONTINUE frame sent by the BMI in support of a specific ARQ Mode transaction.

The BMI may poll the mobile station after sending any intermediate ARQ Mode CONTINUE frame. If the BMI decides to issue an intermediate poll it shall proceed as follows: The BMI sets the BRI flag to "reserved" and sets PE to the value corresponding to the target mobile station within the same downlink slot. The BMI then waits for an uplinkARQ Status message on the same access path on which it polled the mobile station. If an ARQ Status message is not received on the reserved access slot the BMI shall resend the Start ARQ mode message up to a predetermined number of times. If the BMI does not receive a correct ARQ Status message after a certain number of attempts, it shall terminate the ARQ Mode transaction. If the BMI receives an ARQ Status message, it shall continue to send ARQ Mode CONTINUE frames beginning with those marked as being received incorrectly. When the BMI sends the last ARQ Mode CONTINUE frame, it shall proceed as indicated in the next section.

ARQ Mode Termination

The BMI polls the mobile station after sending the last ARQ Mode CONTINUE frame as follows: The BMI sets the BRI flag to "reserved" and sets PE to the value corresponding to the target mobile station within the same downlink slot. The BMI then waits for an uplink ARQ Status message on the same access path on which it polled the mobile station. If an ARQ Status message is not received on the reserved access slot, the BMI shall resend the Start ARQ mode message up to a predetermined number of times. If the BMI does not receive a correct ARQ Status message after a certain number of attempts, it shall terminate the ARQ Mode transaction. If the BMI receives an ARQ Status message and the FRNO MAP indicates "all correct", the ARQ Mode transaction is considered to be successfully completed. If the BMI receives an ARQ Status message and the FRNO MAP does not indicate "all correct", it shall resend those ARQ Mode CONTINUE frames marked as being received incorrectly. The BMI shall resend any given ARQ Mode CONTINUE frame up to a predetermined maximum number of times before terminating the ARQ Mode transaction.

MS Side

Start ARQ Mode

After a mobile station has entered start ARQ Mode and successfully completed transmission of the first burst of an ARCH or SMSCH message (as indicated by the SCF flags), the mobile station shall read the ARCH or SMSCH in up to a predetermined number of SPACH frames beginning 40 ms after successfully completing the transmission of this burst. When it receives an ARQ Mode BEGIN frame with a MSID matching its own, the mobile station shall proceed as follows: The TID shall be stored for ARQ Mode transaction identification purposes. The number of pending ARQ Mode CONTINUE frames shall be calculated based on the received L3LI. The FRNO MAP shall be set to RECEIVED for FRNO zero (corresponding to the ARQ Mode BEGIN) and NOT RECEIVED for all pending ARQ Mode CONTINUE frames. The FRNO MAP supports BMI transmissions up to 32 ARQ Mode frames in length (1 BEGIN and 31 CONTINUE). The portion of the L3 message carried in L3DATA shall be stored. The mobile station shall then proceed as described in the next section.

ARQ Mode Continuation

Figure 28A:
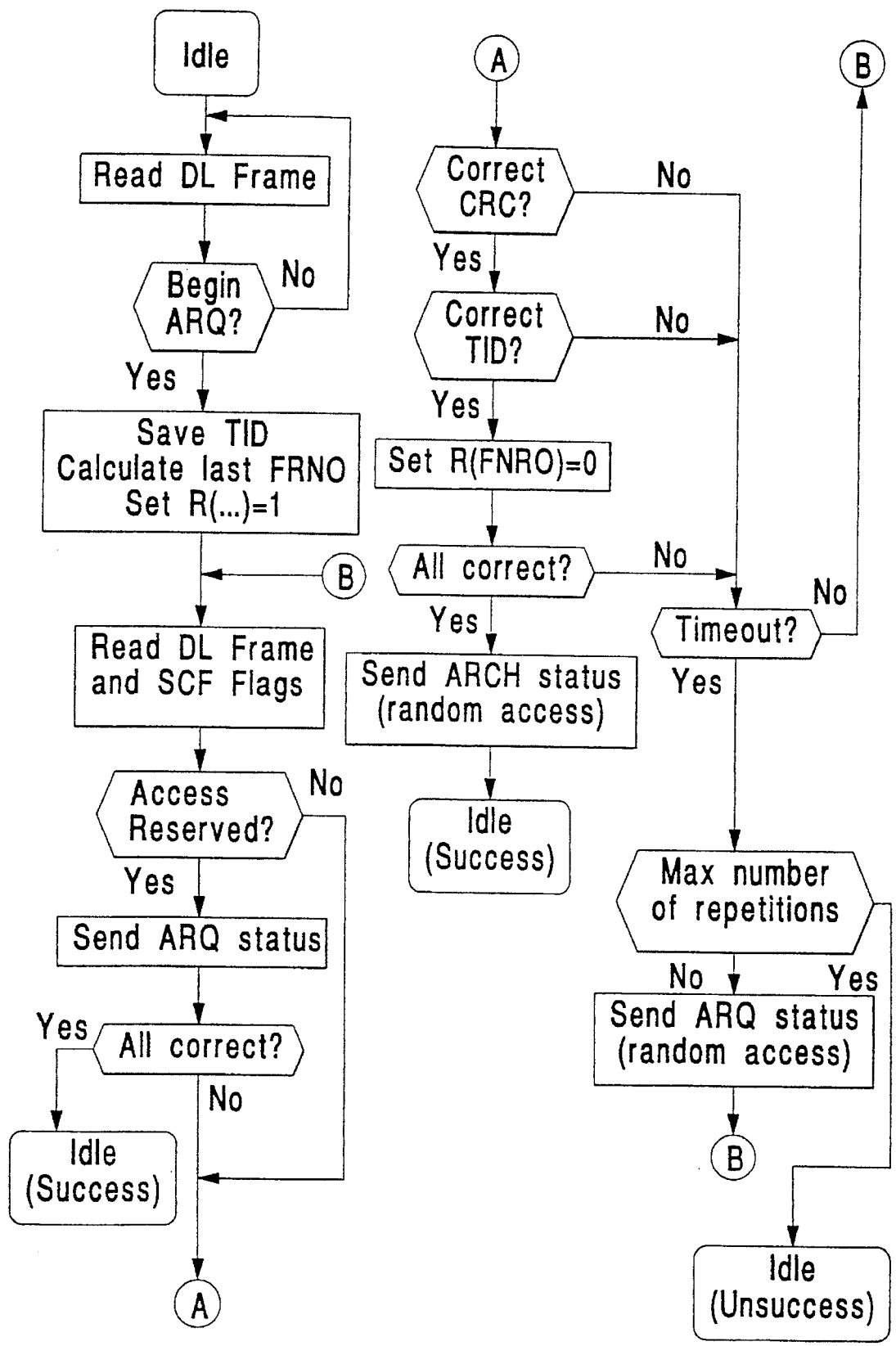
FIGS. 28A–B show MS and BS operation in SPACH ARQ Mode.
Figure 28B:
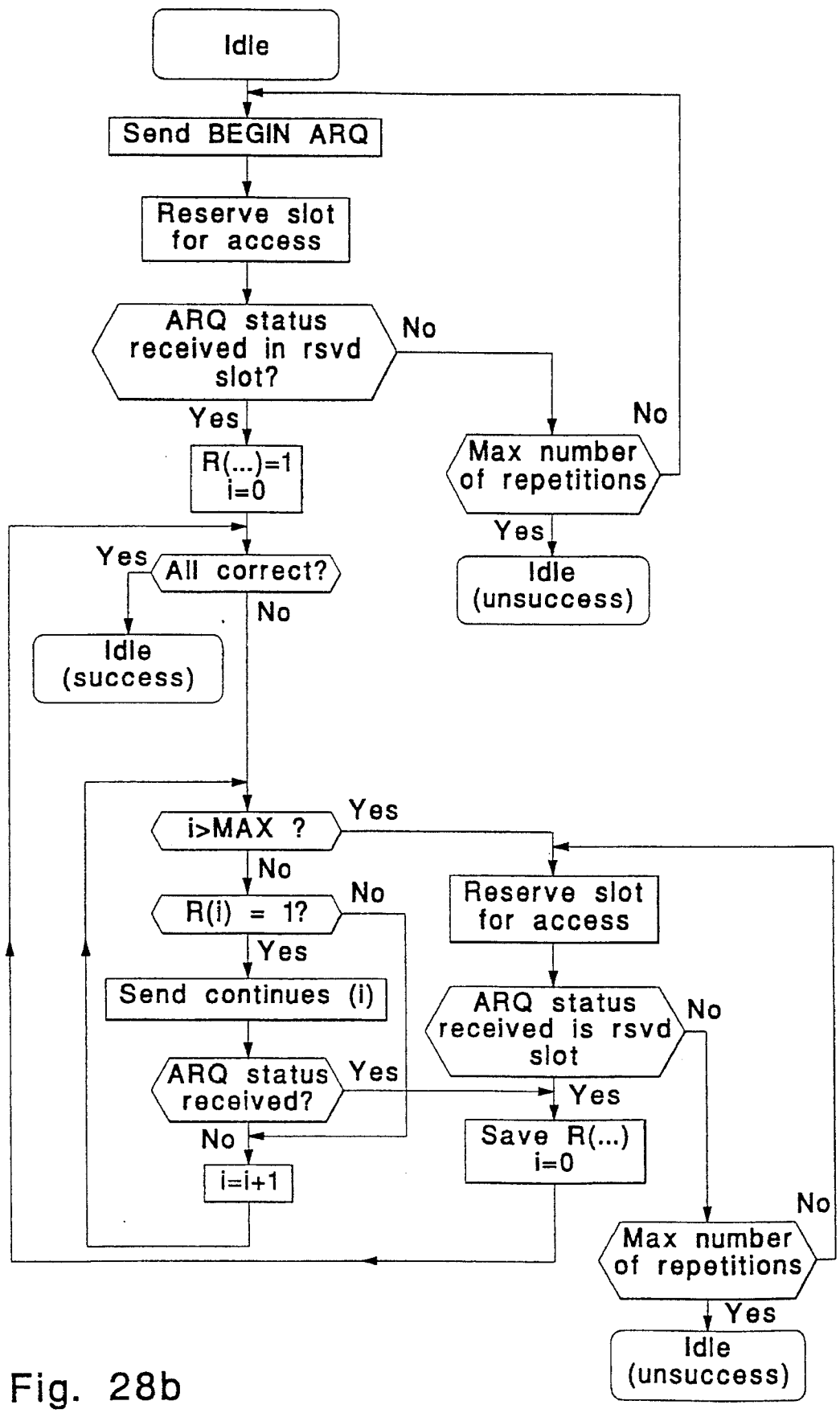

The mobile station shall read SPACH frames and respond as follows: If a poll occurs (i.e., a PE match occurs along with an SCF reservation indication), the mobile station shall send an ARQ Status to the BMI with a FRNO MAP that indicates the current FRNO reception status. If the FRNO MAP indicates that an "all correct" condition exists, the mobile station consider the corresponding ARQ Mode transaction to be successfully completed. If an ARQ Mode CONTINUE frame is correctly received for an outstanding ARQ Mode transaction (i.e., PE and TID match) the mobile station shall store the L3DATA contained therein and set the corresponding FRNO MAP position to RECEIVED. If no ARQ Mode CONTINUE frame or poll is received for a predetermined period, the mobile station shall transmit an ARQ Status message using a contention based random access. A maximum number of such spontaneous ARQ Status transmissions may be sent before the corresponding ARQ Mode transaction is terminated. FIGS. 28A-B illustrate operation in SPACH ARQ Mode for the MS (FIG. 28A) and BS (FIG. 28B).

Layer 3 and Higher Layers

Layer 3 Operation

Figure 29:
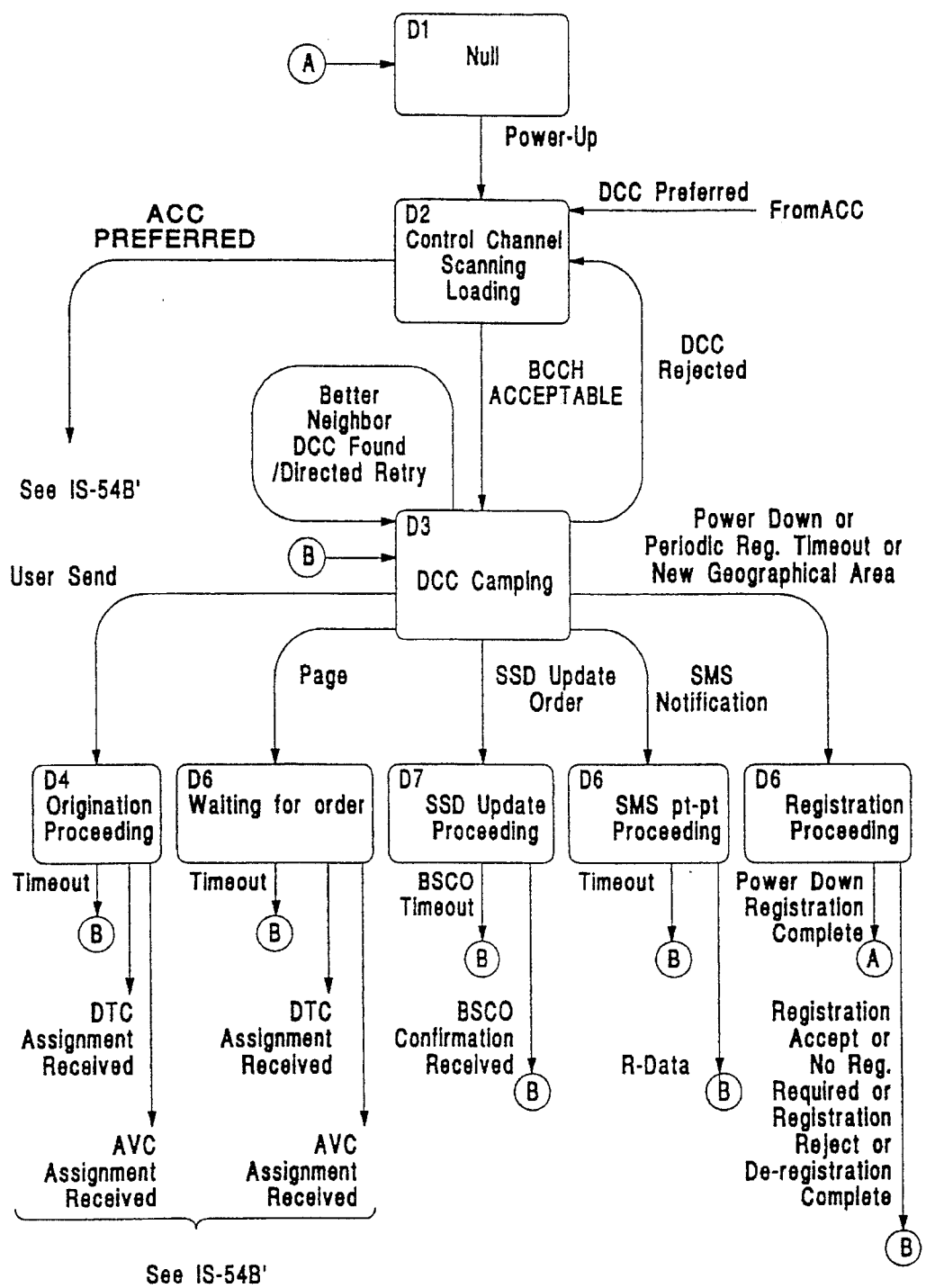
FIG. 29 shows the Mobile Station State diagram.

FIG. 29 illustrates the mobile station state diagram which is discussed in more detail below.

Mobile Station State Descriptions

Null State (D1)

A mobile station shall be in the "Null" state if it is powered down. When a power up occurs, a mobile station shall enter the "Control Channel Scanning and Locking" state.

Control Channel Scanning and Locking State (D2)

A mobile station shall be in the "Control Channel Scanning and Locking" state when it is in the process of selecting a candidate service provider (ACC or DCC). While in this state, a mobile station may at any time determine that an analog control channel (ACC) is the preferred service provider in which case it shall enter the Initialization task (see 2.6.1 of IS-54B). Otherwise, the mobile station shall attempt to find a digital control channel (DCC) service provider. It may search for a candidate DCC as described below in the section on DCC Scanning and Locking procedure. If a mobile station finds a candidate DCC, it shall execute the Cell Selection procedure discussed below. If the candidate DCC satisfies the criteria described in the Cell Selection procedure, the mobile station shall enter the "DCC Camping" state discussed below. Otherwise, the mobile station shall search for another candidate DCC.

The DCC Camping State (D3)

A mobile station shall be in the "DCC Camping" state as long as it is logically connected to the "best" cell according to the cell selection rules set forth below. The mobile station will leave this state at cell reselection or when accessing the system for a mobile originating call, a mobile terminating call, a registration, an SSD Update or a Point-to-Point SMS (mobile station terminated). The mobile station shall not exit the "DCC Camping" state when reading the broadcast information of its current DCC or of a neighbor DCC. While in this state, the mobile station performs different tasks depending on which information is received.

If a BCCH message is received, the mobile station shall update stored BCCH information according to the received message. If a Registration Parameters message is received and the optional information element "REGID Parameters" is not part of this message, then the mobile station shall not increment REGID on this DCC. If the optional information elements "REGID Parameters" and "REG Period" are part of this message, the mobile station shall keep an updated copy of REGID either by continuously monitoring it or by internally incrementing it every REGID_PER superframes. The mobile station shall then invoke the Registration procedure described below.

If a BCCH Neighbor Cell message is received, the mobile station shall begin monitoring the neighbor DCCs for cell reselection purposes by invoking the Cell Reselection procedure as necessary.

The mobile station shall respond to the following conditions as indicated:

PER_COUNTER Timeout: The Registration procedure shall be invoked.

REREG_TMR Timeout: The Registration procedure shall be invoked.

REGID Increment Event: The Registration procedure shall be invoked.

Power Down Event: The Registration procedure shall be invoked.

FDCC Indication primitive received containing a PCH message: The Termination procedure shall be invoked.

User Origination: The Origination procedure shall be invoked.

Current DCC Barred: If the current DCC becomes barred the mobile station shall invoke the Cell Reselection procedure in order to select a new service provider from its neighbor list.

Registration proceeding (D6)

A mobile station shall be in the "Registration Proceeding" state after it has sent a Registration message to the base station but has not yet received an answer. The mobile station shall respond to the following conditions as indicated:

REG_TMR Timeout: If the mobile station has resent its registration up to the maximum of 5 times, it shall terminate this procedure and then enter the DCC Camping state. Otherwise, it shall set REREG_TMR timer to a random time uniformly distributed in the interval 10 to 100 seconds, terminate this procedure and then enter the DCC Camping state.

ARCH message received: If a registration Accept message is received, the mobile station shall terminate this procedure and then invoke the Registration Success procedure described below. If a registration Reject message is received the mobile shall terminate this procedure and then invoke the Registration Failure procedure.

PCH message received: Stop REG_TMR, terminate this procedure and then invoke the Termination procedure described below.

Origination Proceeding (D4)

A mobile station shall be in the "Origination Proceeding" state after it has successfully sent an Origination message but has not yet received a response from the BMI. The mobile station shall respond to the following conditions as indicated:

ORIG_TMR Timeout: Terminate this procedure and then enter the DCC Camping state.

ARCH message received: If a Digital Traffic Channel Designation message is received the mobile station shall stop ORIG_TMR, update the parameters as received in the message, invoke the Registration Update procedure and then enter the Confirm Initial Traffic Channel task (see 2.6.5.2 of IS-54B). If a Analog Traffic Channel Designation message is received the mobile station shall stop ORIG_TMR, update the parameters as received in the message, invoke the Registration Update procedure and then enter the Confirm Initial Voice Channel task (see 2.6.4.2 of IS-54B).

Waiting for Order (D5).

A mobile station shall be in the "Waiting for Order" state after it has successfully sent a Page Response in response to a Page but has not yet received a response from the BMI. The mobile station shall respond to the following conditions as indicated:

WAFO_TMR Timeout: Terminate this procedure and then enter the DCC Camping state.

ARCH message received: If a Digital Traffic Channel Designation message is received the mobile station shall stop WAFO_TMR, update the parameters as received in the message, invoke the Registration Update procedure and then enter the Confirm Initial Traffic Channel task (see 2.6.5.2 of IS-54B). If a Analog Traffic Channel Designation message is received the mobile station shall stop WAFO_TMR, update the parameters as received in the message, invoke the Registration Update procedure and then enter the Confirm Initial Voice Channel task (see 2.6.4.2 of IS-54B).

SMS Point-to-Point Proceeding (D8)

A mobile station enters the "SMS Point-to-Point Proceeding" state after it has successfully sent a SPACH Confirmation in response to an SMS Notification but has not yet received a response from the BMI. The mobile station shall respond to the following conditions as indicated:

SMS_Timeout: Terminate this procedure and then enter the DCC Camping state.

ARCH message received: If an R-DATA message is received and accepted by the mobile station, it shall stop SMS_TMR, update the information as received in the message, send an R-DATA ACCEPT message, terminate this procedure and then enter the DCC Camping state. If an R-DATA message is received and rejected by the mobile station, it shall stop SMS_TMR, send an R-DATA REJECT message, terminate this procedure and then enter the DCC Camping state.

PCH message received: Stop SMS_TMR, terminate this procedure and then invoke the Termination procedure described below.

SSD Update Proceeding (D7)

A mobile station shall be in the "SSD Update Proceeding" state after it has successfully sent a BMI Challenge Order in response to an SSD Update Order but has not yet received a response from the BMI. The mobile station shall respond to the following conditions as indicated: SSDU_TMR expires: Terminate this procedure and then enter the DCC Camping state.

ARCH message received: If a BMI Challenge Order Confirmation is received the mobile station shall stop SSDU_TMR, update the parameters as received in the message, send an SSD Update Order Confirmation message, terminate this procedure and then enter the DCC Camping state.

PCH message received: Stop SSDU_TMR, terminate this procedure and then invoke the Termination procedure described below.

Procedures

DCC Scanning and Locking

Finding DCC

Two techniques may be used to expedite the acquisition of a DCC by the mobile station: DCC probability assignment and DCC locator.

DCC Probability Assignments

To aid the mobile in searching for a DCC, the available frequencies may be grouped into blocks which are assigned different probabilities which reflect the relative likelihood of finding a DCC in each block. In this manner, the time required for service acquisition by the mobile station may be significantly decreased. The following two tables illustrate how the channels in the A-Band and B-Band, respectively, may be assigned different relative probabilities for supporting DCC accquisition. This technique is typically used by a mobile station before it has received any DCC locator information (described below). Once a mobile station has received DCC locator information, it shall use this information in lieu of the channel block probability scheme described herein.

| A-Block | | B-Block | |
| --- | --- | --- | --- |
| Channel Numbers | Relative Propability | Channel Numbers | Relative Probability |
| 1–26 | 1 | 334–354 | 16 |
| 27–52 | 2 | 355–380 | 1 |
| 53–78 | 3 | 381–406 | 2 |
| 79–104 | 4 | 407–432 | 3 |
| 105–130 | 5 | 433–458 | 4 |
| 131–156 | 6 | 459–484 | 5 |
| 157–182 | 7 | 485–510 | 6 |
| 183–208 | 8 | 511–536 | 7 |
| 209–234 | 9 | 537–562 | 8 |
| 235–260 | 10 | 563–588 | 9 |
| 261–286 | 11 | 589–614 | 10 |
| 287–312 | 12 | 615–640 | 11 |
| 313–333 | 16 | 641–666 | 12 |
| 667–691 | 13 | 717–741 | 13 |
| 692–716 | 14 | 742–766 | 14 |
| 991–1023 | 15 | 767–799 | 15 |

DCC Locator

The DCC Locator (DL) is a 7-bit parameter which provides information to assist a mobile station in finding a DCC. The DL identifies for the mobile station the RF channels which carry DCC. DL values 1,2,3, . . . 127 are encoded to form the CDL which is sent on the DTC in bit positions 314 to 324 in a TDMA slot (see physical layer description). DL values 1,2,3 . . . 127 are mapped to channel numbers 1–8, 9–16, 17–24, . . . 1009–1016, respectively. Thus, for example, if a DCC occupies channel number 10, then a DL value of 2 would be sent on the DTCs in the same cell. The DL value of zero does not provide any DCC location information, but instead indicates that no DL information is being provided by the system.

Priority Channel Assignments

All channel numbers are valid candidates for DCC assignment. Considering that the DL does not uniquely identify any particular channel number, it is desirable that a priority scheme be established within each channel block. A mobile station receiving the DL value associated with a particular channel block will not automatically search all channels, but wil instead search for a DCC in this block in accordance with the priority scheme. Thus, for example, for a DL value of 1, a mobile station shall examine channel numbers 8 through 1 starting with channel 8 then 7, etc., in an attempt to find the DCC.

Discrimination Between DCC and DTC
CDVCC and CSFP Field Information

Although the IS-54B DTC and DCC downlink slot format have structural commonality, there are certain differences which allow for distinguishing a DCC from a DTC. First, because of the differences in the channel coding of DVCC and SFP, there are always 4 bits out of 12 which are different in every pair of CDVCC and CSFP codewords regardless of which CDVCC or CSFP codeword is transmitted by a base station (bit errors introduced due to radio channel impairments, however, may change the extent to which transmitted codewords differ once they are received by a mobile station). Secondly, the CDVCC content is fixed from slot to slot on a DTC whereas the content of the CSFP changes in a predictable fashion from slot to slot on a DCC.

DATA Field Information

The channel coding and interleaving employed on a DTC is different from that employed on a DCC regardless of the DTC service (speech or FACCH). This difference may be used to discriminate between the DCC and DTC.

SACCH and RESERVED Field Information

The IS-54B SACCH and RESERVED fields have different functionality on a DCC. Hence, these fields may also be used to distinguish between a DCC and a DTC.

Cell Selection

The Cell Selection procedure is executed in order to allow a mobile station to determine whether or not a given candidate DCC is acceptable for camping purposes. The mobile station shall always execute the Path Loss Determination procedure (described below) and may optionally execute the Service Aspects Determination procedure (also described below). The mobile station shall then return to the invoking procedure.

Path Loss Determination

The mobile station uses the "path loss criterion" $C\_PL>0$ to determine whether or not a candidate DCC is suitable for camping purposes:

$$C\_PL=RSS-RSS\_ACC\_MIN-MAX(MS\_ACC\_PW-P, 0)>0$$

where:

RSS is the averaged received signal strength. Signal strength measurements may be performed in a manner similar to the Signal Strength Measurement Technique task in IS-54B.

RSS_ACC_MIN is a parameter broadcasted on BCCH. It is the minimum received signal level required to access the cell.

MS_ACC_PW is a parameter broadcasted on the BCCH. It is the maximum output power that the mobile station may use when initially accessing the network.

P is the maximum output power of the mobile station as defined by its power class according to IS-54B.

If the candidate DCC does not meet the path loss criteria, it shall be rejected by the mobile station. The mobile station shall then return to the invoking procedure.

Servise Aspects Determination
Mandatory

If the candidate DCC is identified as Barred according to the "Cell Barred" parameter broadcast in the Access Parameters message, it shall be rejected by the mobile station. If this procedure was invoked as a result of a Cell Selection, and the ISP flag broadcast in the Cell Selection Parameters is set, the mobile shall not select the cell unless there are no other cells that meet the path loss criteria $C\_PL$. If the candidate DCC is marked Private according to the NETWORK TYPE (see below), and the PSID match criteria is not met, the mobile station shall not attempt to camp or register on the private system.

Optional

If the candidate cell does not provide a desired service to the mobile station, the mobile is authorized to (re)select a cell among the cells that meet the first set of criteria under Reselection Criteria below (i.e., the mobile station may not need to select the best RF neighbor)

Cell Reselection

The Cell Reselection procedure is executed in order to allow a mobile station to determine whether or not a given neighbor DCC constitutes a better service provider than its current DCC. The mobile station shall always execute the Cell Reselection Algorithm and the Reselection Criteria procedure described below, and then return to the invoking procedure.

Scanning procedure

There are two information elements sent on the BCCH related to the scanning process: SCANFREQ and HL_FREQ. SCANFREQ is sent in the cell selection message on the F-BCCH and informs the mobile about the default minimum required number of Signal Strength (SS) measurement per Superframe. The MS shall perform a total of SCANFREQ SS measurement per SF regardless of the size of the Neighbor List (NL). However, this default rule may be modified by the HL_FREQ information. The HL_FREQ is sent in the NL. There is one HL_FREQ associated with each entry (frequency) in the NL. If the HL_FREQ is set to HIGH, this particular frequency shall be measured according to the basic rule as defined by the SCANFREQ rule. If the HL_FREQ is set to LOW, this particular frequency may be measured with half the frequency required by the default SCANFREQ rule. For example, if the NL contains 16 entries, some of them having HL_FREQ set to HIGH, the rest set to LOW, and the SCANFREQ is set to 12 measurement per SF, then the number of measurement on entries marked as HIGH shall be measured with a minimum rate of 12/16 per SF, and the number of measurement on entries marked as LOW shall be measured with a minimum rate of 12/16/2 per SF.

Basic Procedure and Requirements

The mobile shall determine the number of measurements per entry per Superframe according the information in the NL (frequency & HL_FREQ) and the measurement parameter SCANFREQ. This requirement is defined as the Basic Measurement Requirement (BMR). Thus, the BMR may require different measurement frequencies for different entries. However, a MS may chose to measure all frequencies assuming all entries are treated as having HL_FREQ set to HIGH. The MS shall spread the timing of the measurement as even as possible over all frequencies. The default and potential modified Paging Frame class assigned to the MS shall not influence the MS procedure.

Optional Enhancements to Basic Procedure

To facilitate sleep mode efficiency, the MS is allowed to alter the BMR procedure described in Basic Procedure and Requirements and still conform to the specification. Only the frequency of measurement requirement may be changed. There are three techniques that may be used by the MS to minimize the battery drain. All three techniques may be applied simultaneously if the prerequisite conditions are satisfied. The three techniques and the relevant conditions are as follows:

1. If the number of cell reselection executed by the MS during an extended period of time (>5 hours) has been very low (<5), AND the time expired since the last cell reselection is >2 hours, then the mobile is allowed to reduce the measurement frequency on all but the serving DCC compared to the BMR by a factor of 2. This reduction is revoked if the MS executes a cell reselection.

2. If the rate of change of the Signal Strength (SS) on the serving DCC is <5 dB over the last 5 minutes, AND the rate of change of the Signal Strength (SS) on all the entries in the NL is <5 dB over the last 5 minutes, then the mobile is allowed to reduce the measurement frequency on all but the serving DCC compared the BMR by a factor of 2.

3. If the rate of change of the difference between the SS of the serving DCC and a specific entry in the NL is <5 dB over the last 5 minutes, then the mobile is allowed to reduce the frequency of measurement on the particular entry of the NL satisfying the condition above by a factor of 2.

The reductions of the measurement frequency according to 2 and 3 above is revoked if the rate of change of the Signal Strength (SS) on the serving DCC is >5 dB over the last 20 Paging Frames, or if the rate of change of the Signal Strength (SS) on any entry in the NL is >5 dB over the last 100 Superframes.

Processing of Measured Data

Upon camping on a cell the parameter Full_reselect_data is set to zero. After each entry in the Neighbor List is measured 4 time, the Full_reselect_data parameter is set to one.

Reselection Criteria

A mobile station uses the "cell reselection criterion" C_RES to determine the best candidate DCC to camp on. The mobile station shall select a new serving DCC from the list of candidates if it fulfills the following criteria:

$(C\_PL_{new} > 0)$ AND
$(T > DELAY)$ AND
$[(CELLTYPE = PREFERRED$ AND $RSS_{new} > SS\_SUFF_{new})$ OR
$(CELLTYPE = REGULAR$ AND $C\_RES > 0)$ OR
$(CELLTYPE = NON\_PREFERED$ AND $RSS_{old} < SS\_SUFF_{old})$ ]
where:
$C\_RES = C\_PL_{new} - C\_PL_{old} + RESEL\_OFFSET_{new} - RESEL\_OFFSET_{old}$
C_PL is the "path loss criterion".
$C\_PL_{new}$ is C_PL for a candidate DCC.
$C\_PL_{old}$ is C_PL for the current DCC.
T is a timer which starts when $C\_PL_{new}$ becomes greater than 0. T is reset when $CP\_L_{new}$ becomes less than or equal to 0.
DELAY is a parameter broadcasted on BCCH (see below).
RESEL_OFFSET is a parameter broadcasted on BCCH (see below).
$RESEL\_OFFSET_{new}$ is the reselection offset associated with the candidate DCC.
$RESEL\_OFFSET_{old}$ is an offset associated with the current DCC.
CELLTYPE is a parameter broadcasted on BCCH (see below). It takes the values REGULAR, PREFERRED, or NON_PREFERRED.
SS_SUFF is a parameter broadcasted on BCCH (see below).
$SS\_SUFF_{new}$ is SS_SUFF for a candidate DCC.
$SS\_SUFF_{old}$ is SS_SUFF for the current DCC.
$RSS_{new}$ is RSS for a candidate DCC.
$RSS_{old}$ is RSS for the current DCC.

Whenever candidate DCCs of more than one CELLTYPE fulfill the criteria, they shall be selected in priority order of PREFERRED, REGULAR, NON_PREFERRED. Whenever more than one candidate DCC of the same CELLTYPE fulfills the criteria, the DCC with the maximum C_RES value shall be selected. However, a candidate DCC with a lower C_RES may still be selected if its C_RES fulfills the following:

$C\_RES \geq MAX[MAX[C\_RES_1, C\_RES_2, \ldots C\_RES_N] - SERV\_SS, 0]$ where:
SERV_SS is an offset value broadcast on BCCH.

To allow the MS to avoid "ping-pong" cell selection and reselection, the MS is not required to return to the cell on which it was previously camped within 10 seconds after a reselection.

Termination

When this procedure is invoked the mobile station shall determine which of the following PCH messages has been received and respond as indicated:

Page:

The mobile station shall send a Page Response message, start WAFO TMR, terminate this procedure and then enter the Waiting for Order state.

SSD Update Order:

The mobile station shall send a BMI Challenge Order, start SSDU_TMR, terminate this procedure and then enter the SSD Update Proceeding state.

SMS Notification:

The mobile station shall send a SPACH Confirmation, start SMS_TMR, terminate this procedure and then enter the SMS Point-to-Point Proceeding state.

Unique Challenge Order:

The mobile station shall send a Unique Challenge Order Confirmation according to the Unique Challenge-Response procedure, terminate this procedure and then enter the DCC Camping state.

Message Waiting:

The mobile station shall send a SPACH Confirmation, terminate this procedure and then enter the DCC Camping state.

Parameter Update:

The mobile station shall send a SPACH Confirmation, terminate this procedure and then enter the DCC Camping state.

Directed Retry:

The mobile station shall send a SPACH Confirmation, mark the current DCC as barred for the duration indicated in the Directed Retry message, terminate this procedure and then enter the DCC Camping state.

Go Away:

The mobile station shall send a SPACH Confirmation, mark the current DCC as barred for the duration indicated in the Go Away message, terminate this procedure and then enter the Control Channel Scanning and Locking state.

Capability Request:

The mobile station shall send a Capability Report, terminate this procedure and then enter the DCC Camping state.

Origination

When this procedure is invoked the mobile station shall wait for an F-BCCH Access Parameters message and examine the Overload Control (OLC) information element contained therein. The mobile station shall then proceed as follows: If the mobile station is barred from making accesses according to OLC, or if the mobile station has not yet received a full set of F-BCCH messages on its current DCC, it shall terminate this procedure and then enter the DCC Camping state. Otherwise, the mobile station shall formulate an Origination. If the BMI requires serial number information (S bit set to 1 on Access Parameters message), the mobile station shall formulate a Serial Number message. If the BMI requires authentication information (AUTH bit set to 1 on Access Parameters message), the mobile station shall also formulate an Authentication message according to the Authentication of Mobile Station Originations procedure. The mobile station shall then send an Origination along with any other coincidental messages required as described above, start ORIG_TMR and then enter the Origination Proceeding state.

SMS Point to Point

The layer 3 SMS point to point operation makes use of 3 bi-directional messages: R-DATA, R-DATA ACCEPT and R-DATA REJECT. The R-DATA message shall be used to carry the SMS application layer messages. Within the context of the following layer 3 short message service procedures, two categories are identified: MS terminated SMS and MS originated SMS.

MS Terminated SMS Procedure

Within the context of this layer 3 procedure, the MS terminated SMS includes delivery of a short message (i.e., SMS DELIVER application message) and SMS feature status report (i.e., SMS FEAT CTRL STATUS application message) to the MS.

SMS Delivery on DCC

If the MS is in "DCC camping" state, the BMI shall page the MS and wait to receive a page response message from the MS. Once the BMI has received the page response, the BMI sends the R-DATA message, which contains the SMS DELIVER application message, to the mobile station by using a SPACH frame type indicating SMS point to point and L2 acknowledge mode. The BMI then starts timer X. Upon reception of the R-DATA message, the mobile station shall provide a layer 3 acknowledgment to the BMI as follows: If the R-DATA message is acceptable to the MS, the MS shall respond by sending a R-DATA ACCEPT message with the same R-Transaction Identifier present in the R-DATA message. If the R-DATA message is not acceptable to the MS, the MS shall respond by sending a R-DATA REJECT message with the same R-Transaction Identifier present in R-DATA message, and with the mandatory R-Cause information element. If the BMI timer X expires prior to receiving a layer 3 acknowledgment, the BMI may retransmit R-DATA. The BMI shall not re-transmit R-DATA more than once.

SMS delivery on DTC

If the MS is already assigned a DTC (e.g., involved in a call), the BMI sends the R-DATA message which contains the SMS DELIVER application message, to the mobile station by using a FACCH or SACCH with the transmission service indicating L2 acknowledge mode. The BMI then starts timer Y. Upon reception of the R-DATA message, the mobile station shall provide a layer 3 acknowledgment to the BMI, as follows: If the R-DATA message is acceptable to the MS, it shall respond by sending a R-DATA ACCEPT message with the same R-Transaction Identifier present in the R-DATA message. If the R-DATA message is not acceptable to the MS, it shall respond by sending a R-DATA REJECT message with the same R-Transaction Identifier present in R-DATA message, and with the mandatory R-Cause information element. If the BMI timer Y expires prior to receiving a layer 3 acknowledgment, the BMI may re-transmit R-DATA. The BMI shall not retransmit R-DATA more than once.

MS Originated SMS Procedure

Within the context of this layer 3 procedure, the MS originated SMS includes: MS originated short message (i.e., SMS SUBMIT application message), MS user acknowledgment (i.e., SMS USER ACK application message) and SMS feature control by the MS (i.e., SMS FEAT CTRL REQU application message).

MS Originated SMS on the DCC

When a MS in "DCC camping" state is required by the MS SMS application layer to send a short message, the MS shall first examine the SMS access flag broadcast on the BCCH indicating the maximum SMS message length the MS is authorized to send on the RACH. If the MS R-DATA message length is greater than the maximum SMS message length (in octets) authorized by the BMI, the MS shall refrain from transmitting the R-DATA message.

If the MS R-DATA message length is less than the maximum SMS message length (in octets) authorized by the BMI, the MS may send the R-DATA message, providing that the registration rules allow the MS to access the system.

The MS initiates transmission of the R-DATA message by sending a RDCC request primitive to layer 2. If the R-DATA message is sent, the MS starts timer X. Upon reception of the R-DATA message, the BMI shall provide a layer 3 acknowledgment to the MS, as follows: If the R-DATA message is acceptable to the BMI, it shall respond by sending a R-DATA ACCEPT message with the same R-Transaction Identifier present in the R-DATA message to acknowledge. If the R-DATA message is not acceptable to the MS, it shall respond by sending a R-DATA REJECT message with the same R-Transaction Identifier present in the R-DATA message to acknowledge, and with the mandatory R-Cause information element. If the MS timer Y expires prior to receiving a layer 3 acknowledgment, the MS may re-transmit R-DATA. The MS shall not re-transmit R-DATA more than once.

MS originated on the DTC

If the MS is already assigned a DTC (e.g., involved in a call), the MS sends the R-DATA message to the BMI by either using a FACCH or SACCH with the transmission service indicating L2 acknowledge mode. The MS then starts timer Z. Upon reception of the R-DATA message, the BMI shall provide a layer 3 acknowledgment to the MS, as follows: If the R-DATA message is acceptable to the BMI, it shall respond by sending a R-DATA ACCEPT message with the same R-Transaction Identifier present in the RDATA message to acknowledge. If the R-DATA message is not acceptable to the MS, it shall respond by sending a R-DATA REJECT message with the same R-Transaction Identifier present in the R-DATA message to acknowledge, and with the mandatory R-Cause information element. If the MS timer Z expires prior to receiving a layer 3 acknowledgment, the MS may re-transmit R-DATA. The MS shall not re-transmit R-DATA more than once.

Registration

When this procedure is invoked the mobile station shall wait for an F-BCCH Access Parameters message and examine the Overload Control (OLC) information element contained therein. The mobile station shall then proceed as follows: If the mobile station is barred from making accesses according to OLC, it shall terminate this procedure and then enter the DCC Camping state. If the mobile station is in its home SID area and REGH is disabled, it shall terminate this procedure and then enter the DCC Camping state. If the mobile station is not in its home SID area and REGR is disabled, it shall terminate this procedure and then enter the DCC Camping state. Otherwise, the mobile station shall examine the list of conditions below to see if a registration is required. These conditions are in priority order so that if more than one of the conditions are fulfilled only one registration is sent.

If a power-down condition exists (i.e., the mobile station has just powered-down) and the PDREG flag sent in the Registration Parameters message is enabled, the mobile station shall send a Registration message with a power-down indication and then enter the Null state. If a power-up condition exists (i.e., the mobile station has just powered-up) and the PUREG flag sent in the Registration Parameters message is enabled, the mobile station shall send a Registration message with a power-up indication, start REG_TMR, and then enter the Registration Proceeding state.

If the broadcasted SID value does not match the SID value stored in semi-permanent memory and the SYREG flag sent in the Registration Parameters message is enabled, the mobile station shall send a Registration message with a geographic indication, start REG_TMR, and then enter the Registration Proceeding state.

If the broadcasted RNUM value is not part of the RNUM list stored in semi-permanent memory and the LAREG flag sent in the Registration Parameters message is enabled, the mobile station shall send a Registration message with a geographic indication, start REG_TMR, and then enter the Registration Proceeding state.

If the current DCC was previously identified as a registration neighbour (e.g., the REG field in the neighbour list) the mobile station shall send a Registration message with a geographic indication, start REG_TMR, and then enter the Registration Proceeding state.

If the FOREG flag sent in the Registration Parameters message is enabled, the mobile station shall send a Registration message with a forced indication, start REG_TMR, and then enter the Registration Proceeding state.

If the periodic registration timer PER_COUNTER has expired, the mobile station shall send a Registration message with a periodic indication, start REG_TMR, and then enter the Registration Proceeding state.

If the REREG_TMR has expired, the mobile station shall send a Registration message with the same indication as in its previous registration attempt and then enter the Registration Proceeding state.

Otherwise, the mobile station shall invoke the Periodic Registration Determination procedure. If a registration is not necessary the mobile station shall terminate this procedure and return to the invoking procedure.

Registration Update

If the mobile station has received a "Periodic Registration" information element but not the "REGID Parameters" information element, it shall reset its PER_COUNTER to REGPER*94 superframes. If the mobile station has received a "REG Period" and a "REGID Parameters" information element, it shall set NXTREG=REGID+REGPER*94/REGID_PER) and save NXTREG in semi-permanent memory. The mobile station shall update its semi-permanent memory with the current broadcasted SID value. After performing these updates, the mobile station shall terminate this procedure and return to the invoking procedure.

Periodic Registration Determination

If the mobile station has received a "REG Period" and a "REGID Parameters" information element, it shall use the following algorithm to review NXTREG to determine if REGID has cycled through zero: If NXTREG is greater than or equal to REGID+(REGPER*94/REGID_PER)+5, then NXTREG shall be replaced by the greater of 0 or NXTREG-$2^{20}$, otherwise do not change NXTREG. If REGID is greater than or equal to NXTREG, the mobile station shall send a Registration message with a periodic indication, start REGTMR, and then enter the Registration Proceeding state. Otherwise, the mobile station shall terminate this procedure and return to the invoking procedure.

Registration Success

The mobile station shall stop REG_TMR, invoke the Registration Update procedure and then proceed as follows: If a list of RNUM values is provided in the Registration Accept message the mobile station shall set its RNUM list in semi-permanent memory according to the received list. The mobile station shall only be required to store the first 50 RNUMs received in any given Registration Accept message.

The mobile station shall then terminate this procedure and return to the DCC Camping state.

Registration Failure

If the mobile station has resent its registration up to the maximum of 5 times, it shall terminate this procedure and then enter the DCC Camping state. Otherwise, it shall store the reject cause, set REREG_TMR timer to a random time uniformly distributed in the interval 10 to 100 seconds, terminate this procedure and then enter the DCC Camping state.

Authentication

Shared Secret Data (SSD)

Figure 30:
FIGS. 30–37 show various aspects of authentication procedures according to the present invention.

SSD is a 128-bit pattern stored in the mobile station (semi-permanent memory) and readily available to the base station. As depicted in FIG. 30, SSD is partitioned into two distinct subsets. Each subset is used to support a different process. Specifically, SSD-A is used to support the authentication procedures, and SSD-B is used to support voice privacy and message confidentiality. SSD may be generated according to the procedure specified in Appendix A to IS-54B.

Random Challenge Memory (RAND)

$RAND_s$ is a 32 bit value held in the mobile station. It is a value received on the BCCH, and is used in conjunction with SSD-A and other parameters, as appropriate, to authenticate mobile station originations, terminations and registrations.

Call History Parameter ($COUNT_{s-p}$)

The Call History Parameter is a modulo-64 count held in the mobile station. $COUNT_{s-p}$ is updated at the mobile upon receipt of a Parameter Update Order Message.

Authentication of Mobile Station Registrations

Figure 31:
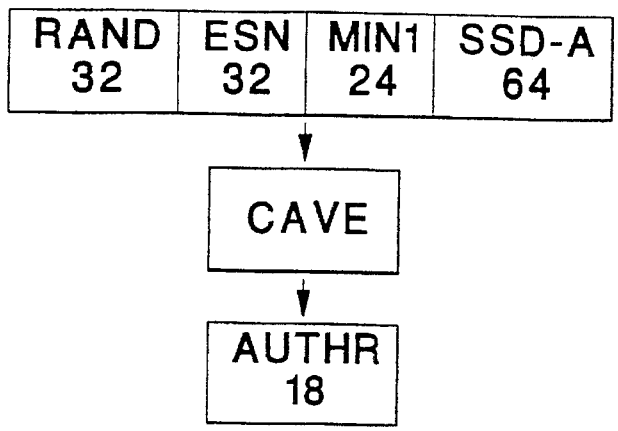

When the information element AUTH on the BCCH is set to 1, and the mobile station attempts to register, the following authentication-related procedures shall be performed: The mobile station, initializes the authentication algorithm (CAVE) as illustrated in FIG. 31; executes the CAVE procedure; sets AUTHR equal to the 18 bits of CAVE algorithm output; and sends AUTHR together with RANDC (eight most significant bits of RAND) and $COUNT_{s-p}$ to the base station via the AUTH message. The base station compares the received values for RANDC, and optionally COUNT, with the internally stored values associated with the received MIN1/ESN; computes AUTHR as described above (except that it uses the internally stored value of SSD-A); and compares the value for AUTHR computed internally with the value of AUTHR received from the mobile station.

If any of the comparisons by the base station fail, the base station may deem the registration attempt unsuccessful, initiate the Unique Challenge-Response procedure, or commence the process of updating the SSD.

Unique Challenge-Response Procedure

Figure 32:
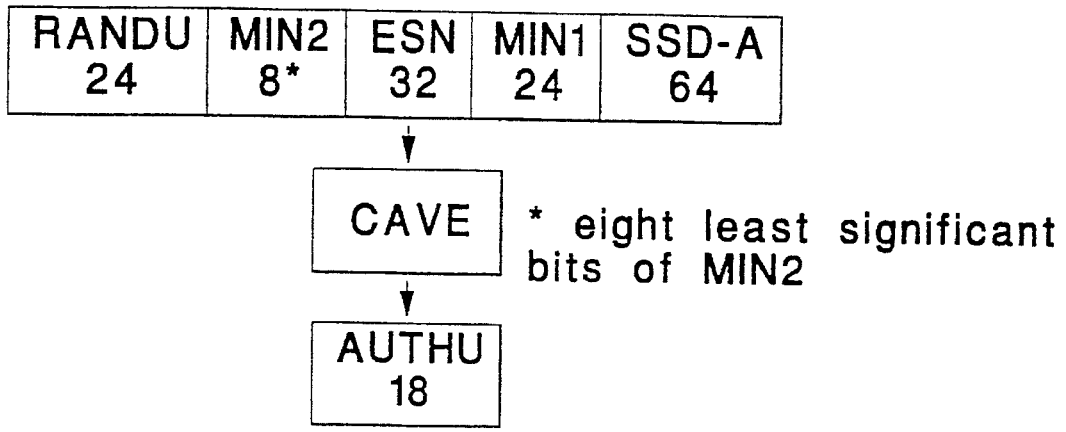

The Unique Challenge-Response Procedure is initiated by the BMI and can be carried out over any combination of control and/or traffic channels. The base station generates a 24-bit, random pattern referred to as RANDU sends RANDU to the mobile station via the Unique Challenge Order message; initializes CAVE as illustrated in FIG. 32;

executes the CAVE algorithm; and sets AUTHU equal to the 18 bits of the CAVE algorithm output. The mobile station computes AUTHU as described above using the received RANDU and its internally stored values for the remaining input parameters, and send AUTHU to the base station via the Unique Challenge Confirmation message. Upon receipt of the Unique Challenge Order Confirmation from the mobile station, the base station compares the received value for AUTHU to that generated/stored internally. If the comparison fails, the base station may deny further access attempts by the mobile station, drop the call in progress, or initiate the process of updating the SSD.

Authentication of Mobile Station Originations

Figure 33:
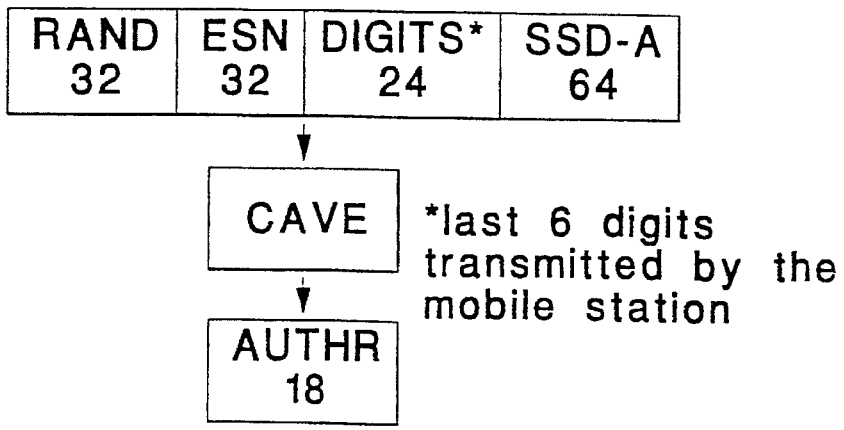

When the information element AUTH on the BCCH is set to 01, and the mobile station attempts to originate a call, the following authentication-related procedures shall be performed:

In the mobile station, initialize CAVE as illustrated in FIG. 33; execute the CAVE algorithm; set AUTHR equal to the 18 bits of the CAVE algorithm output; and send AUTHR together with RANDC (eight most significant bits of RAND) and $COUNT_{s-p}$ to the BMI. The base station compares the received values for RANDC, and optionally COUNT, with the internally stored values associated with the received MIN1/ESN; computes AUTHR as described above (except that it uses the internally stored value of SSD-A); and compares the value for AUTHR computed internally with the value of AUTHR received from the mobile station. If the comparisons at the base station are successful, the appropriate channel assignment procedures are commenced. Once assigned to a digital traffic channel, the base station may, at the discretion of the system operator, issue a Parameter Update Order message to the mobile station. Mobile stations confirm the receipt of Parameter Update Orders by sending Parameter Update Order confirmations. If any of the comparisons by the base station fail, the base station may deny service, initiate the Unique Challenge-Response procedure, or commence the process of updating the SSD.

Authentication of Mobile Station Terminations

Figure 34:
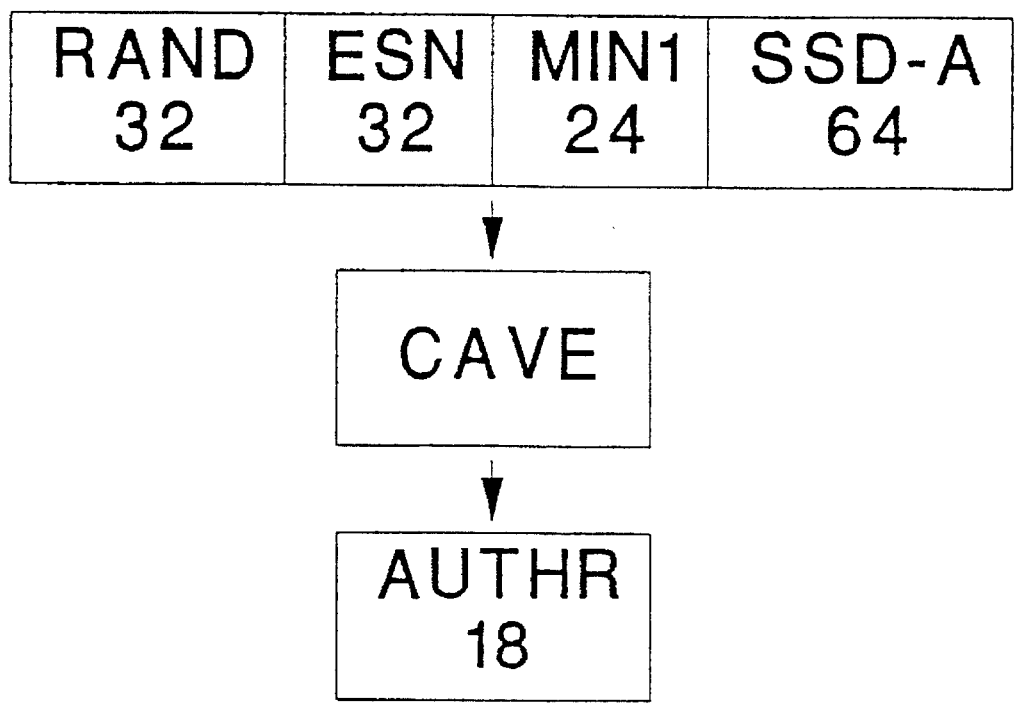

When the information element AUTH in the BCCH is set to 1, and a "Page Match" occurs, the following authentication-related procedures shall be performed: The mobile station initializes CAVE as illustrated in FIG. 34; executes the CAVE algorithm; sets AUTHR equal to the 18 bits of the CAVE algorithm output; and sends AUTHR together with RANDC (eight most significant bits of RAND) and $COUNT_{s-p}$ to the base station via the AUTH message. The base station, compare the received values for RANDC, and optionally COUNT, with the internally stored values associated with the received MIN1/ESN; computes AUTHR as described above (except that it uses the internally stored value of SSD-A); and compares the value for AUTHR computed internally with the value of AUTHR received from the mobile station. If the comparisons at the base station are successful, the appropriate channel assignment procedures are commenced. Once assigned to a digital traffic channel, the base station may, at the discretion of the system operator, issue a Parameter Update Order message to the mobile station. Mobile stations confirm the receipt of Parameter Update Orders by sending Parameter Update Order Confirmation. If any of the comparisons by the base station fail, the base station may deny service, initiate the Unique Challenge procedure, or commence the process of updating the SSD.

SSD Update

Updating the SSD involves the application of CAVE initialized with mobile station specific information, random data and the mobile station's A-key. The A-key is 64 bits long; assigned to and must be entered in each mobile station; stored in the mobile station's permanent security and identification memory; and known only to the mobile station and its associated HLR/AC. The latter feature of the A-Key is intended to enhance the security of the mobile station's secret data by eliminating the need to pass the A-key itself from system to system as the subscriber roams. As a consequence, SSD updates are carried out only in the mobile station and its associated HLR/AC, not in the serving system. The serving system obtains a copy of the SSD computed by the HLR/AC via intersystem communication (see EIA/TIA IS-41) with the mobile station's HLR/AC.

Figure 35:
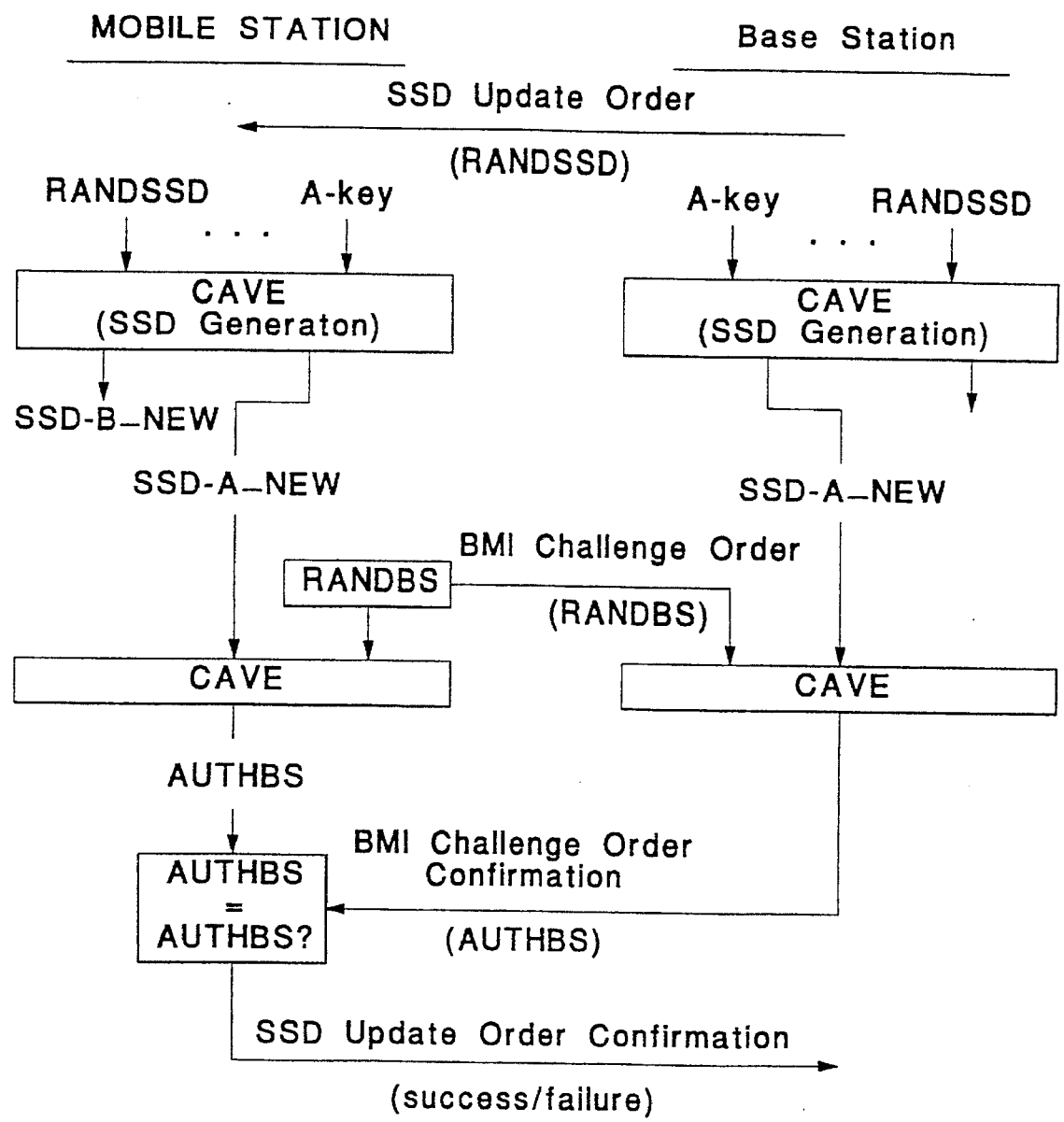
Figure 36:
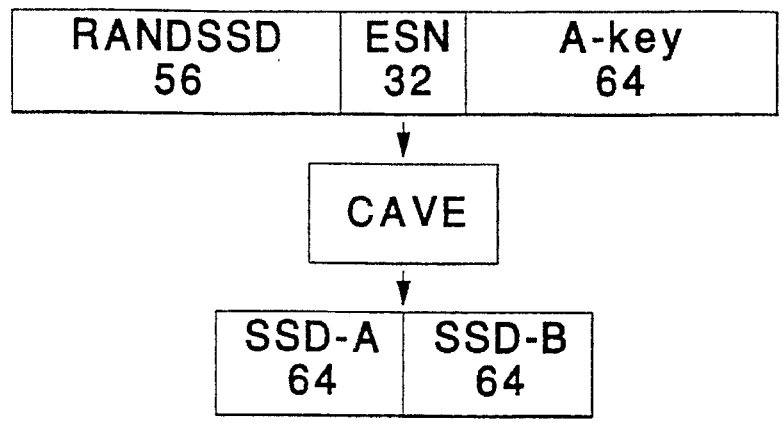

Updating the SSD in the mobile station proceeds as shown in FIG. 35: The BMI sends an SSD Update Order, with the RANDSSD field set to the same 56-bit random number used in the HLR/AC computations, to the mobile station via the SSD Update Order message. Upon receipt of the SSD Update Order, the mobile station initializes CAVE as illustrated in FIG. 36; executes the CAVE algorithm; sets SSD-A_NEW equal to the 64 most significant bits of the CAVE algorithm output and SSD-B_NEW to the 64 least significant bits of the CAVE algorithm output; selects a 32-bit random number, RANDBS, and send it to the BMI in a BMI Challenge Order message; re-initializes CAVE as illustrated in FIG. 37; executes the CAVE algorithm; and sets AUTHBS equal to the 18 bits of the CAVE algorithm output.

Figure 37:
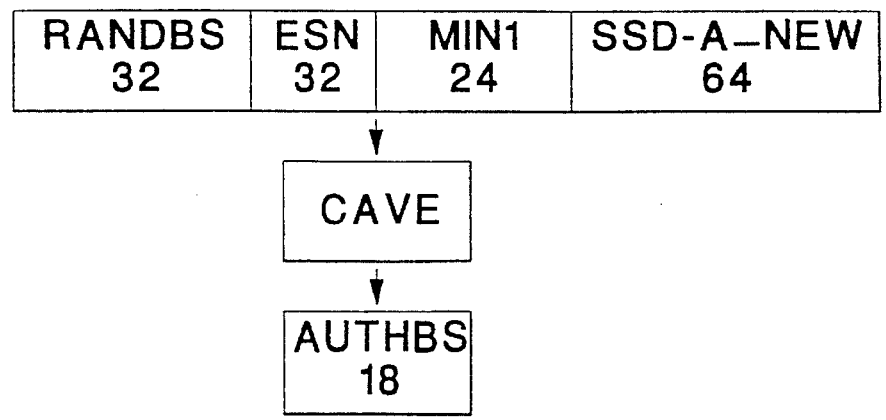

Upon receipt of the BMI Challenge Order, the BMI initializes CAVE as illustrated in FIG. 37, where RANDBS is set to the value received in the BMI Challenge Order; executes the CAVE algorithm; sets AUTHBS equal to the 18 bits of the CAVE algorithm output; and acknowledges receipt of the BMI Challenge Order by including AUTHBS in the BMI Challenge Order Confirmation message. Upon receipt of the BMI Challenge Order Confirmation, the mobile station compares the AUTHBS received to that generated internally; acknowledges receipt of the SSD Update Order. If the comparison at the mobile station is successful, the mobile station sets SSD-A and SSD-B to SSD-A_NEW and SSD-B_NEW, respectively, and sends an SSD Update Order Confirmation message to the BMI with the SSD_UPDATE Information Element set to '1' and all other parameters set as appropriate. If the comparison at the mobile station fails, the mobile station discards SSD-A_NEW and SSD-B_NEW, and sends an SSD Update Order Confirmation message to the BMI with the SSD_UPDATE Information Element set to '0' and all other parameters set as appropriate. If the SSD Update Confirmation received from the mobile station indicates a success, the BMI sets SSD-A and SSD-B to the values received from the HLR/AC (see EIA/TIA IS-41).

Layer 3 Message Set

The section below describes the Layer 3 messages. SMS higher layer messages are described in the following section. In all messages shown in tabular form below, the information element in the top row of the tables shall be regarded as the first element to be delivered to layer 2. In the information elements, the most significant bit (the leftmost bit in the tables) is the first bit to be delivered to layer 2. The information elements are described in alphabetical order after the description of the messages below.

F-BCCH Messages

The F-BCCH carries broadcast information to enable the mobiles to find the structure of the DCC and other essential system information. The set of layer 3 messages defined for transmission on the F-BCCH is described below:

Mandatory F-BCCH Messages
DCC Structure

This message shall always be sent first. The format of the DCC Structure message is as follows:

| Information Element | Type | Length (bits) |
|---|---|---|
| Message Type | M | 8 |
| Number of F-BCCH | M | 2 |
| Number of E-BCCH | M | 3 |
| Number of S-BCCH | M | 4 |
| Number of Skipped slots | M | 3 |
| E-BCCH Change Notification | M | 1 |
| Hyperframe Counter | M | 4 |
| Primary Superframe Indicator | M | 1 |
| Number of DCC slots, this freq | M | 2 |
| MAX_SUPPORTED_PFC | M | 2 |
| PCH_DISPLACEMENT | M | 3 |
| Additional DCC frequencies | O | 23–114 |
| | | Total = 33–147 |

| Parameter Type Codes for Optional Information Elements | |
|---|---|
| Parameter Type | Code |
| Additional DCC frequencies | 0001 |

M = Mandatory
O = Optional

Access Parameters

The format of the Access Parameters message is as follows:

| Information Element | Type | Length (bits) |
|---|---|---|
| Message Type | M | 8 |
| AUTH | M | 1 |
| S | M | 1 |
| RAND | M | 32 |
| MS_ACC_PWR | M | 4 |
| Access Burst Size | M | 1 |
| DVCC | M | 8 |
| OLC | M | 16 |
| Maximum Retries | M | 3 |
| Maximum Busy Reserved | M | 1 |
| Maximum Repetitions | M | 2 |
| Maximum Stop Counter | M | 1 |
| SMS Message Length | M | 3 |
| SOC & BSMC ID Control | M | 1 |
| Home MS Capability | M | 1 |
| Roam MS Capability | M | 1 |
| Cell Barred | M | 1 |
| | | Total = 85 |

Cell Selection Parameters

The format of the Cell Selection Parameters message is as follows:

| Information Element | Type | Length (bits) |
|---|---|---|
| Message Type | M | 8 |
| SS_SUFF | M | 5 |
| RSS_ACC_MIN | M | 5 |
| SCANFREQ | M | 4 |
| DVCC | M | 8 |
| Cell selection control | M | 1 |
| RESEL_OFFSET | M | 6 |
| | | Total = 37 |

Registration Parameters

The format of the Registration Parameters message is as follows:

| Information Element | Type | Length (bits) |
|---|---|---|
| Message Type | M | 8 |
| REGH | M | 1 |
| REGR | M | 1 |
| PUREG | M | 1 |
| PDREG | M | 1 |
| SYREG | M | 1 |
| LAREG | M | 1 |
| DEREG | M | 1 |
| FOR EG | M | 1 |
| REG Period | O | 13 |
| REGID Parameters | O | 28 |
| | | Total = 18–59 |

| Parameter Type Codes for Optional Information Elements | |
|---|---|
| Parameter Type | Code |
| REG Period | 0001 |
| REGID Parameters | 0010 |

BMI Identity

The format of the BMI Identity message is as follows:

| Information Element | Type | Length (bits) |
|---|---|---|
| Message Type | M | 8 |
| System ID | M | 14 |
| Country Code | M | 10 |
| IS-54 + Protocol Version | M | 4 |
| | | Total = 36 |

Optional F-BCCH Messages
Mobile Assisted Channel Allocation (MACA)

This message may also be sent on the E-BCCH. The message is used to order the MS to report radio measurements on certain channels. It contains information regarding the channels the MS must measure and when to report the measurements for mobile assisted channel allocation.

| Information Element | Reference | Type | Length (bits) |
|---|---|---|---|
| Message Type | | M | 8 |
| MACA_STATUS | | M | 2 |
| MACA_TYPE | | M | 2 |
| MACA List | | O | 18–93 |
| | | | Total = 12–105 |

| Parameter Type Codes for Optional Information Elements | |
|---|---|
| Parameter Type | Code |
| MACA List | 0001 |

E-BCCH Messages

The E-BCCH carries broadcast information that is less time critical than F-BCCH for the mobiles. For the optional information a message type and a length indicator is included. The set of messages in the E-BCCH may span over several Superframes before a repetition occurs. However, a particular message may not start and end in different Superframes. Filler information must be used to terminate the last E-BCCH burst if necessary.

Mandatory E-BCCH Messages
Neighbor Cell
The format of the Neighbor cell message is as follows:

| Information Element | Type | Length (bits) |
|---|---|---|
| Message Type | M | 8 |
| SERV_SS | M | 4 |
| Neighbor cell list (TDMA) (see Note) | O | 9 + 48*n |
| Neighbor cell list (Analog) (see Note) | O | 9 + 13*m |
| | | Total = 12–* |

| Parameter Type | Code |
|---|---|
| Neighbor cell list (TDMA) | 0001 |
| Neighbor cell list (analog) | 0010 |

Note: Up to 24 instances may be sent (total of TDMA and analog neighbor cells).

Optional E-BCCH Messages
Mobile Assisted Channel Allocation (MACA)
See Section on F-BCCH messages.
Emergency Information Broadcast
The format of the Emergency Broadcast Message is as follows:

| Information Element | Type | Length (bits) |
|---|---|---|
| Message Type | M | 8 |
| Text Message Data Unit | M | N*8 |
| | | N max. = 254 |

Go Away
This message is used to temporarily bar all mobiles from using a DCC. The barring time is indicated in minutes from 0 to 255 minutes. The value 0 indicates that the cell is not barred. This message may also be sent on the SPACH. The format of the Go Away Message is as follows:

| Information Element | Type | Length (bits) |
|---|---|---|
| Message Type | M | 8 |
| Minutes | M | 8 |
| | | Total = 16 |

SOC/BSMC Identification
This message is used in support of SOC and/or BSMC specific signaling. The format of this message is as follows:

| Information Element | Type | Length (bits) |
|---|---|---|
| Message Type | M | 8 |
| SOC | M | 8 |
| BSMC | M | 8 |
| | | Total = 24 |

S-BCCH Messages
There are two types of S-BCCH messages used for SMS broadcast, SMS header messages and non-header messages.
S-BCCH SMS Frame Header
The header information shall describe the structure of the SMS subchannel and shall only be provided in the first slot of every SMS frame. The format of the SMS Frame Header is as follows:

| Information Element | Type | Length (bits) |
|---|---|---|
| Message Type | M | 8 |
| Number of Subchannels | M | 2 |
| Subchannel Number | M | 2 |
| Phase Length of Subch. Cycle | M | 6 |
| Phase Number of Subch. Cycle | M | 6 |
| Number of SMS Messages (N) | M | 6 |
| o SMS Message ID (Note 1) | M | 8 |
| o L2 Frame Start (Note 1) | M | 8 |
| | | Total = 46 |

(Note 1): N instances of these two elements are sent consecutively.

S-BCCH SMS Broadcast Message Content
The message content is used to transfer the actual SMS message to the MS. The format of the SMS Broadcast Message Content is as follows:

| Information Element | Type | Length (bits) |
|---|---|---|
| Message Type | M | 8 |
| SMS Message ID | M | 8 |
| Text Message Data Unit | M | N*8 |
| | | N max. = 253 |

SPACH Messages
Analog Voice Channel Designation
This message is used to assign the MS to an analog voice channel with corresponding parameters. The format of this message is as follows:

| Information Element | Type | Length (bits) |
|---|---|---|
| Message Type | M | 8 |
| MEM | M | 1 |
| SCC | M | 2 |
| VMAC | M | 4 |
| CHAN | M | 11 |
| PAGE_MODE | M | 8 |
| | | Total = 34 |

Base Station Challenge Order Confirmation
This message is a response to the Base Station Challenge Order and contains the authentication algorithm outputs. The format of this message is as follows:

| Information Element | Type | Length (bits) |
|---|---|---|
| Protocol Discriminator and Message Type | M | 8 |
| AUTHBS | M | 18 |
| | | Total = 26 |

Capability Request
This message is sent by the BMI in order to query the capabilities of a specific mobile station. The format of this message is as follows:

| Information Element | Type | Length (bits) |
|---|---|---|
| Message Type | M | 8 |

Digital Traffic Channel Designation

This message is used to assign the MS to an digital traffic channel with corresponding parameters. The format of this message is as follows:

| Information Element | Type | Length (bits) |
|---|---|---|
| Message Type | M | 8 |
| MEM | M | 1 |
| DVCC | M | 8 |
| PM | M | 1 |
| MAC | M | 4 |
| CHAN | M | 11 |
| PAGE_MODE | M | 8 |
| ATS | M | 4 |
| DELTA_TIME | O | 15 |
| SB | M | 1 |
| | | Total = 61 |

Message Waiting

This message is used to inform the mobile that it has messages waiting. The format of this message is as follows:

| Information Element | Type | Length (bits) |
|---|---|---|
| Message Type | M | 8 |
| Number of messages | M | 6 |
| | | Total = 14 |

Page

This message is used to inform the MS that an attempt to set up a mobile terminated call is underway. The format of this message is as follows:

| Information Element | Type | Length (bits) |
|---|---|---|
| Message Type | M | 8 |
| PAGE_MODE | O | 12 |
| | | Total = 8–20 |

Parameter Update

This message is used to inform the mobile to update its internal call history parameter that is used in the authentication process. The format of this message is as follows:

| Information Element | Type | Length (bits) |
|---|---|---|
| Message Type | M | 8 |
| Request Number | M | 8 |
| | | Total = 16 |

Point-to Point Short Message Service

R-DATA

This message is used to carry the SMS application layer messages, for MS terminated SMS. The message content is as follows:

| Information Element | Type | Length (octets) |
|---|---|---|
| Message Type | M | 1 |
| R-Transaction Identifier | M | 1 |
| R-Data Unit | M | 2–241 |
| Message Center Address | O (Note 1) | 2–12 |

| Parameter Type Codes for Optional Information Elements | |
|---|---|
| Parameter Type | Code |
| Message Center Address | 0001 |

(Note 1): Included in the event that the Message Center originating the short message has included its address in a SMS terminated SMS.

R-DATA ACCEPT

This message is used to acknowledge and accept the R-DATA message. The message content is as follows:

| Information Element | Type | Length (bits) |
|---|---|---|
| Message Type | M | 8 |
| R-Transaction Identifier | M | 8 |
| | | Total = 16 |

R-DATA REJECT

This message is used to acknowledge and reject the R-DATA message. The message content is as follows:

| Information Element | Type | Length (bits) |
|---|---|---|
| Message Type | M | 8 |
| R-Transaction Identifier | M | 8 |
| R-Cause | M | 8 |
| | | Total = 24 |

RACH Confirmation

The format of the RACH Confirmation message is as follows:

| Information Element | Type | Length (bits) |
|---|---|---|
| Message Type | M | 8 |
| Confirmed Message | M | 8 |
| | | Total = 16 |

Registration Accept

The format of the Registration Accept message is as follows:

| Information Element | Type | Length (bits) |
|---|---|---|
| Message Type | M | 8 |
| RNUM | O | 10–640 |
| | | 8–648 |

| Parameter Type Codes for Optional Information Elements | |
|---|---|
| Parameter Type | Code |
| RNUM | 0001 |

Registration Reject
The format of the Registration Reject message is as follows:

| Information Element | Type | Length (bits) |
|---|---|---|
| Message Type | M | 8 |
| Cause | M | 4 |
|  |  | Total = 12 |

SSD Update Order
This message causes the mobile to execute the authentication algorithm. The format of the SSD Update Order message is as follows:

| Information Element | Type | Length (bits) |
|---|---|---|
| Message Type | M | 8 |
| RANSSD | M | 56 |
|  |  | Total = 64 |

SOC/BSMC Identification
This message is used in support of SOC and/or BSMC specific signaling. It is sent by the BMI in response to a Mobile Station SOC & BSMC ID Request message. The format of the SOC/BSMC Identification message is as follows:

| Information Element | Type | Length (bits) |
|---|---|---|
| Message Type | M | 8 |
| SOC | M | 8 |
| BSMC | M | 8 |
|  |  | Total = 24 |

SOC/BSMC Message Delivery
This message is used to carry SOC/BSMC specific signaling information. The format of the SOC/BSMC Message Delivery message is as follows:

| Information Element | Type | Length (bits) |
|---|---|---|
| Message Type | M | 8 |
| Custom Control (Note 1) | M | 8*n |
|  |  | Total = 8 + (8*n) |

(Note 1): As many instances as the L2 protocol allows may be sent (254).

Unique Challenge Order
This message causes the mobile station to execute the authentication algorithm. The format of the Unique Challenge Order message is as follows:

| Information Element | Type | Length (bits) |
|---|---|---|
| Message Type | M | 8 |
| RANDU | M | 24 |
|  |  | Total = 32 |

Go Away
This message is used to barr a mobile from using a DCC. The barring time is indicated in minutes from 0 to 255 minutes. The value 0 indicates that the cell is not barred. The format of the Go Away message is as follows:

| Information Element | Type | Length (bits) |
|---|---|---|
| Message Type | M | 8 |
| Minutes | M | 8 |
|  |  | Total = 16 |

Directed Retry
This message is used to force a mobile to reject this DCC and select a channel from its neighbor list. The format of the Directed Retry message is as follows:

| Information Element | Type | Length (bits) |
|---|---|---|
| Message Type | M | 8 |
| Minutes | M | 8 |
|  |  | Total = 16 |

Time and Date
The format of the Time and Date message is as follows:

| Information Element | Type | Length (bits) |
|---|---|---|
| Message Type | M | 8 |
| Julian Date | M | 16 |
| Seconds of Day | M | 17 |
|  |  | Total = 41 |

RACH Messages
The following messages are defined for the RACH. An 8-bit Message Type is used to discriminate between the messages.

Authentication
The format of the Authentication message is as follows:

| Information Element | Type | Length (bits) |
|---|---|---|
| Message Type | M | 8 |
| COUNT | M | 6 |
| RANDC | M | 8 |
| AUTHR | M | 18 |
|  |  | Total = 40 |

Base Station Challenge Order
The format of the Base Station Challenge Order message is as follows:

| Information Element | Type | Length (bits) |
|---|---|---|
| Message Type | M | 8 |
| RANDBS | M | 32 |
|  |  | Total = 40 |

Capability Report
The format of the Capability Report message content is as follows:

| Information Element | Type | Length (bits) |
|---|---|---|
| Message Type | M | 8 |
| MPCI | M | 3 |
| SCM | M | 5 |
| Software Vintage | M | 6 |
| Firmware Vintage | M | 6 |
| Model Number | M | 4 |
| ESN | M | 32 |
| | | 64 |

MACA Report

The format of the MACA Report message is as follows:

| Information Element | Type | Length (bits) |
|---|---|---|
| Message Type | M | 8 |
| WER | M | 3 |
| BER | M | 3 |
| RSS | O | 10 |
| | | 24 |

Origination (Setup)

The format of the Origination (Setup) message is as follows:

| Information Element | Type | Length (bits) |
|---|---|---|
| Message Type | M | 8 |
| MPCI | M | 3 |
| VP | M | 1 |
| Call Mode | M | 3 |
| Dialed Digits | M | 64 |
| PAGE_MODE | O | 12 |
| | | Total = 79–91 |

The following messages may be appended to the origination message:
- Serial Number Message—if S bit is set
- Authentication Message—if AUTH bit is set Page Response The format of the Page Response message is as follows:

| Information Element | Type | Length (bits) |
|---|---|---|
| Message Type | M | 8 |
| MPCI | M | 2 |
| VP | M | 1 |
| Call Mode | M | 3 |
| PAGE_MODE | O | 12 |
| | | Total = 14–26 |

The following messages may be appended to the page response message:
- Serial Number Message—if S bit is set
- Authentication Message—if AUTH bit is set Point-to Point Short Message Service

R-DATA

This message is used to carry the SMS application messages, for MS originated SMS and MS User Acknowledgment. The message content is as follows:

| Information Element | Type | Length (octets) |
|---|---|---|
| Message Type | M | 1 |
| R-Transaction Identifier | M | 1 |
| R-Data Unit | M | 2–241 |
| Message Center Address | O (Note 1) | 2–12 |

(Note 1): Included in the event that the Message Center destination address is different from the one in the MS subscription profile.

R-DATA ACCEPT

This message is used to acknowledge and accept the R-DATA message. The message content is as follows:

| Information Element | Type | Length (bits) |
|---|---|---|
| Message Type | M | 8 |
| R-Transaction Identifier | M | 8 |
| | | Total = 16 |

R-DATA REJECT

This message is used to acknowledge and reject the R-DATA message. The message content is as follows:

| Information Element | Type | Length (bits) |
|---|---|---|
| Message Type | M | 8 |
| R-Transaction Identifier | M | 8 |
| Cause | M | 8 |
| | | Total = 24 |

Registration

The format of the Registration message is as follows:

| Information Element | Type | Length (bits) |
|---|---|---|
| Message Type | M | 8 |
| Registration Type | M | 3 |
| SCM | M | 4 |
| MPCI | M | 3 |
| | | Total = 18 |

The following messages may be appended to the page response message:
- Serial Number Message—if S bit is set
- Authentication Message—if AUTH bit is set
- Capability Report Message—If Registration Type equals Power-up or Geographic and if the Home/Roam MS Capability flag is enabled in the Access Parameters message of the F-BCCH.

Serial Number

The format of the Serial Number message is as follows:

| Information Element | Type | Length (bits) |
|---|---|---|
| Message Type | M | 9 |
| ESN | M | 32 |
| | | Total = 40 |

SOC/BSMC Identification Request

This message is used in support of SOC and BSMC specific signaling. If authorized by the BCCH SOC/BSMC Request flag, the mobile station may send the SOC/BSMC Request message to request the SOC and BSMC Identification.

| Information Element | Type | Length (bits) |
|---|---|---|
| Message Type | M | 8 |

SOC/BSMC Message Delivery

This message is used to carry SOC/BSMC specific signaling information. The format of the SOC/BSMC Message Delivery message is as follows:

| Information Element | Type | Length (bits) |
|---|---|---|
| Message Type | M | 8 |
| Custom Control (Note 1) | M | 8*n |
| | | Total = 8 + (8*n) |

NOTE 1:
As many instances as the L2 protocol allows may be sent (254).

SPACH Confirmation

The format of the SPACH Confirmation message is as follows:

| Information Element | Type | Length (bits) |
|---|---|---|
| Message Type | M | 8 |
| Confirmed Message | M | 8 |
| | | Total = 16 |

SSD Update Order Confirmation

The format of the SSD Update Order Confirmation message is as follows:

| Information Element | Type | Length (bits) |
|---|---|---|
| Message Type | M | 8 |
| SSD Update Status | M | 2 |
| | | Total = 10 |

Time and Date

The format of the Time and Date message is as follows:

| Information Element | Type | Length (bits) |
|---|---|---|
| Message Type | M | 8 |
| Julian Date | M | 16 |
| Seconds of Day | M | 17 |
| | | Total = 41 |

Unique Challenge Order Confirmation

The format of the Unique Challenge Order Confirmation message is as follows:

| Information Element | Type | Length (bits) |
|---|---|---|
| Message Type | M | 8 |
| AUTHU | M | 18 |
| | | Total = 26 |

The following messages may be appended to the Unique Challenge Order Confirmation message:
Serial Number Message—if S bit is set.

Information Element Description

The following coding rules apply to all information element descriptions:

Elements of type "flag" shall have the values of
0=Disable (off, false)
1=Enable (on, true)

Certain BCCH fields do NOT trigger a transition in the BCCH change flag in the SPACH. Those fields are designated as "NC" (Non-Critical).

Elements of type "transition" are modulo 1 counters to indicate a change in current status.

All specified lengths are in BITS unless otherwise noted.

Channel number shall be coded as in IS-54B unless otherwise noted.

Access Burst Size

This field informs the mobile which burst size to use on the RACH according to the following table:

| Value | Function |
|---|---|
| 0 | Use normal length bursts on the RACH |
| 1 | Use abbreviated length bursts on the RACH |

Additional DCC Frequencies

This optional field contains information regarding additional DCC frequencies in this cell and their relation to the current DCC.

| Field | Length (value) |
|---|---|
| Parameter type | 4 (0001) |
| Number of additional DCC frequencies (Note 1) | 3 |
| Position of current DCC frequency in list | 3 |
| DCC channel info (Note 2) | |
| DCC frequency | 11 |
| Number of DCC slots, this freq | 2 |

Number of additional DCC frequencies: The number of additional DCC frequencies provided by this cell. Position of this DCC in list: The point at which to insert the current DCC frequency into the DCC Channel Info list for DCC selection. DCC channel info—This field consists of two sub-fields. DCC frequency is an additional DCC served by this cell that must be considered when determining the DCC selection. The "Number of DCC slots, this freq" is described in this section.

NOTES:
1. All additional DCCs provided in this optional informational element list MUST be the same logical set of DCCs in the same order for all of the other DCCs optional informational element list.
2. The number of instances sent equals the value in the Number of additional DCC frequencies field.

| Value | Function |
|---|---|
| 0000 | Full rate Digital Traffic Channel on time slots 1, 4 |
| 0001 | Full rate Digital Traffic Channel on time slots 2, 5 |
| 0010 | Full rate Digital Traffic Channel on time slots 1, 4 |
| 1001 | Half rate Digital Traffic Channel on time slots 1 |
| 1010 | Half rate Digital Traffic Channel on time slots 2 |
| 1011 | Half rate Digital Traffic Channel on time slots 3 |
| 1100 | Half rate Digital Traffic Channel on time slots 4 |
| 1101 | Half rate Digital Traffic Channel on time slots 5 |
| 1110 | Half rate Digital Traffic Channel on time slots 6 |

AUTH

The authentication flag indicates whether the mobile station sends the authentication message along with a registration, origination, or page response message sent on RACH.

67

AUTHBS

This information element contains the output from the authentication procedure.

AUTHR

This is the output response of the authentication algorithm for originations, registrations, and terminations.

AUTHU

This is the output response of the authentication algorithm for unique challenge orders.

BSMC

This is the Base Station Manufacturer Code.

Call Mode

The preferred call mode for the next voice/traffic channel designation according to the following table:

| Value | Function |
|---|---|
| 000 | Analog voice channel acceptable |
| 001 | Analog voice channel not acceptable |
| 010 | Full-rate digital traffic channel acceptable |
| 011 | Full-rate digital traffic channel not acceptable |
| 100 | Half-rate digital traffic channel acceptable |
| 101 | Half-rate digital traffic channel not acceptable |
| 110 | Reserved |
| 111 | Reserved |

Cause

This field idicates to the mobile the case for a registration reject.

| Code | Cause |
|---|---|
| 0000 | Unknown MSID |
| 0001 | Invalid C-number |
| | All other codes are reserved |

Cell Barred

This flag is used to indicate that the current cell is barred.

Cell Selection Control

This flag is used to preclude a mobile performing the cell selection (initial selection) from selecting the current cell.

CELLTYPE

The preference type of a cell according to the following table:

| Value | Function |
|---|---|
| 00 | Cell type of REGULAR |
| 01 | Cell type of PREFERRED |
| 10 | Cell type of NON-PREFERRED |
| 11 | Reserved |

CHAN

This is the cChannel number as defined in IS-54B.

Confirmed Message

The confirmed Message field is a repeat of the Message Type field of the message which is being confirmed. The following messages are valid confirmation messages according to the following table:

| Value | Usage | Function |
|---|---|---|
| | RACH | Message Waiting |
| | RACH | Parameter Update |
| | RACH | Release |
| | RACH | Directed Retry |
| | RACH | Go Away |
| | RACH | SMS Notification |
| | SPACH | |
| | SPACH | |

COUNT

Se IS-54B for use of this parameter.

Country Code

This field indicates the Country Code of the serving system.

| Field | Length (bits) |
|---|---|
| Country Code (CC) | 10 |

The CC is the equivalent of the Mobile Country Code defined in CCITT recommendation E.212. The CC values are defined in annex A of E.212. The following values are extracted from E.212 and are provided for illustration only. If other CC values are required, refer to annex A of E.212 for a complete list of CC values.

| Code (decimal) | Country |
|---|---|
| 302 | Canada |
| 310 | United States of America |
| 311 | United States of America |
| 312 | United States of America |
| 313 | United States of America |
| 314 | United States of America |
| 315 | United States of America |
| 316 | United States of America |
| 334 | Mexico |

The 3 decimal digits of the CC are expressed as the corresponding decimal number ($0<=d_id_jd_k<=999$) coded in 10 binary bits using a normal decimal to binary conversion (0 to 999).

Custom Control

Binary data as specified by the SOC/BSMC protocol currently in use.

DELAY

Time in seconds.

DELTA_TIME

This parameter indicates to the mobile the difference in DTC and DCC timing in terms of time slots and symbols.

| Field | Length (bits) |
|---|---|
| Parameter type | 4 (0001) |
| Number of timeslots | 3 |
| Number of symbols | 8 |

DEREG

This flag indicates whether de-registration is enabled or disabled.

Dialed Digits

The dialed digits of the MS for an origination.

DVCC

The digital verification color code is used in a manner consistent with IS-54B.

E-BCCH Change Notification

A transition bit to indicate a change in the E-BCCH data starting with the current superframe. If a tansition has occured, all mobiles shall read the E-BCCH of the current superframe and of all subsequent superframes until a complete cycle of E-BCCH is read.

ESN

Identifies the Electronic Serial Number of the MS.

Firmware Vintage

The firmware vintage as defined by the mobile station manufacturer.

FOREG

This flag indicates whether Forced Registration is enabled or disabled.

HL_FREQ

If HL_FREQ is set to high, the MS will perform frequency measurement according to the rules set forth in the SCANFREQ information element. If set to low, this frequency may be measured with half the frequency required by the rules set forth in the SCANFREQ information element.

| Value | Function |
|---|---|
| 0 | Low |
| 1 | High |

Hyperframe Counter

A counter used to identify which hyperframe is currently being broadcast. Hyperframes consist of two superframes. This counter starts at 0.

Julian Date

A sequential date counter starting from Jan. 1st, 1900. Reset to 1 on Jan. 1st, 2000.

L2 Frame Start

This variable indicates the numbe of slots from the start of SMS subchannel cycle to the beginning of the SMS message. This message may not begin in the indicated SMS slot, but may be contained in an end/begin burst which is used to start delivery of this message.

LAREG

The location area based registration flag indicates whether or not the mobile is to geographically register when the registration number of the current cell is not part of the mobile's registration number list.

MAC

This field indicates the power level to be used on the assigned digital traffic channel. The coding is according to IS-54B Table 2.1.2-1

MACA List

This optional field indicates the channels the mobile must measure for mobile assisted channel allocation.

| Field | Length (bits) |
|---|---|
| Parameter type | 4 (0010) |
| Number of MACA channels (k) | 3 |
| Channel number | k*11 |

MAX_SUPPORTED_PFC

The maximum paging frame class that this DCC can support according to the following table:

| Value | Function |
|---|---|
| 00 | PF1 is the maximum support paging frame class |
| 01 | PF2 is the maximum support paging frame class |
| 10 | PF3 is the maximum support paging frame class |
| 11 | PF4 is the maximum support paging frame class |

Maximum Busy Reserved

The maximum number of times the mobile executes the following steps: generates random delay period, waits until expiration of this period, and reads B/R/I flags which have been set to non-idle.

| Value | Function |
|---|---|
| 0 | 1 random delay period |
| 1 | 10 random delay periods |

Maximum Repetitions

The maximum number of allowable consecutive repetitions of an individual RACH burst before considering the attempt a failure.

Maximum Retries

The maximum number of allowable RACH transmission attempts before considering the attempt to transfer a message (any one burst of a single or multi-burst RACH) as a failure.

Maximum Stop Counter

The maximum number of times the mobile xecutes the following steps: transmits a burst in RACH, examines SCF which have been set to not busy (R/N=N and B/I/R=R or I), generates a random delay period, waits until the expiration of this period and retransmits the burst on the RACH.

MEM

This flag indicates whether the mobile station shall use the message encryption mode on the assigned traffic channel.

Message Center Address

The purpose of the Message Center address is to identify the Message Center address for the message being sent. The maximum length of this information element is limited to 12 octets.

| | | | Bits | | | | | |
|---|---|---|---|---|---|---|---|---|
| 8 | 7 | 6 | 5 | 4 | 3 | 2 | 1 | octet |
| Length of Message Center Address content (in octets) | | | | Message Center Address 0 0 0 1 | | | | 1 |
| 0 | | Type of | | | | Parameter Code Numbering plan | | 2 |

| | | |
|---|---|---|
| Reserved 2nd digit | number | identification 1st digit | 3 |
| . | . | . |
| . | . | . |
| . | . | . |
| [(2×N)-4]'th digit or Filler (for odd) | | [(2×N)-5]'th digit | N |

Type of number (octet 2) (see Note 1)

Bits
7 6 5

| | |
|---|---|
| 0 0 1 | international number (see Note 2) |
| 0 1 0 | national number (see Notes 2, 4, 5) |
| 0 1 1 | network-specific number (see Note 3) |
| 1 1 0 | abbreviated number |
| 1 1 1 | reserved for extension |

All other values are reserved.

NOTES:
1 For the definition of "international and national number", see CCITT Recommendation I.330.
2 Prefix or escape digits shall not be included.
3 The type of number 'network-specific number' is used to indicate administration and service number specific to the serving network.
4 For calls between the United States and other countries within world zone 1 (see CCITT Recommendation E.163 for assignment of country codes), where the numbering plan identification is "ISDN/telephony numbering plan", "type of number" is coded to "national number".
5 For numbers that contain service access codes (e.g., "700", "800", "900"), "type of number" is coded as "national number".

Numbering Plan Identification (octet 2)
Numbering plan (applies for type of number = 001 and 010)

Bits
4 3 2 1

| | |
|---|---|
| 0 0 0 0 | unknown |
| 0 0 0 1 | ISDN/telephony numbering plan (CCITT Recommendations E.164 and E.163) |
| 1 0 0 1 | private numbering plan |
| 1 1 1 1 | reserved for extension |

All other values are reserved.

Digits (octets 3, etc.)
This field is coded TBCD as follows:

| Binary Value | Digit |
|---|---|
| 0000 | Filler |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 0 |
| 1011 | * |
| 1100 | # |

All other values reserved

Message Type

This 8-bit information element identifies the function of the message being sent. The message types are coded as follows:

| | Code (binary-hex) |
|---|---|
| F-BCCH Messages | |
| DCC Structure | 0010 0001 - 21 |
| Access Parameter | 0010 0010 - 22 |
| BMI Identity | 0010 0011 - 23 |
| Cell selection Parameter | 0010 0100 - 24 |
| Mobile Assisted Channel Allocation (MACA) | 0010 0101 - 25 |
| F-BCCH Information Override | 0010 1001 - 29 |
| Registration Parameter | 0110 1000 - 68 |
| E-BCCH Messages | |
| Neighbor Cell | 0001 0000 - 10 |
| Emergency Information Broadcast | 0001 0001 - 11 |
| Go Away | 0110 0000 - 60 |
| SPACH Messages | |
| Page | 0000 0000 - 00 |
| Digital Traffic Channel Designation | 0111 0000 - 70 |
| Analog Voice Channel Designation | 0111 0001 - 71 |
| Registration Accept | 1100 0011 - C3 |
| Registration Reject | 1100 0010 - C2 |
| SSD Update Order | 0000 1001 - 09 |
| Base Station Challenge Order Confirmation | 0000 1000 - 08 |
| Unique Challenge Order | 0000 0111 - 07 |
| Point-to-Point Short Message Service R-DATA | 0000 0110 - 06 |
| Point-to-Point Short Message Service R-DATA ACCEPT | 0001 0010 - 12 |
| Point-to-Point Short Message Service R-DATA REJECT | 0001 0011 - 13 |
| Message Waiting | 0010 1000 - 28 |
| SOC/BSMC Message Delivery | 0001 0100 - 14 |
| RACH Confirmation | 0001 0101 - 15 |
| Parameter Update | 1010 0010 - A2 |
| SOC/BSMC Identification | 0001 0110 - 16 |
| Release | 0001 1000 - 18 |
| Directed Retry | 0110 0001 - 61 |
| Go Away | 0110 0000 - 60 |
| RACH Messages | |
| Page Response | 0000 0010 - 02 |
| Origination (Setup) | 0000 0100 - 04 |
| Registration | 1100 0001 - C1 |
| SOC/BSMC Identification Request | 0001 0111 - 17 |
| SSD Update Order Confirmation | 0000 0101 - 05 |
| Base Station Challenge Order | 0000 0011 - 03 |
| Unique Challenge Order Confirmation | 0000 0001 - 01 |
| Point-to-Point Short Message Service R-DATA | 0000 0110 - 06 |
| Point-to-Point Message Service R-DATA ACCEPT | 0001 0010 - 12 |
| Point-to-Point Short Message Service R-DATA REJECT | 0001 0011 - 13 |
| SOC/BSMC Message Delivery | 0001 1001 - 19 |
| Parameter Update Confirmation | 0011 0100 - 34 |
| SPACH Confirmation | 0010 0000 - 20 |
| MACA Report | 0010 0110 - 26 |
| S-BCCH Messages | |
| Broadcast Information Message | 0010 0111 - 27 |

Minutes

This field indicates a time in minutes.

Model Number

This field indicates the model number of the mobile station.

MPCI

The Mobile Protocol Capability Indicator is used to inform the BS of its processing capabilities according to the following table:

| Value | Function |
|---|---|
| 000 | Indictes EIA-553 or IS-54-A mobile station |
| 001 | Indicates EIA/TIA IS-54-B dual mode mobile station |
| 010 | Indicates IS-7X DCC mobile station |

-continued

| Value | Function |
|---|---|
| 011 | Indicates IS-54 + mobile station (DCC and IS-54-C) |
| 100 | Reserved |
| 101 | Reserved |
| 110 | Reserved |
| 111 | Reserved |

Note:
IS-54 mobile station is a mobile station which conforms to the protocols set forth in this specification.

MS_ACC_PWR

The mobile station access power level dictates the maximum output power that the MS may use when initially accessing the network.

MS_ACC_PWR

| Code | Value (in dBm) |
|---|---|
| 0000 | 36 |
| 0001 | 32 |
| 0010 | 28 |
| 0011 | 24 |
| 0100 | 20 |
| 0101 | 16 |
| 0110 | 12 |
| 0111 | 8 |
| 1000 | 4 |
| 1001 | 0 |
| 1010 | −4 |
| All other values are reserved | |

Neighbor Cell List (Analog)

This optional information element indicates the analog channels the mobile shall measure for purposes of cell reselection.

| Field | Length (bits) |
|---|---|
| Parameter type | 4 (0010) |
| Number of analog neigbor cells (=m) | 5 |
| CHAN | 11*m |
| PCI | 2*m |
| | Total = 9 + 13*m |

The PCI indicates the protocol capability of the analog neighbor cell. It is defined as follows:

PCI

| Code | Value |
|---|---|
| 00 | EIA 553 |
| 01 | IS-54B |
| 10 | Reserved |
| 11 | Reserved |

Neighbor Cell List (TDMA)

This optional information element indicates the TEMA channels for purposes of cell reselection.

| Field | Length (bits) |
|---|---|
| Parameter type | 4 (0001) |
| Number of TDMA neighbor (=n) | 5 |
| CHAN | 11*n |
| DVCC | 8*n |

-continued

| | |
|---|---|
| RESEL_OFFSET | 6*n |
| SS_SUFF | 5*n |
| DELAY | 4*n |
| HL_FREQ | 1*n |
| C ELLTYPE | 2*n |
| Network Type | 2*n |
| MS_ACC_PWR | 4*n |
| RSS_ACC_MIN | 5*n |
| Total = 9 + 48*n | |

DELAY

| Code | Value |
|---|---|
| 0000 | 0 second |
| 0001 | 20 seconds |
| " | |
| 1110 | 280 seconds |
| 1111 | Reserved |

Note:
The fields not defined within this section are defined under the corresponding IE.

Number of Analog Neighbor Cells
 The number of neighbor cells that are of analog type.
Number of DCC Slots, This Freq
 The number of slots dedicated to DCC on this frequency according to the following table:

| Value | Function |
|---|---|
| 00 | Half rate DCC on time slot 1 |
| 01 | Full rate DCC on time slots 1, 4 |
| 10 | Double full rate DCCs on time slots 1, 4 and 2, 5 (Note 1) |
| 11 | Triple full rate DCCs on time slots 1, 4; 2, 5; and 3, 6 (Note 1) |

NOTE 1:
Slots 1 and 1, 4 must be a master DCC while slots 2, 5 and 3, 6 must be slave DCCs with a master on the same frequency.

Number of E-BCCH
 The number of contiguous dedicated E-BCCH slots per superframe (1 plus the value in this field).
Number of F-BCCH
 The number of contiguous dedicated F-BCCH slots per superframe (1 plus the value in this field).
Number of Messages
 This field indicates the number of messages waiting.
Number of S-BCCH
 The number of contiguous dedicated S-BCCH slots per superframe.
Number of Skipped Slots
 The number of dedicated Skipped slots per superframe. See PCH Subchannel Selection.
Number of SMS Messages
 A variable to indicate the number of broadcast SMS messages in this SMS frame (1 plus the value in this field).
Number of Subchannels
 A variable to indicate the number of SMS subchannels being used by this DCC (1 plus the value in this field).
Number of TDMA Neighbor Cells
 The number of neighbor cells that are of TDMA type.

OLC

The overload class (OLC)determines whether or not a mobile may make an origination on RACH. The mobile station must examine the value of the bit map corresponding to its internally stored access overload class assignment. If the identified OLC bit is enabled, the mobile may continue with an origination access. Otherwise, the mobile may not make an origination access.

The recommended overload control bit assignments are:

| Value | Function |
|---|---|
| 0000000000000000 | Uniform distribution assigned to normal subscribers |
| 0000000000000010 | Uniform distribution assigned to normal subscribers |
| 0000000000000100 | Uniform distribution assigned to normal subscribers |
| 0000000000001000 | Uniform distribution assigned to normal subscribers |
| 0000000000010000 | Uniform distribution assigned to normal subscribers |
| 0000000000100000 | Uniform distribution assigned to normal subscribers |
| 0000000001000000 | Uniform distribution assigned to normal subscribers |
| 0000000010000000 | Uniform distribution assigned to normal subscribers |
| 0000000100000000 | Uniform distribution assigned to normal subscribers |
| 0000001000000000 | Uniform distribution assigned to normal subscribers |
| 0000010000000000 | Test Mobiles |
| 0000100000000000 | Emergency mobile |
| 0001000000000000 | Reserved |
| 0010000000000000 | Reserved |
| 0100000000000000 | Reserved |
| 1000000000000000 | Reserved |

For more information, refer to EIA Telecommunications Systems Bulletin No. 16 (March 1985), "Assignment of Access Overload Classes in the Cellular Telecommunications Services".

PCH_DISPLACEMENT

The maximum number of times an expected page message can be displaced onto another downlink channel.

PDREG

This flag indicates whether geographic registration is turned on or off. (As per IS-54B.)
Periodic Registration
This optional field indicates that periodic registration is used and also contains the specified periodicity in minutes.

| Field | Length (bits) |
|---|---|
| Parameter type | 4 (0001) |
| Registration Periodicity in minutes | 9 |

Phase Length of Subch. Cycle
A variable to indicate the number of SMS frames that make up 1 cycle (1 plus the value in this field).
Phase Number of Subch. Cycle
A variable to indicate which SMS frame in the cycle is currently being broadcast.

PM

This flag defines whether the mobile station shall use the privacy mode initially on the assigned digital traffic channel.
Primary Superframe Indicator
This bit toggles to indicate if the current superframe being broadcast is the primary or secondary superframe within the hyperframe.

| Value | Function |
|---|---|
| 0 | Primary |
| 1 | Secondary |

PUREG

This flag indicates whether power up registration is turned on or off. (As per IS-54B.)

RAND

The random number stored by a mobile for use in selected authentication processes.

RANDBS

A random number generated by the MS that is used in the SSD Update Procedure.

RANDC

A number used to confirm the last RAND received by the MS.

RANDSSD

A random number generated by the MS that is used in the SSD Update Procedure.

RANDU

A random number generated by the BS that is used in the unique challenge update procedure.
R-Cause
This information element (IE) is a 1-octet long, and is mandatory in the R-DATA REJECT message.
The following tables provide the R-Cause IE layout and the cause values description.

| | | | Bits | | | | | |
|---|---|---|---|---|---|---|---|---|
| 8 | 7 | 6 | 5 | 4 | 3 | 2 | 1 | Octet |
| 0 spare | | | | Cause | | | | 1 |

| | | Code | |
|---|---|---|---|
| Cause Description | Direction | Decimal | Binary |
| Unassigned (unallocated) number | B → MS | 1 | 0000001 |
| Call barred | B → MS | 10 | 0001010 |
| Short message transfer rejected | B → MS | 21 | 0010101 |
| Memory capacity exceeded | MS → B | 22 | 0010110 |
| Destination out of service | B → MS | 27 | 0011011 |
| Unidentified subscriber | B → MS | 28 | 0011100 |
| Facility rejected | B → MS | 29 | 0011101 |
| Unknown subscriber | B → MS | 30 | 0011110 |
| Network out of order | B → MS | 38 | 0100010 |
| Temporary failure | B → MS | 41 | 0101001 |
| Congestion | B → MS | 42 | 0101010 |
| Resources unavailable, unspecified | B → MS | 47 | 0101111 |
| Requested facility not implemented | B → MS | 69 | 1000101 |
| Invalid short message transfer reference value | B → MS | 81 | 1010001 |
| Invalid message, unspecified | B → MS | 95 | 1011111 |

| Cause Description | Direction | Code Decimal | Binary |
|---|---|---|---|
| Mandatory information element error | both | 96 | 1100000 |
| Message type non-existent or not implemented | B → MS | 97 | 1100001 |
| Message not compatible with short message transfer state or message type non-existent or not implemented | B → MS | 98 | 1100010 |
| Information element non-existent or not implemente | both | 99 | 1100011 |
| Invalid information element contents | both | 100 | 1100100 |
| Message not compatible with the short message transfer state | both | 101 | 1100101 |
| Protocol error, unspecified | both | 111 | 1101111 |
| Interworking, unspecified | B → MS | 127 | 1111111 |
| All other values are reserved. | | | |

R-Data Unit

The R-Data Unit IE contains the Higher Layer Protocol Data Unit. This IE is mandatory in a R-DATA message. The IE has a variable length, up to 241 octets, the first octet sent being the length indicator.

| Bits | | | | | | | | Octet |
|---|---|---|---|---|---|---|---|---|
| 8 | 7 | 6 | 5 | 4 | 3 | 2 | 1 | |
| Length Indicaor (in octets) | | | | | | | | 1 |
| Higher Layer Protocol Identifier | | | | | | | | 2 |
| Higher Layer Protocol Data Unit | | | | | | | | 3 |
| " | | | | | | | | |
| Higher Layer Protocol Data Unit | | | | | | | | n |

The Higher Layer Protocol Identifier field is coded as follows:
[[paste p.132 1.]]

REGH

This indicates whether a home mobile station shall register.

REG_HYST

If a candidate DCC from the neighbor list has been examined and deemed the best choice for cell reselection and this candidate DCC requires registration, the MS shall move to the new cell only after a signal strength difference of REG_HYST dB has been obtained.

| Value | Function |
|---|---|
| 000 | 0 dB |
| 001 | 2 dB |
| 010 | 4 dB |
| 011 | 6 dB |
| 100 | 8 dB |
| 101 | 10 dB |
| 110 | 12 dB |
| 111 | ∞ dB |

REGID Parameters

This optional field contains information on the current REGID value and the time between stepping REGID. The latter value is expressed in superframes.

| Field | Length (bits) |
|---|---|
| Parameter type | 4 (0010) |
| REGID | 20 |
| REGID_PER | 4 |

Registration Type

Used to indicate the type of registration the mobile is making according to the following table:

| Value | Function |
|---|---|
| 000 | Power down |
| 001 | Power up |
| 010 | Geographic |
| 011 | Forced |
| 100 | Periodic |
| 101 | Reserved |
| 110 | Reserved |
| 111 | Reserved |

REG Period

This optional field indicates that periodic registration is used and also contains the specified periodicity in units of 94 superframes (60.16 seconds).

| Field | Length (bits) |
|---|---|
| Parameter type | 4 (0001) |
| REGPER: Registration Periodicity in units of 94 superframes | 9 |

REGR

This indicates whether a roaming mobile station shall register.
Request Number
    See IS-54B.

RESEL_OFFSET

The reselection offset value is used to increase/decrease the preference of a new candidate cell being considered for cell reselection.

| RESELECT_OFFSET | |
|---|---|
| Code | Value (dB) |
| 000000 | 0 |
| 000001 | 2 |
| " | |
| 111110 | 124 |
| 111111 | 126 |

RNUM

This 10 bit field contains the registration number that is used to define a particular mobile's virtual mobile location area (VMLA).

| Filed | Length (bits) |
|---|---|
| Parameter type | 4 (0001) |
| Number of RNUMs | 6 |
| RNUM (Note 1) | 10 |

RSS_ACC_MIN

This information element is used for the cell (re) selection process. It is the minimum received signal strength required to access the cell.

| RSS_ACC_MIN | |
|---|---|
| Code | Value (dBm) |
| 00000 | −113 |
| 00001 | −111 |
| " | " |
| 11110 | −53 |
| 11111 | −51 |

R-Transaction Identifier

The R-Transaction Identifier is used to associate a R-DATA ACCEPT or a R-DATA REJECT message to the R-DATA message being acknowledged.

S

The serial number flag indicates whether the mobile station sends the ESN message along with a registration, origination, page response, unique challenge order confirmation, or base station challenge order messages on the RACH.

SB

This flag defines whether the mobile station shall use the shortened burst initially on the assigned digital traffic channel.

SCANFREQ

The default minimum required number of signal strength measurements per superframe for candidate DCCs in the neighbor list.

SCC

This field defines the SAT color code to be used on the assigned analog voice channel.

| Bit Pattern | SAT Frequency |
|---|---|
| 00 | 5970 Hz |
| 01 | 6000 Hz |
| 10 | 6030 Hz |
| 11 | Reserved |

SCM

The station Class Mark denotes the powerclass, transmission capability and bandwidth of the MS.

Seconds of Day

A sequential time-of-day counter in seconds, where 12:00:00 A.M.=0.

SERV_SS

This information element is used in the cell reselection process. It is the signal strength used to determine a threshold over which a neighbor cell qualifies for the service aspects of the cell reselection process.

| Code | Value (in dB) |
|---|---|
| 000 | |
| 0001 | |
| " | " |
| 1110 | |
| 1111 | |

Figure 38:
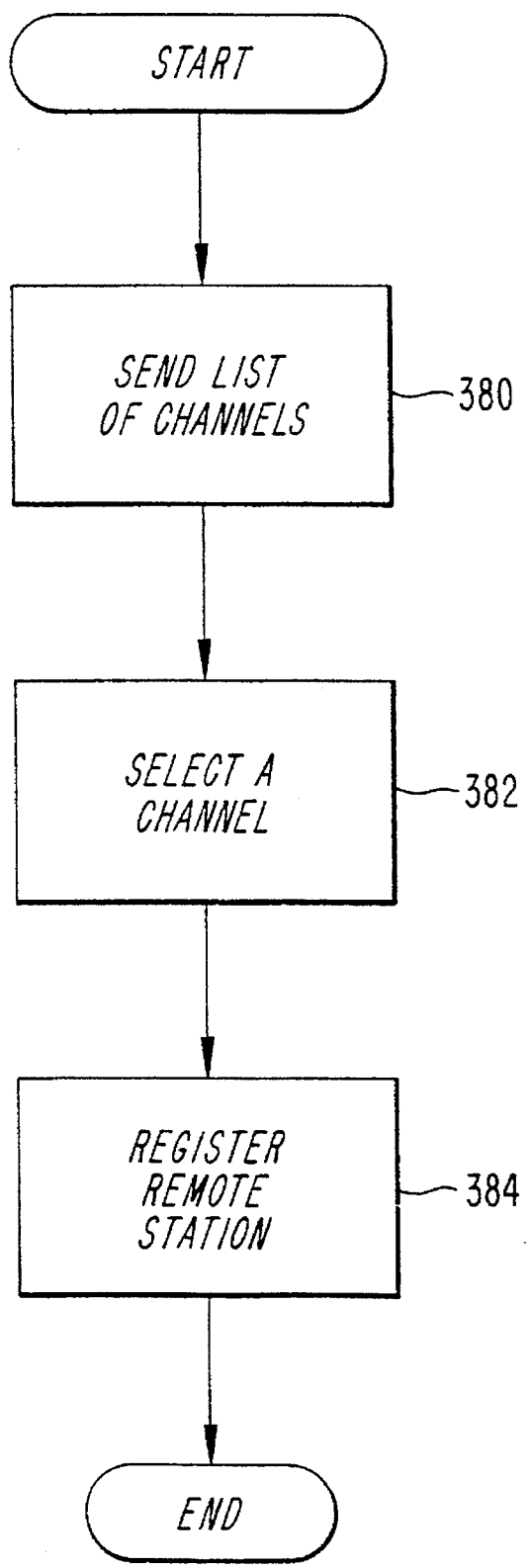
FIG. 38 is a flowchart illustrating an exemplary registration method according to the present invention.

For example, as illustrated in FIG. 38, the system can send a list of J communication channels in neighboring cells to a remote station at block 380. This list can include an indication of whether registration is required in the neighboring cells and an indication of signal strength hysteresis in the neighboring cells. This information can then be used to select a channel at block 382. Once a channel is selected, the remote station can register with the system at block 384 as indicated by the registration indication.

SMS Message ID

A variable used to identify this unique SMS message.

SMS Message Length

The maximum allowable length (in octets) of a L3 short message sent on the RACH according to the following table:

| Value | Function |
|---|---|
| 000 | MS initiated SMS not allowed |
| 001 | 31 octet maximum MS initiated RACH SMS |
| 010 | 63 octet maximum MS initiated RACH SMS |
| 011 | 127 octet maximum MS initiated RACH SMS |
| 100 | Reserved |
| 101 | Reserved |
| 110 | Reserved |
| 111 | Limited only by L2 format |

SOC & BSMC ID Control

This flag indicates whether or not the MS may request the BS SOC & BSMC ID.

Software Vintage

This indicates the software vintage for the mobile.

SSD Update Status

Used to indicate the success, or reason for failure, of an SSD Update Order according to the following table:

| Value | Function |
|---|---|
| 00 | SSD Update Successfull |
| 01 | SSD Update Failed due to AUTHBS mis-match |
| 10 | SSD Update Failed due to timeout |
| 11 | Reserved |

SS_SUFF

The minimum signal strength deemed sufficient for a new candidate DCC to be considered for cell reselection.

| SS_SUFF | |
|---|---|
| Code | Value |
| 00000 | −113 dBm |
| 00001 | −111 dBm |
| " | " |
| 11110 | −53 dBm |
| 11111 | −51 dBm |

Subchannel Number

A variable to identify which subchannel is currently being broadcast.

SYREG

The system based registration flag indicates whether or not the mobile is to geographically register when the mobile enters a new system identification area.

Text Message Data Unit

The Text Message Data Unit is a variable length IE which contains the message to be broadcast. Only one instance of this IE is allowed per message. The following table provides the Text Message Data Unit description.

| Bits | | | | | | | | |
|---|---|---|---|---|---|---|---|---|
| 8 | 7 | 6 | 5 | 4 | 3 | 2 | 1 | Octet |
| Length Indicator (in octets) | | | | | | | | 1 |
| Short Message character 1 (IA5) | | | | | | | | 2 |
| " | | | | | | | | |
| Short Message character 253 (IA5) | | | | | | | | 1 + L<br>L min. = 0<br>L max. = 253 |

VMAC

This field indicates the power level to be used on the assigned analog voice channel. The coding is according to IS-54B Table 2.1.2-1.

VP_MEM

The Voice Privacy, Message Encryption Mode bit is used to request a call mode preference.

SMS Higher Layer Operation

The Higher Layer Protocol Data Unit field in the R-Data Unit is used to carry the SMS application layer messages.

Message Set

The SMS application messages are defined in this section. These messages are transported on the air interface via the layer 3 R-DATA message, or more specifically within the R-Data Unit Information Element.

For every SMS application message, 2 tables are provided: the first one provides the Information Element included in each message and the second provides the message layout for the mandatory IE.

The maximum length of a SMS application layer message shall not exceed 239 octets in order to fit within the R-Data Unit IE.

The SMS application layer messages are as follows.

SMS DELIVER

This SMS application layer message is used in support of MS terminated SMS delivery from the network to the MS.

The following tables provide the message content and the message layout for the mandatory IE.

| Information Element | Direction | Type | Length |
|---|---|---|---|
| Message Type Indicator (MTI) | B → MS | M | 3 bits |
| Reply Option (RO) | B → MS | M | 1 bits |
| Urgency Indicator (UI) | B → MS | M | 2 bits |
| Privacy Indicator (PI) | B → MS | M | 2 bits |
| Message Reference | B → MS | M | 6 or 13 bits |
| User Data Unit | B → MS | M | 2 - *octets |
| User Origination Address | B → MS | O (Note 1) | 2 - *octets |
| User Originating Subaddress | B → MS | O (Note 2) | 2 - *octets |
| Message Center Time Stamp | B → MS | O (Note 3) | 8 octets |

Note 1: May be included by the originating user or the Message Center to identify the originating user.
Note 2: Included if the originating user indicated its subaddress.
Note 3: The Message Center may include a time stamp at which the message was received at the Message Center.

| Bits | | | | | | | | |
|---|---|---|---|---|---|---|---|---|
| 8 | 7 | 6 | 5 | 4 | 3 | 2 | 1 | Octet |
| 0<br>spare | UI | | PI | | MTI | | | 1 |
| 0/1<br>ext | Message Reference (MSB) | | | | | | RO | 2 (Note 1) |
| 1 | Message Reference (LSB) | | | | | | | 2a (Note 1) |
| User Data Unit | | | | | | | | 3 |
| User Data Unit | | | | | | | | etc |

Note 1: If the message reference value exceeds 63, bit 8 of octet 2 is set to 0, and octet 2a is present. If the message reference value is less than 64, octet 2a is not present, and bit 8 of octet 2 is set to 1.

SMS SUBMIT

This SMS application layer message is used in support of MS originated SMS.

The following tables provide the message content and the message layout.

| Information Element | Reference | Direction | Type | Length |
|---|---|---|---|---|
| Message Type Indicator (MTI) | | MS → B | M | 3 bits |
| Urgency Indicator (UI) | | B → MS | M | 2 bits |
| Privacy Indicator (PI) | | B → MS | M | 2 bits |
| Message Reference | | MS → B | M | 6 or 13 bits |
| Delivery Receipt (DR) | | MS → B | M | 1 bits |
| User Destination Address | | MS → B | M | 2 - *octets |
| User Data Unit | | MS → B | M | 1 - *octets |
| User Destination Subaddress | | MS → B | O (Note 1) | 2 - *octets |
| Validity Period | | MS → B | O (Note 2) | 2 or 8 octets |
| Deferred Delivery Time | | MS → B | O (Note 3) | 2 or 8 octets |

Note 1: Included in the event that destination user has a subaddress.
Note 2: Included to indicate to the Message Center the validity of a MS submitted short message.
Note 3: Included to indicate to the Message Center the time when a MS submitted short message shall be delivered.

| Bits | | | | | | | | |
|---|---|---|---|---|---|---|---|---|
| 8 | 7 | 6 | 5 | 4 | 3 | 2 | 1 | Octet |
| 0<br>spare | DR | UI | | 0<br>spare | MTI | | | 1 |
| 0/1<br>ext | Message Reference (MSB) | | | | | | 0<br>spare | 2 (Note 1) |
| 1 | Message Reference (LSB) | | | | | | | 2a (Note 1) |

-continued

| | | |
|---|---|---|
| ext | | |
| | User Data Unit | 3 |
| | User Data Unit | etc |

Note 1: If the message reference valued exceeds 63, bit 8 of octet 2 is set to 0, and octet 2a is present. If the message reference value is less than 64, octet 2a is not present, and bit 8 of octet 2 is set to 1.

SMS USER ACK

This SMS application message is sent by the MS user in response to a SMS DELIVER message with the Reply Option IE indicating that User Acknowledgment is required.

The following tables provide the message content and the message layout for the mandatory IEs.

| Information Element | Reference | Direction | Type | Length |
|---|---|---|---|---|
| Message Type Indicator (MTI) | | MS → B | M | 3 bits |
| Response Code (RC) | | MS → B | M | 4 bits |
| Message Reference | | MS → B | M | 6 or 13 bits |
| User Data Unit | | MS → B | M | 1 - * |
| User Destination Address | | MS → B | O (Note 1) | 2 - *octets |
| User Destination Subadress | | MS → B | O (Note 2) | 2 - *octets |

Note 1: Included if the User Origination address was included in the SMS DELIVER message to be "user acknowledged".
Note 2: May be included if the User Origination subaddress was included in the SMS DELIVER message to be "user acknowledged".

| Bits | | | | | | | | |
|---|---|---|---|---|---|---|---|---|
| 8 | 7 | 6 | 5 | 4 | 3 | 2 | 1 | Octet |
| Response Code | | | | 0 spare | MTI | | | 1 |
| 0/1 ext | Message Reference (MSB) | | | | | | 0 spare | 2 (Note 1) |
| 1 ext | Message Reference (LSB) | | | | | | | 2a (Note 1) |
| User Data Unit | | | | | | | | 3 |
| User Data Unit | | | | | | | | etc |

Note 1: If the message reference value exceeds 63, bit 8 of octet 2 is set to 0, and octet 2a is present. If the message reference value is less than 64, octet 2a is not present, and bit 8 of octet 2 is set to 1.

SMS FEAT_CTRL_REQU

This SMS application layer message is used to allow the MS user to control the SMS application features are controlled. The Feature Parameter IE and the Feature Status IE are associated with the Feature ID IE.

| Information Element | Reference | Direction | Type | Length |
|---|---|---|---|---|
| Message Type Indicator (MTI) | | MS → B | M | 3 bits |
| Number of feature set | | MS → B | M | 3 bits |
| Feature set | | MS → B | M (Note 1) | 2 - *octets |

Note 1: The Number of feature set indicates the number of instances of the Feature set IE.

| Bits | | | | | | | | |
|---|---|---|---|---|---|---|---|---|
| 8 | 7 | 6 | 5 | 4 | 3 | 2 | 1 | Octet |
| Number of Feature set | | | 0 | 0 spare | MTI | | | 1 |
| Feature set 1, octet 1 | | | | | | | | 2 |
| Feature set 1, octet 2 | | | | | | | | 3 |

SMS FEAT_CTRL_STATUS

This SMS application layer message is used to allow the MS to receive information regarding its SMS application features status.

| Information Element | Direction | Type | Length |
|---|---|---|---|
| Message Type Indicator (MTI) | B → MS | M | 3 bits |
| Number of feature set | B → MS | M | 3 bits |
| Feature set | B → MS | M (Note 1) | 2 - *octets |

| Bits | | | | | | | | |
|---|---|---|---|---|---|---|---|---|
| 8 | 7 | 6 | 5 | 4 | 3 | 2 | 1 | Octet |
| Number of Feature set | | | 0 | 0 spare | MTI | | | 1 |
| Feature set 1, octet 1 | | | | | | | | 2 |
| Feature set 1, octet 2 | | | | | | | | 3 |

Note 1: The Number of feature set indicates the number of instances of the Feature set IE.

Information Element Description

The following table provides the complete list of IEs defined at the SMS application layer.

| | Information Element Identifier (IE) | |
|---|---|---|
| Information Element | MS Æ B bits 4 3 2 1 | B Æ MS bits 4 3 2 1 |
| Message Type Indicator | n/a | n/a |
| Deferred Delivery Time | 0 0 1 0 | n/a |
| Delivery Receipt | n/a | n/a |
| Feature set | n/a | n/a |
| Message Center Time Stamp | n/a | 0 0 0 1 |
| Message Reference | n/a | n/a |
| Number of Feature set | n/a | n/a |
| Privacy Indicator | n/a | n/a |
| Reply Option | n/a | n/a |
| Response Code | n/a | n/a |
| Urgency Indicator | n/a | n/a |
| User Data Unit | n/a | n/a |
| User Destination Address | n/a | n/a |
| User Destination Subaddress | 0 0 1 1 | n/a |
| User Originating Address | n/a | 0 1 0 0 |
| User Originating Subaddress | n/a | 0 1 0 1 |
| Validity Period | 0 1 1 0 | n/a |

All other IEI values are reserved.

Message Type Indicator

The Message Type Indicator is a 3-bit field located within bits 1,2 and 3 of the first octet of each SMS application message. MTI is coded as follows:

| Bits | | | Message Type | |
|---|---|---|---|---|
| 3 | 2 | 1 | B → MS | MS → B |
| 0 | 0 | 0 | SMS DELIVER | SMS SUBMIT |
| 0 | 0 | 1 | Reserved | Reserved |
| 0 | 1 | 0 | Reserved | SMS USER ACK |
| 0 | 1 | 1 | SMS FEAT_CTRL_STATUS | SMS FEAT_CTRL_REQU |

All other values are reserved.

Deferred Delivery Time

The Deferred Delivery Time is an optional IE which is included in a SMS SUBMIT to allow the message center to deliver the message at a later time.

The Deferred Delivery Time field is given in either integer or semi-octet representation. In the first case, the Deferred Delivery Time comprises 2 octets, giving the relative delivery time, counted from when the SMS SUBMIT is received by the Message Center. In the second case, the Deferred Delivery Time comprises 8 octets, giving the absolute time for the submitted short message to be delivered.

| Bits | | | | | | | |
|---|---|---|---|---|---|---|---|
| 8 | 7 | 6 | 5 | 4 | 3 | 2 | 1 | Octet |
| 0 | 0 | 0 | Format = 0 | Deferred Delivery Time 0 0 1 0 | | | | 1 |
| | | | | Information Element Identifier | | | | |
| | | | Deferred Delivery Time - relative | | | | | 2 |

| Deferred Delivery Information Element Content, 8 octet format | | | | | | | | |
|---|---|---|---|---|---|---|---|---|
| Bits | | | | | | | | |
| 8 | 7 | 6 | 5 | 4 | 3 | 2 | 1 | Octet |
| 0 | 0 | 0 | Form at = 1 | Deferred Delivery Time 0 0 1 0 | | | | 1 |
| | | | | Information Element Identifier | | | | |
| | | | Deferred Delivery Time - absolute | | | | | 2 |
| | | | Deferred Delivery Time - absolute | | | | | 3 |
| | | | Deferred Delivery Time - absolute | | | | | 4 |
| | | | Deferred Delivery Time - absolute | | | | | 5 |
| | | | Deferred Delivery Time - absolute | | | | | 6 |
| | | | Deferred Delivery Time - absolute | | | | | 7 |
| | | | Deferred Delivery Time - absolute | | | | | 8 |

Delivery Receipt

The Delivery Receipt is used in a SMS SUBMIT message to request the message center to provide a delivery receipt to the MS upon delivery to the destination user of a MS originated short message.
Bit value
0 No delivery receipt required
1 Delivery receipt required.
Feature set The Feature set IE is used to control or provide status regarding specific features. At least one instance of feature set is mandatory when SMS FEAT_CTRL_REQU or SMS FEAT_CTRL_STATUS message is sent. The Feature Parameter and the Feature Status are associated with the Feature ID.

| Feature Set Information Element Content | | | | | | | | |
|---|---|---|---|---|---|---|---|---|
| Bits | | | | | | | | |
| 8 | 7 | 6 | 5 | 4 | 3 | 2 | 1 | Octet |
| 0 Feature status | 0 | 0 Feature Parameter | 0 | Feature ID | | | 1 | 1 |
| | | | | 0 | 0 spare | 0 | 0 | 2 |

The Feature ID field is used to identify the feature associated with a given instance of Feature Status and Feature Parameter within the SMS FEAT CTRL REQ and SMS FEAT CTRL STATUS messages. The Feature ID field is coded as follows:

| Bit 4 3 2 1 | |
|---|---|
| 0 0 0 0 | SMS |

All other values are reserved.

The Feature Parameter field is used in a SMS FEAT CTRL STATUS and SMS FEAT CTRL REQU to identify the feature parameter associated with a given Feature ID. If the Feature ID indicates SMS, the feature parameters are defined as follows:

| Bit 6 5 4 | |
|---|---|
| 0 0 0 | Accept All Messages |
| 0 0 1 | Store All Messages |
| 0 1 0 | Accept Selected Messages |

All other values are reserved.

The Feature Status is a 2-bit field used to indicate the status (in SMS FEAT CTRL STATUS message) or the requested feature status (in SMS FEAT CTRL):

| Bit 8 7 | |
|---|---|
| 0 0 | Feature Parameter OFF |
| 0 1 | Feature Parameter ON. |

Message Center Time Stamp

The Message Center Time Stamp is optionally included in a SMS DELIVER message to indicate the time when the Message Center received the short message.

The Message Center Time Stamp IE is given in semi-octet representation, and represents the time in the following way:

| Bits | | | | | | | | |
|---|---|---|---|---|---|---|---|---|
| 8 | 7 | 6 | 5 | 4 | 3 | 2 | 1 | Octet |
| 0 | 0 | 0 | 0 | Message Center Time Stamp 0 0 0 1 | | | | 1 |
| Reserved | | | | Information Element Identifier | | | | |
| Year digit 1 | | | | Year digit 2 | | | | 2 |
| Month digit 1 | | | | Month digit 2 | | | | 3 |
| Day digit 1 | | | | Day digit 2 | | | | 4 |
| Hour digit 1 | | | | Hour digit 2 | | | | 5 |
| Minute digit 1 | | | | Minute digit 2 | | | | 6 |
| Second digit 1 | | | | Second digit 2 | | | | 7 |
| Time zone digit 1 | | | | Time zone digit 2 | | | | 8 |

NOTE: Digit 1 is the most significant digit. E.g., if Year digit 1 = 9 and Year digit 2 = 3, then the year is 93.

Message Reference

The Message Reference (MR) IE gives an integer representation of a reference number for the short message.

If the MR value is less than 64, only the 6 bit field is used for the MR. If the MR value is greater than 63, but less than 8192, the 13 bit field is used for MR.

In MS terminated SMS, the MR is used to associate a User Acknowledgment message to the previously sent SMS DELIVER message to be "user acknowledged". The MR sent in a SMS USER ACK message shall be the same as the one received in the SMS DELIVER message being "user acknowledged".

Number of Feature Set

The number of feature set identifies the number of instances of Feature set IE present in a SMS FEAT_CTRL_REQU or a SMS FEAT_CTRL_STATUS message.

| Bit 8 7 6 | |
|---|---|
| 0 0 0 | Reserved |
| 0 0 1 | 1 Feature set |
| 0 1 0 | 2 Feature set |
| . | . |
| . | . |
| . | . |
| 1 1 0 | 6 Feature set |
| 1 1 1 | 7 Feature set |

Privacy Indicator

The privacy indicator is used in the SMS DELIVER and SMS SUBMIT messages to allow the sending user to set a level of privacy to the message being sent.

A mobile station receiving a SMS DELIVER may process the message differently based on the level of privacy (e.g. added protection by using different passwords to be entered by the mobile user to read the incoming SMS DELIVER messages).

| Bits 6 5 | | |
|---|---|---|
| 0 0 | not restricted | (privacy level 0) |
| 0 1 | restricted | (privacy level 1) |
| 1 0 | confidential | (privacy level 2) |
| 1 0 | secret | (privacy level 3) |

Reply Option

The Reply Option IE is a 1-bit field mandatory in SMS-DELIVER message to indicate if user acknowledgment is requested. This bit is located in bit 0 of the second octet of the SMS-DELIVER message.

0 User acknowledgment not required
1 User acknowledgment required

Response Code

The Response Code is used to carry the MS user response to a previously received short message.

The Response Code is a 4-bit length mandatory IE used in a SMS USER ACK message. The Response Code values are Message Center specific.

Urgency Indicator

The Urgency Indicator IE is used to allow the sender of a short message to provide levels of urgency to a short message. For example, the MS could use the UI to provide different user notification. The UI is a mandatory 2 bit IE included in SMS DELIVER and SMS SUBMIT messages.

The coding of the UI is as follows:

| Bits 7 6 | |
|---|---|
| 0 0 | bulk |
| 0 1 | normal |
| 1 0 | urgent |
| 1 0 | very urgent |

User Data Unit

The user data unit IE is used to carry the user text message.

| Bits | | | | | | | | |
|---|---|---|---|---|---|---|---|---|
| 8 | 7 | 6 | 5 | 4 | 3 | 2 | 1 | Octet |
| | | Length Indicator (in octets) | | | | | | 1 |
| 0 | 0 | 0 | | Encoding identifier | | | | 2 |
| | spare | | | | | | | |
| | | | User Data | | | | | 3 |
| | | | " | | | | | |
| | | | User Data | | | | | n |

The User Data represents the user message, and is encoded as specified by the Encoding identifier as follows:

| Bits 5 4 3 2 1 | |
|---|---|
| 0 0 0 0 1 rec. T.50 | IA5, as specified by table 11 of CCITT |
| 0 0 0 1 0 | User specific |

All other values are reserved.

User Destination Address

The purpose of the User Destination Address information element is to identify the user destination address of a MS originated short message (i.e., SMS SUBMIT message)

The maximum length of this information element is network-dependent.

| User Destination Information Element (TBCD coding) | | | | | | | |
|---|---|---|---|---|---|---|---|
| Bits | | | | | | | |
| 8 | 7 | 6 | 5 | 4 | 3 | 2 | 1 | Octet |
| Length of destination address contents | | | | | | | 1 |
| Address coding = 0 | | Type of number | | | Numbering plan identification | | 2 |
| 2'nd digit | | | | 1'st digit | | | 3 |
| . | | | | . | | | . |
| . | | | | . | | | . |
| (2n-4)'th digit or Filler (for odd) | | | | (2n-5)'th digit n | | | |

| User Destination Address Information Element (IA5 coding) | | | | | | | |
|---|---|---|---|---|---|---|---|
| Bits | | | | | | | |
| 8 | 7 | 6 | 5 | 4 | 3 | 2 | 1 | Octet |
| Length of destination address contents | | | | | | | 1 |
| Address coding = 1 | Type of number | | | Numbering plan identification | | | 1 |
| 1'st digit/character | | | | | | | 3 |
| . | | | | | | | . |

User Destination Address Information Element (IA5 coding)

| | | | Bits | | | | | |
|---|---|---|---|---|---|---|---|---|
| 8 | 7 | 6 | 5 | 4 | 3 | 2 | 1 | Octet |
| | | | . | | | . | | |
| | | | . | | | . | | |
| | | n'th digit/character | | | | | | n |

Type of number (octet 2) (see Note 1)

```
Bits
7 6 5
0 0 0    unknown
0 0 1    international number (see Note 2)
0 1 0    national number (see Notes 2, 4, 5, 6)
0 1 1    network-specific number (see Note 3)
1 0 0    subscriber number (see Notes 2, 6)
1 1 0    abbreviated number
1 1 1    reserved for extension
All other values are reserved.
```

NOTES:
1. For the definition of "international, national and subscriber number ", see CCITT Recommendation 1.330.
2. Prefix or escape digits shall not be included.
3. The type of number 'network-specific number' is used to indicate administration and service number specific to the serving network.
4. For short message submission between the United States and other countries within world zone 1 (see CCITT Recommendation E. 163 for assignment of country codes), where the numbering plan identification is "ISDN/telephony numbering plan", "type of number" is coded to "national number".
5. For numbers that contain service access codes (e.g., "700", "800", "900"), "type of number" is coded as "national number".
6. Service codes in the "N11" format (e.g., "911", "411") are unique and may be sent using either the "subscriber number" or "national number" codepoints.

Numbering Plan Identification (octet 2)
Numbering plan (applies for type of number = 000,001,010 and 100)
```
Bits
4 3 2 1

0 0 0 0    unknown
0 0 0 1    ISDN/telephony numbering plan (CCITT
           Recommendations E.164 and E.163)
0 0 1 1    data numbering plan (CCITT Recommendation
           X.121)
0 1 0 0    telex numbering plan (CCITT Recommendation F.69)
1 0 0 1    private numbering plan
1 1 1 1    reserved for extension
All other values are reserved.
Number digits (octets 3, etc.)
```

This field is coded TBCD or IA5, as indicated by the Address Coding field (octet 2, bit 8). If TBCD is used, the coding is as follows:

| Binary Value | Digit |
|---|---|
| 0000 | Filler |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 0 |
| 1011 | * |
| 1100 | # |

All other values are reserved

User Destination Subaddress

The purpose of the user destination subaddress information element is to identify the subaddress of the destination user subaddress of a short message. For the definition of subaddress, see CCITT Recommendations 1.330 and 1.334.

User Destination Subaddress Information Element

| | | | Bits | | | | | |
|---|---|---|---|---|---|---|---|---|
| 8 | 7 | 6 | 5 | 4 | 3 | 2 | 1 | Octet |
| 0 | 0 | 0 | 0 | Destination user subaddress | | | | 1 |
| | | Reserved | | 0 | 0 | 1 | 1 | |
| | | | | Information Element Identifier | | | | |
| Length of user destination subaddress contents | | | | | | | | 2 |
| 0 | Type of subaddress | | | odd/ | 0 | 0 | 0 | 3 |
| RSVD | | | | even | | Reserved | | |
| | | | | indica | | | | |
| Subaddress information | | | | | | | | 4 etc. |

Type of subaddress (octet 3)
```
Bits
7 6 5

0 0 0
NSAP (CCITT Recommendation X.213 or ISO 8348 AD2)
0 1 0
user-specified
All other values are reserved.
Odd/even indicator (octet 3)
Bit
4

0
even number of address signals
1
odd number of address signals
```

NOTE: The odd/even inidcator is used when the type of subaddress is "user-specified" and the coding is TBCD.

Subaddress information (octet 4, etc.)

The NSAP address shall be encoded using the preferred binary encoding specified in CCITT Recommendation X.213 or ISO 8348 AD2.

When the AFI=50 (encoded in BCD as 01 010000), IA5 characters are encoded as specified in Table 11 of CCITT Recommendation T.50 or ISO 646 with the eighth bit set to zero. When AFI=51 (encoded in BCD as 0101 0001), ASCII characters are encoded as specified in ANSI X3.4 with the eighth bit set to zero.

For a user-specified subaddress, the field is encoded according to the user specification, subject to a maximum length of 20 octets. When interworking with CCITT Recommendation X.25 networks, TBCD coding should be applied.

User Originating Address

The purpose of the user originating address element is to identify the originating address of a short message.

The maximum length of this information element is network-dependent.

| User Originating Address Information Element (TBCD coding) | | | | | | | | |
|---|---|---|---|---|---|---|---|---|
| Bits | | | | | | | | |
| 8 | 7 | 6 | 5 | 4 | 3 | 2 | 1 | Octet |
| 0 | 0 | 0 | 0 | User Originating Address Information Element Identifier | | | | 1 |
| Length of user originating address contents | | | | | | | | 2 |
| Address coding = 1 | Type of number | | | Numbering plan identification | | | | 2 |
| 1'st address character | | | | | | | | 4 |
| . | | | | | | | | . |
| . | | | | | | | | . |
| n'th address character | | | | | | | | n |

Bits
7 6 5

0 0 0
unknown
0 0 1
international number (see Note 2)
0 1 0
national number (see Notes 2, 4, 5, 6)
0 1 1
network-specific number (see Note 3)
1 0 0
subscriber number (see Notes 2, 6)
1 1 0
abbreviated number
1 1 1
reserved for extentsion
All other values are reserved.

NOTES:
1. For the definition of "international, national and subscriber number ", see CCITT Recommendation 1.330.
2. Prefix or escape digits shall not be included.
3. The type of number 'network-specific number' is used to indicate administration and service number specific to the serving network.
4. For short message submission between the United States and other countries within world zone 1 (see CCITT Recommendation E. 163 for assignment of country codes), where the numbering plan identification is "ISDN/telephony numbering plan", "type of number" is coded to "national number".
5. For numbers that contain service access codes (e.g., "700", "800", 900"), "type of number" is coded as "national number".
6. Service codes in the "N11" format (e.g., "911", "411") are unique and may be sent using either the "subscriber number" or "national number" codepoints.

Numbering Plan Identification (octet 3)
Numbering plan (applies for type of number = 000, 001, 010 and 100)
Bits
4 3 2 1

| 0 0 0 0 | unknown |
| 0 0 0 1 | ISDN/telephony numbering plan (CCITT Recommendations E.164 and E.163) |
| 0 0 1 1 | data numbering plan (CCITT Recommendation X.121) |
| 0 1 0 0 | telex numbering plan (CCITT Recommendation F.69) |
| 1 0 0 1 | private numbering plan |
| 1 1 1 1 | reserved for extension |

All other values are reserved.

Digits (octets 3, etc.)
This field is coded TBCD as follows:

| Binary Value | Digit |
|---|---|
| 0000 | Filler |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 0 |
| 1011 | * |
| 1100 | # |
| All other values reserved | |

User Originating Subaddress

The purpose of the user originating subaddress information element is to identify the subaddress of the originating user subaddress of a short message. For the definition of subaddress, see CCITT Recommendations 1.330 and 1.334.

| User Originating Subaddress Information Element | | | | | | | | |
|---|---|---|---|---|---|---|---|---|
| Bits | | | | | | | | |
| 8 | 7 | 6 | 5 | 4 | 3 | 2 | 1 | Octet |
| 0 | 0 | 0 | 0 | User originating subaddress | | | | 1 |
| | Reserved | | | 0 | 0 | 1 | 1 | |
| | | | | Information element identifier | | | | |
| Length of user originating subaddress contents | | | | | | | | 2 |
| 0 RSVD | Type of subaddress | | | odd/ even indica | 0 | 0 Reserved | 0 | 3 |
| SUbaddress information | | | | | | | | 4 etc |

Type of aubaddress (octet 3)
Bits
7 6 5

0 0 0                                                                 NSAP
(CCITT Recommendation X.213 or ISO 8348 AD2)
0 1 0
user-specified
All other values are reserved.
Odd/even indicator (octet 3)
Bit
4

0                                                                     even
number of address signals
1                                                                     odd
number of address signals NOTE:
The odd/even inidicator is used when the type of subaddress is "user-specified" and the coding is TBCD.

Subaddress information (octet 4, etc.)

The NSAP address shall be encoded using the preferred binary encoding specified in CCITT Recommendation X.213 or ISO 8348 AD2.

When the AFI=50 (encoded in BCD as 01 010000), IA5 characters are encoded as specified in Table 11 of CCITT Recommendation T.50 or ISO 646 with the eighth bit set to zero. When AFI=51 (encoded in BCD as 0101 0001), ASCII characters are encoded as specified in ANSI X3.4 with the eighth bit set to zero.

For a user-specified subaddress, the field is encoded according to the user specification, subject to a maximum length of 20 octets. When interworking with CCITT Recommendation X.25 networks, TBCD coding should be applied.

Validity Period

The Validity Period IE is used in MS originated short message to indicate to the Message Center the time after which the message could be deleted if the message was not delivered to the destination user.

The Validity Period field is given in either integer or semi-octet representation. In the first case, the Validity Period comprises 2 octet, giving the length of the validity period, counted from when the SMS-SUBMIT is received by the Message Center. In the second case, the Validity period comprises 8 octets, giving the absolute time of the validity period termination. The Validity Period Format IE indicates the format used to code the Validity Period.

Validity Period Information Element Content, 2 octet format

| Bits | | | | | | | | |
|---|---|---|---|---|---|---|---|---|
| 8 | 7 | 6 | 5 | 4 | 3 | 2 | 1 | Octet |
| 0 Reserved | 0 | 0 | Format = 0 | Validity Period 0 1 1 0 | | | | 1 |
| Information Element Identifier - Validity Period-relative | | | | | | | | 2 |

Validity Period Information Element Content, 8 octet format

| Bits | | | | | | | | |
|---|---|---|---|---|---|---|---|---|
| 8 | 7 | 6 | 5 | 4 | 3 | 2 | 1 | Octet |
| 0 Reserved | 0 | 0 | Format = 1 | Validity Period 0 1 1 0 | | | | 1 |
| Information Element Indentifier | | | | | | | | |
| Validity Period-absolute | | | | | | | | 2 |
| Validity Period-absolute | | | | | | | | 3 |
| Validity Period-absolute | | | | | | | | 4 |
| Validity Period-absolute | | | | | | | | 5 |
| Validity Period-absolute | | | | | | | | 6 |
| Validity Period-absolute | | | | | | | | 7 |
| Validity Period-absolute | | | | | | | | 8 |

Validity Period-Relative-Field Coding

| VP Decimal Value | Validity Period Value |
|---|---|
| 0 to 143 | (VP + 1) × 5 minutes (i.e. 5 minutes intervals up to 12 hours) |
| 144 to 167 | 12 hours + ((VP − 143) × 30 minutes) |
| 168 to 196 | (VP − 166) × 1 day |
| 197 to 255 | (VP − 192) × 1 week |

The Validity Period absolute is coded as the Message Center Time Stamp IE.

Identification
[[
Mobile Station Identification (MSID)

This mobile stations may be identified using 4 different numbering methods:
1.
34-bit IS-54B MIN
2.

-continued 24-bit IS-54B MIN1
3.
IMSI
4.
TMSI
34-Bit IS-54B MIN
[[See IS-54B.
24-Bit IS-54B MIN1
See IS-54B.
IMSI
[[
Definition
The International Modile Subscriber Identity (IMSI) is a number with a maximum length of 15 decimal digits, composed as follows (D = a decimal digit)
[[paste in FIG pg. 159]]
MCC
Mobile Country Code
MNC
Mobile Network Code
MSIN
Mobile Station Identification Number
NMSI
National Mobile Station Identity
IMSI
International Mobile Station Identity The MCCs are defined in Annex A of E.212. The MCC identifies uniquely the country of domicile of the MS. All MCCs are of 3 digits length. The U.S. and Canada fall within Zone 3 of the Annex. Code 302 is reserved for Canada; Codes 310–316 are reserved for the U.S.

The MNC is used to uniquely identify the home Public Land Mobile Network (PLMN) of the MS. A PLMN is characterized as a mobile network served by one HLR. The MCC and MNC is thus the global address of the MS's HLR.

The IMSI is not used as a dialed number; and there is typically only one IMSI per NAM.

Backward Compatibility with MIN

There is a need to be backward compatible with IS-54B type of MIN. For this reason, systems using IS-54B MIN operation can be supported if:

the MCC indicates a subscriber from Word Zone 3 (U.S. & Canada), and the first two (decimal) digits of the network code are 00, then the remainder of the number can be assumed to be a conventional 10-digit MIN, & the appropriate translations applied for addressing in the network.

IMSI Encoding

The IMSI is encoded as a 50-bit fixed length field.

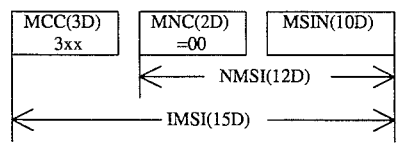

The MSIN represents the 10 decimal digits used to derive the 34-bit IS-54B MIN.

The 15 decimal digits are then divided in 5 groups of 3 digits each. Then, each resulting 5 decimal digit groups is expressed as the corresponding decimal number ($0<=d_i d_j d_k<=999$, i=j+1, j=k+1, k=1,4,,7,10,13) coded in 10 binary bits using a normal decimal to binary conversion.(0 to 999).

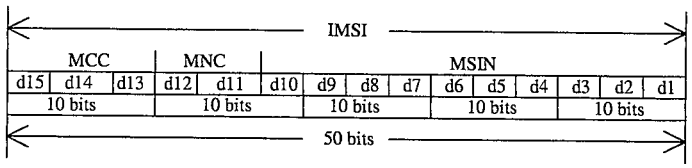

TMSI

The Temporary Mobile Station Identity (TMSI) may be a 20-bit MSID which is assigned dynamically by the network to the mobiles. The TMSI may be used by the network to page or deliver a message to a mobile on the SPACH.

Mobile ESN

As per IS-54B.

System Identification

Base stations may broadcast values indicating their identities with respect to: country, SID, network type, and, if they are not public, private system ID.

They may optionally broadcast their system operator code and BS manufacturer code. These optional values may be available by specific query or possible broadcast of these values. These optional values will be needed only when special proprietary signaling is requested which the BS may be able to deliver, or for access to local private networks.

The identities structure will support nationwide private system identification as well as local private system identification. Supervision of the numbering systems will be handled differently for local and nationwide identity allocation.

A country code may be supported to allow international specification use and international roaming.

| Information Element | Definition | Type | Bits |
|---|---|---|---|
| SID | System Identification-per FCC in IS-54 | M | 15 |
| Network Type | pub/priv/semi-priv/domestic-set by System Operator | M | 2 |
| Country Code | Country Code-same as E.212 | M | 10 |
| PS ID set | Private System Identification-per Operators/TBD | O | 4 + 16*n |
| SOC | System Operator's Code | O | 12 |
| BSMC | Base Station Manufacturer's Code | O | 12 |

SID

The present 15-bit SID structure, as defined in IS-54B, may be used.

Network Type

Two bits may be used to identify the network type. Examples of network types are: Public, Private, Semiprivate and Domestic.

The private system may only be accessible to specific mobiles.

The semiprivate system may transmit a private identification number (PSID) but may be open for public use. This allows private users to favor the cell while also permitting public use.

A domestic system may be a "home base station," e.g., a cordless phone.

| Network Type | Code |
|---|---|
| Public | 00 |
| Semiprivate | 01 |
| Private | 10 |
| Domestic | 11 |

Country Code

The country codes described in E.212 may be broadcast on the DCC.

Private System ID

The private System ID may be used to keep MSs from camping on a private system for which they do not have access. When the MS detects a private system ID not within its private system ID list, the MS shall not attempt to camp or register in the private system.

If a cell is marked as public, the cell may broadcast the PSID of "0" or no PSID at all.

PSID Match

A PSID will be assigned by the system operator to a particular private system. It is the responsibility of the operator to assign the same PSID to the same private network in different SID areas.

A section of the PSID range is reserved for nationwide use. These assignments will only be used in the case that different operators will be handling a particular private system.

If the PSID is in the nationwide range, the mobile may not need to check the SOC combination for a match and can use just the PSID and country code. This would be the case when multiple operators are used to give nationwide coverage for a private system.

The PSID, Country Code, and SOC combination may be used by the mobile to verify its access rights to that BMI.

The BMI may, at its discretion, verify that the particular mobile has access to a particular cell through an extension or enhancement to the existing registration/authentication procedures.

| PSID Allocation | Coding (hex) |
|---|---|
| Unused | 0000 |
| Nationwide assignment (Need external Management of codes) | 0001 - 07FF |
| Assignments made by Operator | 0800 - FFFF |

Mobiles may have the capability to store multiple PSID and SOC combinations.

Multi Personality Base Station

A base station serving more than one private system may broadcast the PSID of each private system that it is serving. The number of PSIDs that are being broadcast is identified by the Number of PSID field.

| Field | Length (value) |
|---|---|
| Parameter type | 4 (0001) |
| Number of PSID (note 1) | 4 |
| PSID | 16*n |
| | (n = 1 to 16) |

Note: The number of PSID in this set is 1 plus the value of this field.

System Operator Code (SOC) and Base Station Manufacture Code (BSMC)

In order for an MS to acquire the services offered by a specific system operator or a specific vendor's base station, the SOC and the BSMC may be verified by the MS.

The SOC may also be used by a mobile to uniquely identify a local private system.

Example of a SMS Message Delivery (BMIE MS)

Scope This example is provided for illustration only. It provides a brief example of a MS terminated SMS without MS user acknowledgment.

A 63 Octet Character Message Delivery

Consider the following text message to be sent to the MS: "Votre rendez-vous de cet apres-midi est cancelle!!. Salut, Eric"

This message is 63 character long. The SMS application layer SMS DELIVER message sent by the message center will be as follows:

Example of a SMS DELIVER Message Format

| Information Element | Type | Length | Description |
|---|---|---|---|
| Message Type Indicator (MTI) | M | 3 bits | Part of the mandatory first octet |
| Reply Option (RO) | M | 1 bit | Part of the mandatory first octet |
| Urgency Indicator (UI) | M | 2 bits | Part of the mandatory first octet |
| Message Reference | M | 1 octet | Mandatory octet |
| User Data Unit | M | 65 octet | Text message |
| User Originating Address | O | 7 octets | Assumed to be 7 digit number, coded TBCD |
| User Originating Subaddress | O | 0 octet | Not present |
| Message Center Time Stamp | O | 0 octet | Not present |
| | | total = 74 octets | |

Example of a R-DATA Message Format

| Information Element | Type | Length (octets) | Description |
|---|---|---|---|
| Message Type | M | 1 | Mandatory first octet |
| R-Transaction Identifier | M | 1 | Mandatory second octet |
| R-Data Unit | M | 76 | SMS DELIVER encapsulated within this IE |
| Message Center Originating Address | O | 0 | Assumed to be not present |
| | | Total = 78 octets | |

Therefore, 77 octet layer 3 message will be transmitted to the MS over the air interface. The initial sender text message was 63 octets, and 7 octets were added to identify the originator (70 octets total). therefore 8 octets are present as overhead:

1 octet for R-DATA message type
1 octet for R-Transaction Identifier
2 octet overhead in R-Data Unit (1 for length indicator , 1 for higher protocol identifier)
2 octet header in SMS DELIVER message
2 octet header in User Data Unit IE (length indicator and encoding identifier)

Assume that the MS has received and accepted the R-DATA message. The MS will then return a layer 3 R-DATA ACCEPT message to the BMI. This message is 2 octet long (1 for layer 3 message type, and 1 for R-Transaction Identifier).

This layer 3 acknowledgment will be used by the BMI to provide a SMS terminal acknowledgment to the message center.

The foregoing detailed description shows only certain particular embodiments of the present invention. However, those skilled in the art will recognize that many modifications and variations may be made without departing substantially from the spirit and scope of the present invention as discussed and illustrated herein. Accordingly, it should be clearly understood that the form of the invention described herein is exemplary only and is not intended to limit, in any way, the scope of the invention as defined in the following claims.

What is claimed is:

1. A method of registration of a remote station with a communications system comprising the steps of:

sending from said system to said station a message containing a list of communication channels in neighboring cells, an indication of whether registration is required in each of the neighboring cells and an indication of signal strength hysteresis for each neighboring cell; and using said signal strength hysteresis for selecting one of said communication channels if registration is required in the neighboring cell.

2. A method of registering a remote station in a radio-communication system comprising the steps of:

sending, from said system to said remote station, a list of candidate channels, said list including a registration indication associated with at least one of said candidate channels and a signal strength hysteresis associated with said at least one of said candidate channels:

using said signal strength hysteresis, based upon a value of said registration indication, to select one of said candidate channels; and registering said remote station as indicated by said registration indication.

* * * * *